(12) United States Patent
Kim et al.

(10) Patent No.: US 12,511,708 B2
(45) Date of Patent: Dec. 30, 2025

(54) ELECTRONIC DEVICE INCLUDING FLEXIBLE DISPLAY, AND PREVIEW CONTROL METHOD THEREOF

(71) Applicant: Samsung Electronics Co., Ltd., Suwon-si (KR)

(72) Inventors: Raetae Kim, Suwon-si (KR); Myunghoon Kwak, Suwon-si (KR); Wankyu Kim, Suwon-si (KR); Youngmin Ji, Suwon-si (KR); Jihea Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 320 days.

(21) Appl. No.: 18/311,533

(22) Filed: May 3, 2023

(65) Prior Publication Data
US 2023/0316453 A1 Oct. 5, 2023

Related U.S. Application Data

(63) Continuation of application No. PCT/KR2021/014718, filed on Oct. 20, 2021.

(30) Foreign Application Priority Data

Nov. 16, 2020 (KR) .......................... 10-2020-0153104
Jan. 12, 2021 (KR) .......................... 10-2021-0004214

(51) Int. Cl.
*G06T 3/40* (2024.01)
*G06F 1/16* (2006.01)
(Continued)

(52) U.S. Cl.
CPC ............. *G06T 3/40* (2013.01); *G06F 1/1624* (2013.01); *G06F 1/1652* (2013.01); *G06F 3/0485* (2013.01); *G06T 7/10* (2017.01)

(58) Field of Classification Search
None
See application file for complete search history.

(56) References Cited

U.S. PATENT DOCUMENTS 8,754,961 B2* 6/2014 Leskela ................. H04N 23/54
348/239
9,131,144 B2 9/2015 Park
(Continued)

FOREIGN PATENT DOCUMENTS

CN 110445999 A 11/2019
JP 2009-21660 A 1/2009
(Continued)

OTHER PUBLICATIONS

Korean Office Action dated Jul. 11, 2025, issued in Korean Patent Application No. 10-2021-0004214.
(Continued)

*Primary Examiner* — Helen Zong
(74) *Attorney, Agent, or Firm* — Jefferson IP Law, LLP

(57) ABSTRACT

An electronic device and a preview control method thereof are provided. The electronic device includes a flexible display, a camera including a lens assembly that moves in conjunction with the movement of the flexible display, and a processor. The processor can detect the movement of the flexible display through a sensor and can adjust a preset preview range on the basis of the detected movement of the flexible display. The processor can adjust a preview range in consideration of the movement of the flexible display, the preview range being a preview range in a captured image acquired through the camera or a preview range in a region captured by an image sensor. A preview image corresponding to the adjusted preview range can be displayed through the flexible display.

15 Claims, 33 Drawing Sheets

(51) Int. Cl.
   *G06F 3/0485*   (2022.01)
   *G06T 7/10*     (2017.01)

(56) References Cited

U.S. PATENT DOCUMENTS

| | | | |
|---|---|---|---|
| 9,565,333 | B2 | 2/2017 | Kim et al. |
| 9,609,225 | B2 | 3/2017 | Kwon et al. |
| 10,860,201 | B2 | 12/2020 | Kang et al. |
| 2008/0152332 | A1 | 6/2008 | Koo et al. |
| 2010/0066810 | A1 | 3/2010 | Ryu et al. |
| 2016/0373654 | A1 | 12/2016 | Kwon et al. |
| 2018/0232894 | A1 | 8/2018 | Kim et al. |
| 2019/0045135 | A1 | 2/2019 | Ryu et al. |
| 2019/0161012 | A1* | 5/2019 | Kim .................. G09G 5/14 |
| 2020/0012324 | A1 | 1/2020 | Sung et al. |
| 2020/0389578 | A1* | 12/2020 | Lee .................. H04M 1/0268 |

FOREIGN PATENT DOCUMENTS

| | | |
|---|---|---|
| KR | 10-0819301 B1 | 4/2008 |
| KR | 10-2010-0031263 A | 3/2010 |
| KR | 10-2012-0076137 A | 7/2012 |
| KR | 10-2016-0150539 A | 12/2016 |
| KR | 10-2017-0055865 A | 5/2017 |
| KR | 10-2017-0079545 A | 7/2017 |
| KR | 10-2018-0092621 A | 2/2018 |
| KR | 10-2019-0014638 A | 2/2019 |
| KR | 10-2020-0005211 A | 1/2020 |

OTHER PUBLICATIONS

International Search Report with Written Opinion English translation dated Feb. 10, 2022; International Appln. No. PCT/KR2021/014718.

* cited by examiner

ELECTRONIC DEVICE INCLUDING FLEXIBLE DISPLAY, AND PREVIEW CONTROL METHOD THEREOF

CROSS-REFERENCE TO RELATED APPLICATION(S)

This application is a continuation application, claiming priority under § 365(c), of an International application No. PCT/KR2021/014718, filed on Oct. 20, 2021, which is based on and claims the benefit of a Korean patent application number 10-2020-0153104, filed on Nov. 16, 2020, in the Korean Intellectual Property Office, and of a Korean patent application number 10-2021-0004214, filed on Jan. 12, 2021, in the Korean Intellectual Property Office, the disclosure of each of which is incorporated by reference herein in its entirety.

BACKGROUND

1. Field

The disclosure relates to an electronic device and a preview control method thereof. More particularly, the disclosure relates to an electronic device including a flexible display and a preview control method thereof.

2. Description of Related Art

Recently, use of flexible-type electronic devices capable of changing the physical form of a display area is spreading. For example, foldable-type, rollable-type, or slidable-type electronic devices may adopt a structure in which a display area is capable of extending or contracting, thereby providing a wide screen by increasing the size of the display area as necessary while maintaining portability.

When the size of a display area is changed (e.g., increased or reduced) in a flexible-type electronic device, a layout configured to meet a change in the size of the display area may be required.

The above information is presented as background information only to assist with an understanding of the disclosure. No determination has been made, and no assertion is made, as to whether any of the above might be applicable as prior art with regard to the disclosure.

SUMMARY

In a flexible electronic device, a camera may be physically moved according to a use state (e.g., a roll-in/roll-out state or a slide-in/slide-out state).

For example, as a housing supporting a display in the electronic device is slid and thus a display area is extended or contracted, the camera mounted on one side (e.g., a rear side) of the sliding housing is moved along with the housing, which may change the position of the camera. Due to a characteristic of this variable form factor, the camera may be physically moved when using the flexible type electronic device.

The physical movement of the camera may deteriorate camera usability or user experience. For example, the view angle (field of view) of the camera may be changed by the movement of the camera, and thus a screen of a preview (e.g., a preview during image taking or a preview during video taking) displayed in the display area of the electronic device may be discontinuously switched.

Aspects of the disclosure are to address at least the above-mentioned problems and/or disadvantages and to provide at least the advantages described below. Accordingly, an aspect of the disclosure is to provide an electronic device including a flexible display and a preview control method thereof.

Additional aspects will be set forth in part in the description which follows and, in part, will be apparent from the description, or may be learned by practice of the presented embodiments.

In accordance with an aspect of the disclosure, an electronic device is provided. The electronic device includes a flexible display in which a size of a display area exposed on a front surface of the electronic device is changed, a camera including a lens assembly that moves in connection with a movement of the flexible display for changing the size of the display area, and at least one processor configured to be connected to the flexible display and the camera. The at least one processor may be configured to detect the movement of the flexible display through at least one sensor, adjust a preview range in a captured image obtained by the camera, based on the movement of the flexible display, to obtain a preview image corresponding to the adjusted preview range, and display the preview image on the flexible display.

In accordance with another aspect of the disclosure, a preview control method of an electronic device including a flexible display and a camera including a lens assembly that moves in connection with a movement of the flexible display are provided. The method includes detecting the movement of the flexible display, adjusting a preview range in a captured image obtained by the camera, based on the movement of the flexible display, to obtain a preview image corresponding to the adjusted preview range, and displaying the preview image on the flexible display.

In accordance with another aspect of the disclosure, an electronic device is provided. The electronic device includes a flexible display in which a size of a display area exposed on a front surface of the electronic device is changed, a camera including a lens assembly that moves in connection with a movement of the flexible display for changing the size of the display area and an image sensor, and at least one processor configured to be connected to the flexible display and the camera. The at least one processor may be configured to detect the movement of the flexible display through at least one sensor, adjust a preview range in a capture area of the image sensor, based on the movement of the flexible display, to obtain a preview image corresponding to the adjusted preview range, and display the preview image on the flexible display.

In accordance with another aspect of the disclosure, a preview control method of an electronic device including a flexible display and a camera including a lens assembly that moves in connection with a movement of the flexible display are provided. The method includes detecting the movement of the flexible display, adjusting a preview range in a capture area of an image sensor in the camera, based on the movement of the flexible display, to obtain a preview image through the adjusted preview range, and displaying the preview image on the flexible display.

According to various embodiments, it is possible to improve usability or user experience in association with a camera of a flexible-type electronic device.

According to various embodiments, it is possible to properly control a preview screen change in consideration of physical movement of a camera while using a flexible-type electronic device.

According to various embodiments, it is possible to prevent a discontinuous switch of preview screens that may occur due to physical movement of a camera while using a flexible-type electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
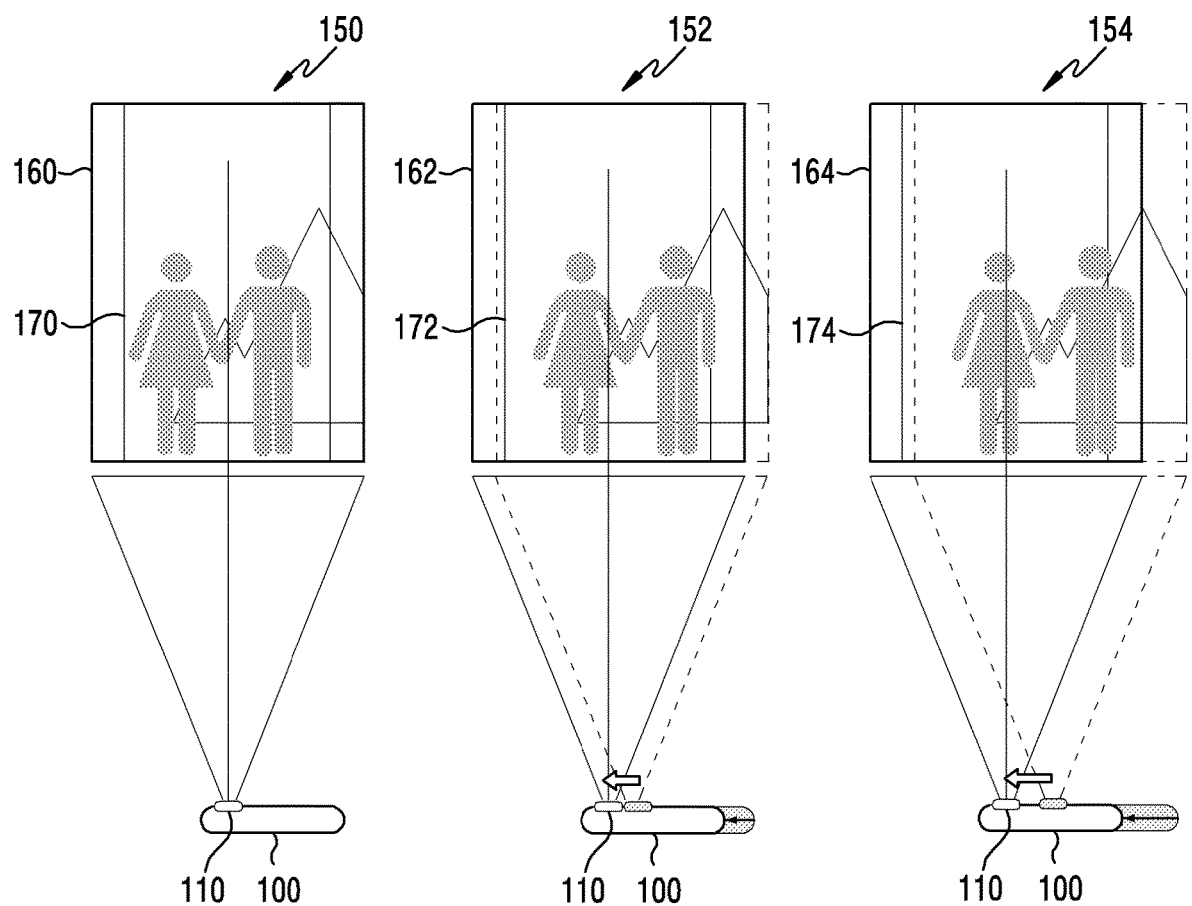
FIG. 1 illustrates an example of a change in a capture area and a fixed preview range due to movement of a camera in an electronic device according to an embodiment of the disclosure.

FIG. 1 illustrates an example of a change in a capture area and a fixed preview range due to movement of a camera in an electronic device according to an embodiment of the disclosure.

The electronic device 100 may have a variable form factor that extends or contracts in a sliding manner (one-way sliding). The electronic device 100 may have a structure of being extended in a first direction by a slide-out movement and being contracted in a second direction that is an opposite direction of the first direction by a slide-in movement.

Referring to FIG. 1, reference numeral 100 is the electronic device. Reference numeral 110 is a camera of the electronic device 100. Reference numeral 150 is a pre-extension state of the electronic device 100. Reference numeral 160 is a first capture area of the camera 110 in the pre-extension state 150. Reference numeral 170 is a preview range in the first capture area 160. Reference number 152 is an in-extension state of the electronic device 100. Reference numeral 162 is a second capture area of the camera 110 in the in-extension state 152. Reference numeral 172 is a preview range in the second capture area 162. Reference numeral 154 is an extension-completed state of the electronic device 100. Reference numeral 164 is a third capture area of the camera 110 in the extension-completed state 154. Reference numeral 174 is a preview range in the third capture area 164.

As the electronic device 100 slides out in the first direction, a mechanical state of the electronic device 100 may be changed from the pre-extension state 150 to the in-extension state 152 and from the in-extension state 152 to the extension-completed state 154. According to extension of the electronic device 100 according to the slide-out movement, a physical movement of the camera 110 may occur. The movement of the camera 110 may change a capture area of the camera 110. As illustrated, the movement of the camera 110 may change the position of the camera 110, and thus the capture area may be sequentially changed from the first capture are 160 to the second capture area 162 and from the second capture area 162 to the third capture area 164.

A portion of the capture area may be designated as a preview range. In the comparative example, the pre-designated preview range may be fixed regardless of a change in the capture area. As illustrated, a central area of the capture area of the camera 110 excluding an outer area may be designated as the preview range. In the capture areas 160, 162, and 164, central areas other than outer areas may be designated as the preview ranges 170, 172, and 174, respectively. Even though the movement of the camera 110 changes the capture area from the first capture area 160 to the second capture area 162 and from the second capture area 162 to the third capture area 164, the preview range in each capture area may be fixed as the central area other than the outer area.

The central area of each of the capture area 160, 162, and 164 is designated as the preview range to be shown on a preview screen. As the electronic device 100 is extended, preview screens displaying the preview range 170 in the first capture area 160, the preview range 172 in the second capture area 162, and the preview range 174 in the third capture area 164 may be sequentially displayed. In the pre-extension state 150, a preview screen showing the preview range 170 in the first capture area 160 may be displayed. In the in-extension state 152, a preview screen showing the preview range 172 in the second capture area 162 may be displayed. In the extension-completed state 154, a preview screen showing the preview range 174 in the third capture area 164 may be displayed.

When the preview range is fixed despite the change in the capture area due to the movement of the camera 110 or when the designated preview range in the capture area is displayed on the preview screen regardless of the movement of the camera 110, preview screens (or content in the preview screens) may be discontinuously switched. For example, as illustrated, a subject (e.g., two people) in the center of the preview screen may gradually be out of the center of the screen center according to the movement of the camera 110.

According to various embodiments of the disclosure, a preview range may be dynamically adjusted in consideration of movement of a camera in connection with movement of a flexible display, thereby maintaining sameness and/or continuity of a preview screen without a sudden screen change or loss of content (e.g., an object) in the screen.

Figure 2A:
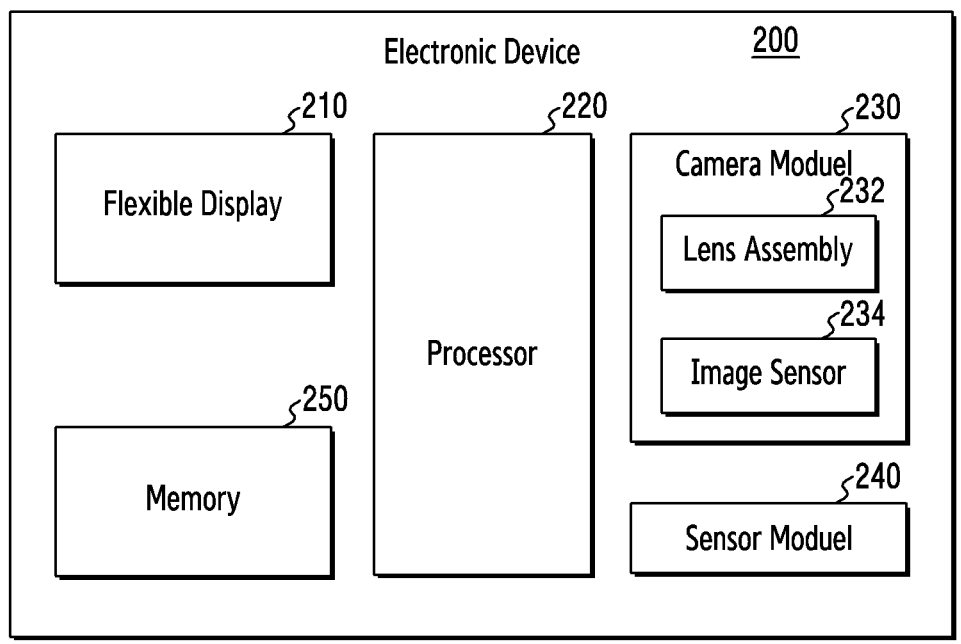
FIG. 2A is a block diagram of an electronic device according to an embodiment of the disclosure.

FIG. 2A is a block diagram of an electronic device according to an embodiment of the disclosure.

Referring to FIG. 2A, the electronic device 200 according to the embodiment may include a flexible display 210, a camera module 230, and at least one processor 220. The electronic device 200 may further include a memory 250 or a sensor module 240.

The electronic device 200 may have a variable form factor that enables the size of an area (hereinafter, "display area") of the flexible display 210 exposed on a front surface of the electronic device 200 (or seen outside the electronic device 200) to be changed (e.g., increased or reduced).

The electronic device 200 may include a structure (e.g., a sliding structure or a rolling structure) for changing (e.g., increasing or reducing) the size of the display area.

At least some of the flexible display 210, the processor 220, the camera module 230, the sensor module 240, and the memory 250 of the electronic device 200 may be electrically and/or operatively connected with each other to exchange a signal (e.g., a command or data) with each other. The electronic device 200 may include at least part of an electronic device 1801 illustrated in FIG. 18. For example, the flexible display 210 may include at least part of a display module 1860 of FIG. 18. The processor 220 may include at least part of a processor 1820 of FIG. 18.

The flexible display 210 may be a display capable of changing (e.g., increasing or reducing) the size of the display area exposed on the front surface of the electronic device 200. For example, the flexible display 210 may be a slidable display or a rollable display. The size of the display area may be changed according to a motion (e.g., sliding or rolling) of a user. For example, when at least a portion of the flexible display 210 that has been introduced into (e.g., has been slid into) a housing of the electronic device 200 is drawn out of the housing (e.g., slides out) by a motion (e.g., a slide-out)

of the user, the size of the display area may be increased. When at least the portion of the flexible display 210 that has been drawn out of the housing is introduced back into the housing by a motion (e.g., a slide-in) the user, the size of the display area may be reduced.

The processor 220 may include at least one processor. For example, the processor 220 may include at least one of an application processor (AP) (e.g., a main processor 1821), an image signal processor (ISP) (e.g., an image signal processor 1660), and a communication processor (CP) (e.g., an auxiliary processor 1823). The processor 220 may control the camera module 230 to obtain an image. For example, the camera module 230 may obtain an image at a specified ratio (e.g., 4:3).

The processor 220 may control the flexible display 210. The processor 220 may display an image obtained via the camera module 230 on the flexible display 210.

The processor 220 may execute/control various functions supported by the electronic device 200. The processor 220 may execute an application by executing a code written in a programming language stored in the memory 250, and may control various types of hardware. For example, the processor 220 may execute a camera application stored in the memory 250 to display a user interface (UI)/user experience (UX) screen (e.g., a preview screen) related to the camera module 230 on the flexible display 210. The processor 220 may control the camera module 230. The processor 220 may support various functions using the camera module 230. The processor 220 may store an image obtained via the camera module 230 in the memory 250, and may display the stored image in the display area of the flexible display 210. For example, an execution screen of the camera application executed by the processor 220 or the image stored in the memory 250 may be displayed on the flexible display 210. The processor 220 may display the image obtained via the camera module 230 as a preview in real time on the flexible display 210.

The camera module 230 may obtain an image (still image) or a video (moving image) by a capture (or photographing) operation. A capture result (e.g., a captured picture and/or video) may be stored in the memory 250. The camera module 230 may include a lens assembly 232 and an image sensor 234. The camera module 230 may include at least part of a camera module 1880 of FIG. 17 to be described later. The lens assembly 232 may include at least one camera lens. For example, the lens assembly 232 may correspond to a lens assembly 1710 of FIG. 17. The image sensor 234 may correspond to an image sensor 1730 of FIG. 17.

The image sensor 234 may obtain a captured image for a capture area (or a subject in the capture area) by converting light transmitted through the lens assembly 232 into an electrical signal. The "capture area" may refer to a photographing area of a camera. The capture area may refer to a capture area (or sensing area) of the image sensor 234. The captured image may refer to a photographed image.

The lens assembly 232 may be referred to as a "camera lens". The lens assembly 232 may move in connection with a movement (e.g., a sliding movement) of the flexible display 210 for changing (e.g., increasing or reducing) the size of the display area.

A component of the camera module 230 may be referred to as a "camera". The camera may refer to the entirety or part of the camera module 230. "Movement of the camera" may be understood as movement of at least the lens assembly 232 of components of the camera.

The movement of the camera may be performed in connection with a movement of the flexible display 210 (or a housing 360 of FIGS. 3A to 3D) or a housing 1560 of FIGS. 15A to 15D). For example, the movement of the flexible display 210 may be a sliding movement. The movement of the flexible display 210 may be a movement of extending or contracting the display area according to sliding (slide-in/out). The display area may be extended or contracted by the movement of the flexible display 210.

Extension or contraction of the electronic device 200 may be understood as extension or contraction of the flexible display 210 (or the housing 360 of FIGS. 3A to 3D) or the housing 1560 of FIGS. 15A to 15D) included in the electronic device 200 or extension or contraction of the display area.

A physical movement structure of the camera (or the lens assembly 232 of the camera) will be described in more detail with reference to FIGS. 3A to 3D and FIGS. 15A to 15D.

The sensor module 240 may include at least one sensor. For example, the sensor module 240 may include one or more sensors (e.g., a distance sensor, a Hall sensor, a magnet sensor, a gyro sensor, an acceleration sensor, a grip sensor, a proximity sensor, a gesture sensor, an infrared sensor, an electrostatic sensor, and an inductive sensor) for detecting a movement of the flexible display 210.

The processor 220 may detect a movement of the flexible display 210 (e.g., the siding movement) through the sensor module 240. The processor 220 may detect one or more of a moving direction (e.g., a sliding direction or an extending or contracting direction), a moving distance (e.g., a sliding distance or an extending or contracting distance), and a moving ratio (e.g., an extending or contracting ratio) of the flexible display 210. The moving distance may be understood as including a degree or level of movement.

In various embodiments, a preview range may be adjusted in consideration of movement of the camera (or the lens assembly 232 of the camera). Adjusting the preview range may refer to dynamically moving a preview range designated for a capture area or captured image of the camera within the capture area or captured image. A first preview range may be adjusted (or changed) to a second preview range, based on a movement of the flexible display 210 in connection with the movement of the camera. The first preview range, which is a pre-designated preview range, may be a default preview range. The second preview range, which is an adjusted preview range, may be an updated preview range.

The processor 220 may adjust the preview range in consideration of the movement of the camera in connection with the movement of the flexible display 210. The processor 220 may adjust the preview range, based on the movement of the flexible display 210 (e.g., one or more of the moving direction, the moving distance, and the moving ratio).

In another embodiment, the preview range may refer to a range used for a preview of the captured image of the camera.

The processor 220 may dynamically move the preview range designated in the captured image of the camera according to movement of the lens assembly 232.

The processor 220 may adjust the preview range in the captured image obtained via the camera, based on the movement of the flexible display 210, thereby obtaining a preview image corresponding to the adjusted preview range. The processor 220 may display the preview image on the flexible display 210. For example, an area corresponding to the adjusted preview range in the captured image may be cropped and displayed as a preview on the flexible display 210.

The processor 220 may adjust the preview range, based on at least one of the moving direction of the flexible display 210, the moving distance of the flexible display 210, and the moving ratio of the flexible display 210. The preview range may be adjusted to move in an opposite direction of the moving direction of the flexible display 210 in the captured image. For example, the preview range may be adjusted to be shifted by the moving distance of the flexible display 210 according to the opposite direction of the moving direction of the flexible display 210. In another example, the preview range may be adjusted to be shifted in proportion to the moving distance of the flexible display 210 according to the opposite direction of the moving direction of the flexible display 210.

In a first state before the lens assembly 232 of the camera moves, the processor 220 may obtain a first captured image via the camera and may crop a first preview range in the first captured image in real time, thereby obtaining a first preview image. The first preview range may refer to a pre-designated range (default preview range, e.g., a range excluding an outer area) in the entire range of a captured image having a specified size (and/or ratio). The first preview image may be displayed on the flexible display 210. For example, an area corresponding to the first preview range of the first captured image may be cropped and displayed as a preview on the flexible display 210.

In a second state after the lens assembly 232 of the camera moves, the processor 220 may obtain a second captured image via the camera, may adjust a first preview range in the second captured image to a second preview range, and may crop the second preview range of the second captured image in real time, thereby obtaining a second preview image. The first preview range may refer to a pre-designated range (default preview range, e.g., a central area excluding an outer area) in the entire range of a captured image having a specified size (and/or ratio). The second preview range may be an adjusted range (updated preview range) based on the movement of the flexible display 210. The second preview range may refer to the adjusted range of the entire range of the captured image having the specified size (and/or ratio). The second preview image may be displayed on the flexible display 210. For example, an area corresponding to the second preview range of the second captured image may be cropped and displayed as a preview on the flexible display 210.

In yet another embodiment, the preview range may refer to a range used for a preview in a capture area (or sensing area) of the image sensor 234 in the camera.

The processor 220 may dynamically move a designated preview range in the capture area (or sensing area) of the image sensor 234 according to the movement of the lens assembly 232.

The processor 220 may adjust the preview range in the capture area of the image sensor 234, based on the movement of the flexible display 210, thereby obtaining a preview image corresponding to the adjusted preview range. The processor 220 may display the preview image on the flexible display 210.

The processor 220 may adjust the preview range, based on at least one of the moving direction of the flexible display 210, the moving distance of the flexible display 210, and the moving ratio of the flexible display 210. The preview range may be adjusted to move in the opposite direction of the moving direction of the flexible display 210 in the capture area of the image sensor 234. For example, the preview range may be adjusted to be shifted by the moving distance of the flexible display 210 according to the opposite direction of the moving direction of the flexible display 210. In another example, the preview range may be adjusted to be shifted in proportion to the moving distance of the flexible display 210 according to the moving direction of the flexible display 210.

In the first state before the lens assembly 232 of the camera moves, the processor 220 may obtain (e.g., sense) a first preview image corresponding to a first preview range (or default preview range) in a capture area of the image sensor 234. The first preview range may refer to a pre-designated range (default preview range, e.g., a range excluding an outer area) in the entire capture area for obtaining a captured image having a specified size (and/or ratio). For example, only an area corresponding to the first preview range of the entire capture area of the image sensor 234 may be sensed, thereby obtaining the first preview image. The first preview image may be displayed on the flexible display 210.

In the second state after the lens assembly 232 of the camera moves, the processor 220 may adjust (or change) a first preview range in a capture area of the image sensor 234 to a second preview range, thereby obtaining a second preview image corresponding to the second preview range. The first preview range may refer to a pre-designated range (default preview range, e.g., a central area excluding an outer area) in the entire capture area of the image sensor 234 for obtaining a captured image having a specified size (and/or ratio). The second preview range may be an adjusted range (updated preview range) based on the movement of the flexible display 210. The second preview range may refer to the adjusted range of the entire capture area of the image sensor 234 for obtaining the captured image having the specified size (and/or ratio). For example, only an area corresponding to the second preview range of the entire capture area of the image sensor 234 may be sensed, thereby obtaining the second preview image. The second preview image may be displayed on the on the flexible display 210.

In various embodiments, the preview range may be adjusted based on an overlapping area (hereinafter, "overlapping area between the captured images before and after the movement of the camera") between the first captured image obtained in the first state before the lens assembly 232 moves and the second captured image obtained in the second state after the lens assembly 232 moves. Alternatively, the preview range may be adjusted based on an overlapping area (hereinafter, "overlapping area between the capture areas before and after the movement of the camera") between a first capture area of the image sensor 234 in the first state before the lens assembly 232 moves and a second capture area of the image sensor 234 in the second state after the lens assembly 232 moves.

The overlapping area between the captured images before and after the movement of the camera and the overlapping area between the capture areas before and after the movement of the camera may correspond to each other. For example, the first captured image may be an image obtained through the first capture area of the image sensor 234 in the camera in the state before the movement of the camera. The second captured image may be an image obtained through the second capture area of the image sensor 234 in the camera in the state after the movement of the camera.

Hereinafter, an "overlapping area before and after the movement of the camera" may refer to the overlap area between the captured images before and after the movement of the camera or the overlapping area between the capture areas before and after the movement of the camera.

For example, the processor 220 may detect (or identify) the overlapping area before and after the movement of the camera by using the image sensor 234 or the captured images obtained via the image sensor 234.

The preview range may be adjusted to be included in the overlapping area before and after the movement of the camera. The preview range may be adjusted to be positioned in the center of the overlapping area before and after the movement of the camera. The preview range may be dynamically moved within the overlapping area before and after the movement of the camera so that content may be maintained (e.g., the display position and display state of an object may be maintained) in preview screens before and after the movement of the camera.

The position of the preview range may be adjusted within the overlapping area before and after the movement of the camera, based on the moving direction of the flexible display 210. For example, the preview range may be adjusted to lean to one direction of the overlapping area within the overlapping area before and after the movement of the camera. The one direction may be the same as the moving direction of the flexible display 210.

The preview range may be adjusted based on one or more of a base margin (BM), the moving distance of the flexible display 210, and the moving ratio of the flexible display 210 within the overlapping area before and after the movement of the camera. The preview range may be adjusted in consideration of a maximum moving distance (e.g., a maximum extending distance (max extension: ME)) according to maximal extension of the flexible display 210. For example, the preview range may be adjusted within the maximum moving distance. In another example, the preview range may be adjusted to move by "maximum moving distance*extension ratio". When a zoom event is detected, the captured images or capture areas before and after the movement of the camera may be updated depending on the zoom event. Accordingly, the overlapping area before and after the movement of the camera may be updated, and the preview range may be adjusted based on the updated overlapping area.

The preview range may be adjusted in further consideration of the distance from a subject. For example, when the distance from the subject is equal to or greater than a specified threshold value, the pre-designated preview range may be maintained without adjusting the preview range. When the distance from the subject is less than the threshold value, the pre-designated preview range may be adjusted in consideration of the movement of the camera.

The preview range may be adjusted in further consideration of a screen display mode of the flexible display 210. For example, the screen display mode may be at least one of a zoom-in mode, a zoom-out mode, a landscape display mode, and a portrait display mode. For example, as the screen display mode is changed, the captured images or capture areas before and after the movement of the camera may be updated. Accordingly, the overlapping area before and after the movement of the camera may be updated, and the preview range may be adjusted based on the updated overlapping area.

Figure 2B:
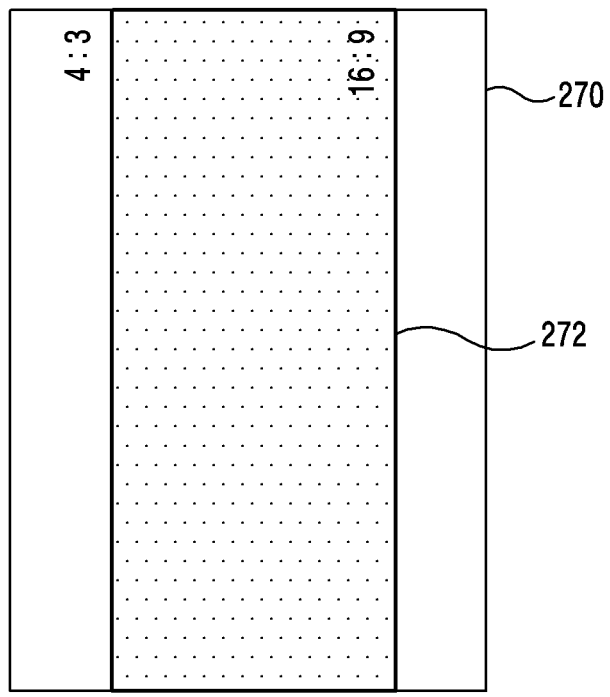
FIG. 2B is an example illustrating a capture area of a camera and a preview range in an electronic device according to an embodiment of the disclosure.

FIG. 2B is an example illustrating a capture area of a camera and a preview range in an electronic device according to an embodiment of the disclosure.

Referring to FIG. 2B, reference numeral 270 may be a capture area (or photographing area) of a camera. The capture area of the camera may refer to a capture area (or sensing area) of an image sensor 234 in the camera. Reference numeral 272 may be a preview range in the capture area 270.

A captured image corresponding to the capture area 270 may be obtained. A preview image corresponding to the preview range 272 in the capture area may be obtained.

The electronic device 200 may perform a photographing (or capture) operation by using the camera. The electronic device 200 may obtain a captured image (or photographed image) having a specified ratio (and//or size, e.g., an aspect ratio of 4:3) through the image sensor 234 in the camera. The electronic device 200 may perform a photographing operation at a certain ratio by default in consideration of the aspect ratio and a usage environment of the flexible display 210. At least part of a captured image having a certain ratio (e.g., 4:3) may be cropped at a specified ratio (e.g., 16:9) in real time, and may be displayed as a preview image on a preview screen.

In the capture area 270, there may be an unavailable area that is not used due to a problem, such as image distortion with respect to a wide angle of the camera. The preview range 272 may be an effective area (e.g., a central area) of the capture area 270 excluding the unavailable area (e.g., an outer area). For example, the preview range 272 may refer to an effective area of the entire capture area of the image sensor 234.

For example, a portion of the entire capture area (or entire sensing area) (e.g., the effective area of the entire capture area) of the image sensor 234 may be designated as the preview range 272. A preview image may be obtained (e.g., sensed) through the preview range 272 in the entire capture area of the image sensor 234. In another example, a portion of a captured image (e.g., an effective area of a captured image) obtained through the entire capture area of the image sensor 234 may be designated as a preview range. The preview range in the captured image may be cropped and used for a preview.

When taking a still image (e.g., a picture) or a video by using the camera, the electronic device 200 may adjust the preview range 272 in the capture area 270 or the preview range in the captured image corresponding to the capture area 270 in real time in consideration of movement of the camera.

Figure 2C:
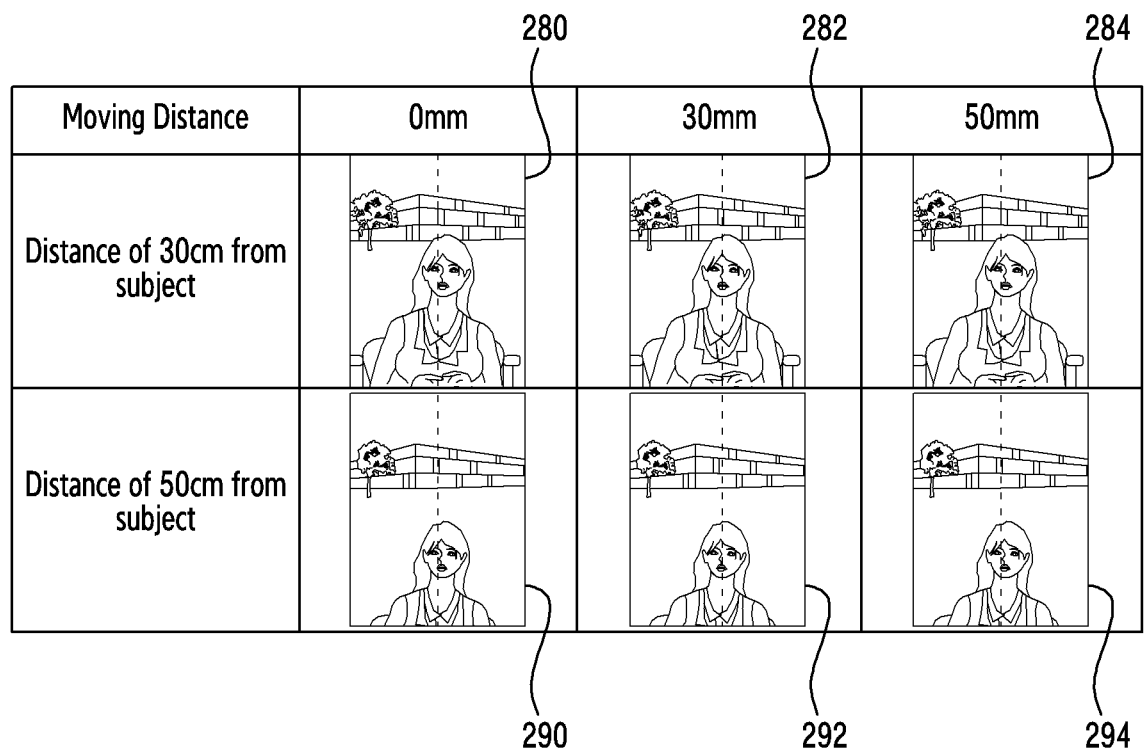
FIG. 2C illustrates an example of preview screens when a camera is moved in an electronic device according to an embodiment of the disclosure.

FIG. 2C illustrates an example of preview screens when a camera is moved in an electronic device according to an embodiment of the disclosure.

In the electronic device 200, the camera (or a camera lens assembly 232) may move in connection with a movement (e.g., sliding or extension or contraction of a display area) of a flexible display 210. As the camera moves, a capture area of the camera may be changed. A preview range in the capture area or a captured image may be adjusted in consideration of movement of the camera. A preview image according to the adjusted preview range may be obtained and be displayed as a preview screen.

Reference numerals 280 and 290 may be preview screens in a first state (e.g., a pre-extension state or a state before the movement of the camera). References numerals 282 and 292 may be preview screens in a second state (e.g., an in-extension state or a state in which the camera is moving). Reference numerals 284 and 294 may be preview screens in a third state (e.g., an extension-completed state or a state after the movement of the camera).

For example, when the electronic device 200 slides in a first direction (e.g., a horizontal direction) with a distance of a first value (e.g., 30 cm) between the camera of the electronic device 200 and a subject, a sliding distance may increase to a first value (e.g., 0 mm), a second value (e.g., 30 mm), and a third value (e.g., 50 mm). The camera (or lens assembly 232) may be moved in proportion to the sliding distance, and accordingly the position thereof may be changed. The movement of the camera may change the capture area of the camera.

When the distance between the camera of the electronic device 200 and the subject is the second value (e.g., 50 cm), the subject may be photographed (or captured) in a smaller size than when the distance is the first value (e.g., 30 cm). In this state, when the electronic device 200 slides in the first direction (e.g., the horizontal direction), a sliding distance may increase to the first value (e.g., 0 mm), the second value (e.g., 30 mm), and the third value (e.g., 50 mm). The camera (or lens assembly 232) may be moved in proportion to the sliding distance, and accordingly the position thereof may be changed. The movement of the camera may change the capture area of the camera.

Even though the capture area is changed due to the movement of the camera, the electronic device 200 may adjust the preview range for the capture area or the captured image, thereby displaying continuous preview screens without a sudden screen change or loss of content in a screen. For example, as illustrated, the same preview screens may be continuously displayed regardless of the movement of the camera by a preview range adjustment function (display of the same first preview screens 280, 282, and 284 or display of the same second preview screens 290, 292, and 294). In the preview screens, the subject (e.g., a person) may always be positioned in the center of the screen regardless of the movement of the camera.

In various embodiments, a "capture area" may refer to an area captured (or photographed) according to a view angle of the camera. The capture area may be referred to as a photographing area. A capture area of the camera may be understood as a capture area of the image sensor 234 connected to the camera or included as a part of the camera. The capture area may be an area captured (or sensed) by the image sensor 234 of the camera. An image (still image) or a video (moving image) corresponding to the capture area may be obtained. At least part (e.g., an effective area excluding an outer area) of the capture area or the captured image may be designated as a preview range and be used for a preview.

A "preview range" may refer to a range in a captured image or a capture area of the camera that is used for a preview. For example, the preview range may refer to a range in the entire captured image that is used for a preview. In another example, the preview range may refer to a range in the entire capture area (or entire sensing area) of the image sensor 234 that is used for a preview. A preview range of the camera may be designated in advance. Information (e.g., information about one or more of a reference point, a centerline, a coordinate, a position, a boundary, an area, and a size) for designating a preview range may be stored in advance.

When the camera (or the lens assembly 232 of the camera) is moved in connection with the movement of the flexible display 210, the capture area (or photographing area) may be changed due to the movement of the camera. The preview range may be adjusted in consideration of the movement of the camera or the changed capture area due to the movement of the camera.

In various embodiments, the capture area being changed may mean that the capture area is changed from a first capture area to a second capture area as a mechanical state of the electronic device 200 is changed (e.g., extended or contracted) or as the camera of the electronic device 200 is moved in connection with the movement (e.g., sliding) of the flexible display 210. The preview range being adjusted may mean that the preview range is changed from a first preview range (or default preview range) to a second preview range (or updated preview range) as the mechanical state of the electronic device 200 is changed or as the camera of the electronic device 200 is moved in connection with the movement of the flexible display 210.

FIGS. 3A to 3D illustrate an example of a mechanical structure of an electronic device according to various embodiments of the disclosure.

The illustrated structure is only for understanding, and the scope of embodiments is not limited to the structure. Various embodiments of modifying, transforming, applying, or extending the structure are possible within a range including a structure in which a change (e.g., extension or contraction) in the mechanical structure of the electronic device or movement (e.g., a slide-in or slide-out) of a flexible display is connected with movement of a camera (or a lens assembly of the camera).

The electronic device according to various embodiments may be an electronic device including a flexible display capable of extending or contracting in at least one direction. For example, the electronic device according to various embodiments may be any one of a horizontally slidable-type electronic device, a vertically slidable-type electronic device, a multiaxially slidable-type electronic device capable of sliding in both directions (e.g., a horizontal or vertical direction) with respect to multiple axes, and a rollable-type electronic device in which a flexible display is capable of substantially entirely (e.g., 90% or more of the total area) sliding in one direction (e.g., the horizontal or vertical direction) to be rolled on a rotating body in a housing or to be drawn out and unfolded outside the housing.

Referring to FIGS. 3A to 3D, the electronic device 300 according to an embodiment may be a horizontally slidable-type electronic device 300.

The electronic device 300 may include a lens assembly 332 that moves in connection with movement of a flexible display 310. Although FIGS. 3A to 3D show that the lens assembly 332 is a rear camera lens, various positions or installation methods may be applied to the lens assembly 332. For example, a front camera lens or a lateral camera lens may be configured to move in connection with the movement of the flexible display 310.

The electronic device 300 according to another embodiment may be a horizontally slidable-type electronic device. A portion of the flexible display 310 may slide out according to a first direction 370 (e.g., one side in the horizontal (x-axis) direction) to be drawn out of the electronic device 300 (or housing 360), or may slide in according to an opposite direction (e.g., the other side in the horizontal direction) to be introduced into the electronic device 300 (or housing 360).

Figure 3A:
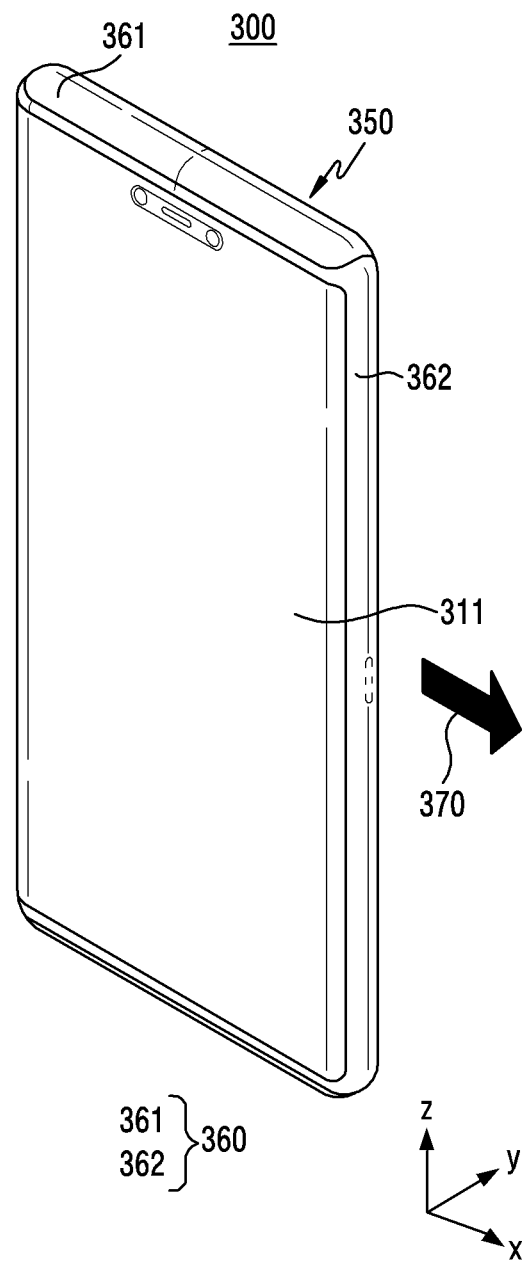
FIG. 3A is a front perspective view of an electronic device in a first state according to an embodiment of the disclosure.
Figure 3B:
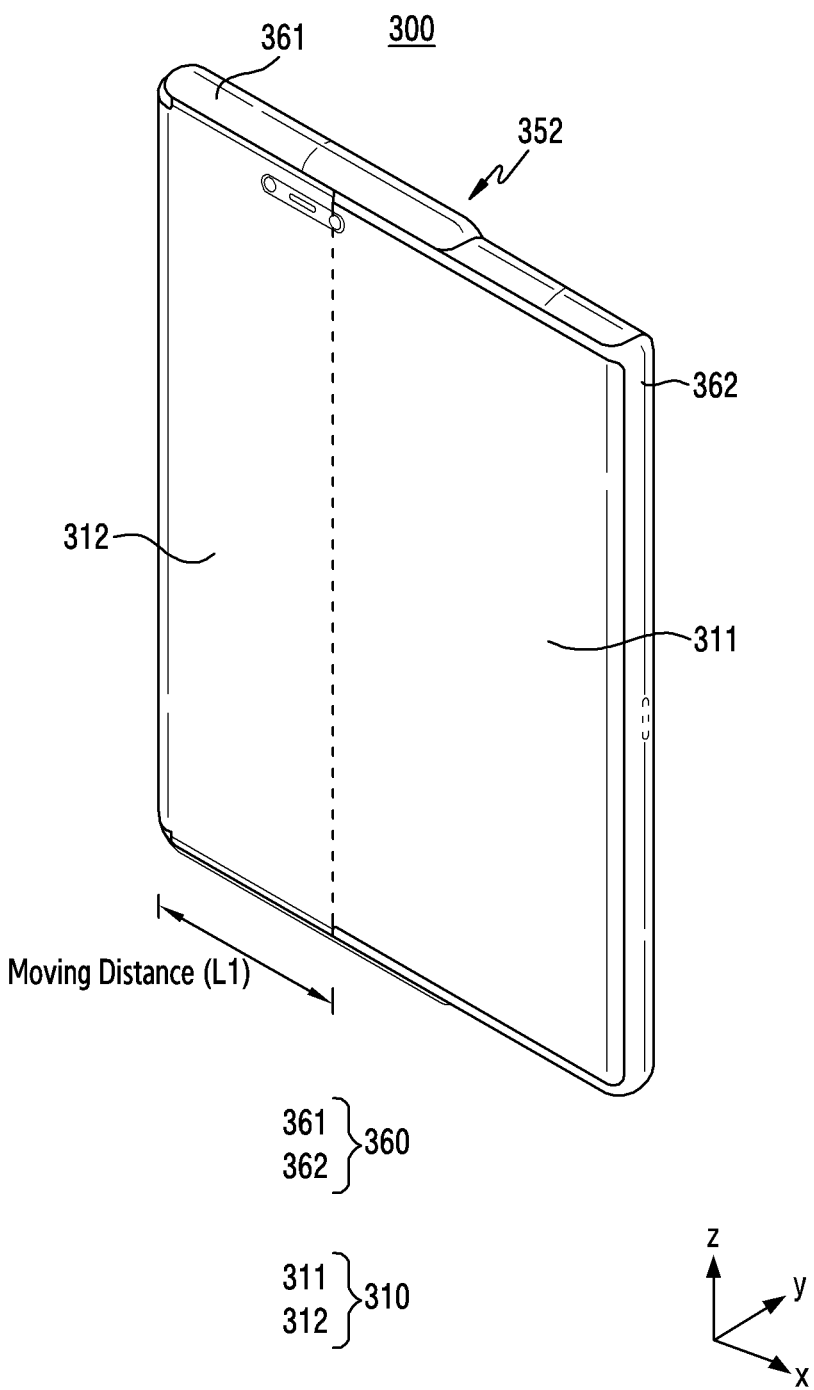
FIG. 3B is a front perspective view of an electronic device in a second state according to an embodiment of the disclosure.

FIG. 3A is a front perspective view of the electronic device in a first state (e.g., a pre-extension state or a state before movement of a camera) according to an embodiment. FIG. 3B is a front perspective view of the electronic device in a second state (e.g., a post-extension state or a state after the movement of the camera) according to an embodiment.

Referring to FIGS. 3A and 3B, the electronic device 300 according to an embodiment may include the flexible display 310 and the housing 360. A display area of the flexible display 310 may include a first area 311 and the second area 312. The housing 360 may include a first housing 361 and a second housing 362.

The flexible display 310 may be positioned on a front surface of the electronic device 300. For example, the flexible display 310 may occupy most of the area of the front surface of the electronic device 300. The housing 360 surrounding at least part of an edge of the flexible display 310 may be disposed on the front surface of the electronic device 300. For example, the housing 360 may form a portion of the front surface, a lateral surface, and a rear surface of the electronic device 300. In another example, the housing 360 may form a portion of the lateral surface and the rear surface of the electronic device 300.

The housing 360 may include the first housing 361 and the second housing 362. The second housing 362 may be coupled to the first housing 361 to be able to slidingly move with respect to the first housing 361. The second housing 362 may slide out along the first direction 370 (e.g., the one side in the horizontal direction), or may slide in along the second direction (e.g., the other side of the horizontal direction), which is an opposite direction of the first direction 370. For example, a driving source for sliding movement of the second housing 362 may be driven in any one of manual, automatic, or semi-automatic manners. When the sliding driving source is semi-automatic, a sliding guide member or a sliding driving body (e.g., a motor) may be used, and when the sliding driving source is automatic, a roller-type guide member or a roller driving body (e.g., a motor) may be used. However, the disclosure does not need to be limited by a sliding or roller type.

The flexible display 310 may include the first area 311 that is coupled to the second housing 362 and is always exposed to the outside of the electronic device 300 and the second area 312 that extends from the first area 311 and is capable of being introduced into the electronic device 300 by a sliding movement.

The flexible display 310 may be coupled to a front surface of the second housing 362 to slidingly move along with the second housing 362. Movement of the second housing 362 may be understood as movement of the flexible display 310. The flexible display 310 may be configured such that the size of the display area exposed on the front surface of the electronic device 300 may be changed (e.g., increased or reduced), based on the sliding movement of the second housing 362.

When the electronic device 300 is switched from the first state 350 to the second state 352 according to the movement of the second housing 362, the second area 312 of the flexible display 310 may be drawn out of the electronic device 300. When the electronic device 300 is switched from the second state 352 to the first state 350 according to the movement of the second housing 362, the second area 312 of the flexible display 310 may be introduced into the electronic device 300.

When the second housing 362 slides out along the first direction 370 (e.g., the one side in the horizontal direction), the second area 312 of the flexible display 310 may be drawn out of the electronic device 300 so that the size of the display area may be increased. When the second housing 362 slides in along the opposite direction (e.g., the other side in the horizontal direction) of the first direction 370, the second area 312 of the flexible display 310 may be introduced into the electronic device 300 so that the size of the display area may be reduced. The flexible display 310 may be moved by a certain moving distance (e.g., L1) along the first direction 370 by the sliding movement.

Figure 3C:
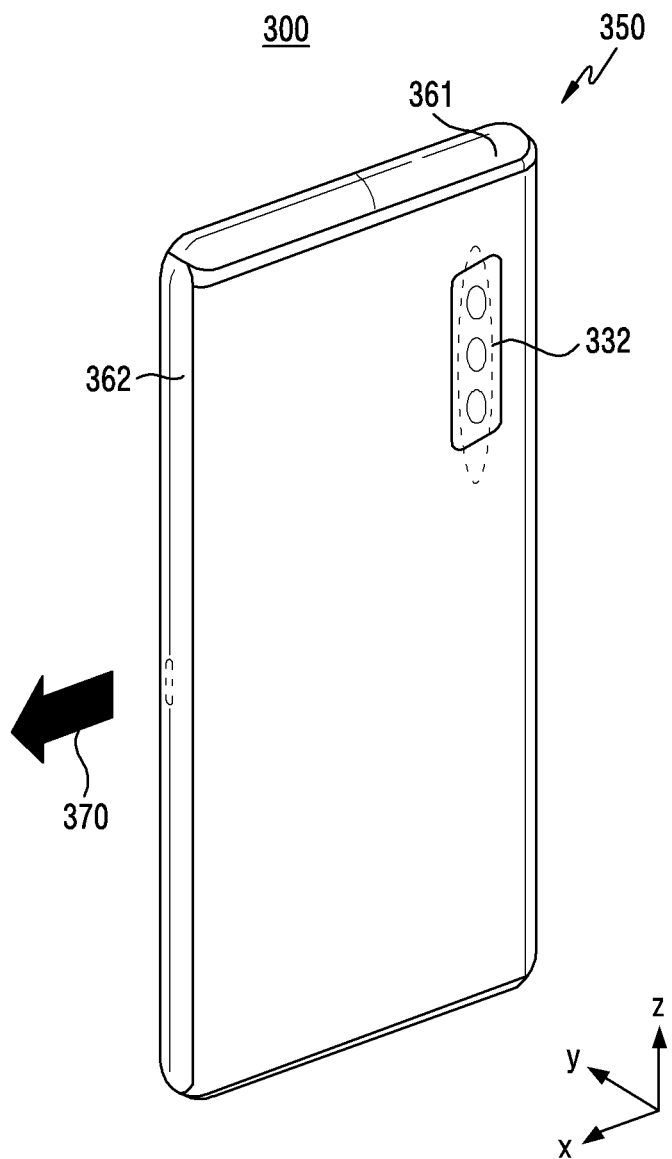
FIG. 3C is a rear perspective view of an electronic device in a first state according to an embodiment of the disclosure.
Figure 3D:
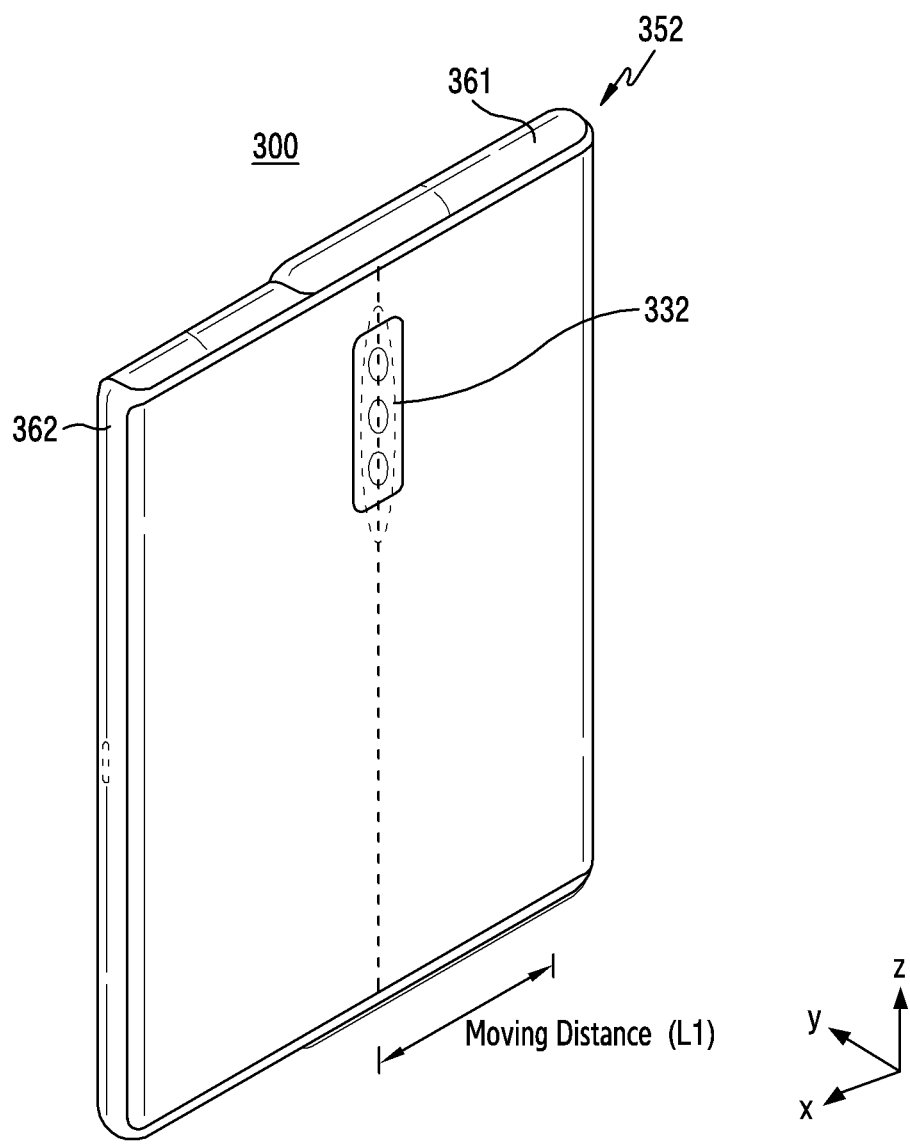
FIG. 3D is a rear perspective view of an electronic device in a second state according to an embodiment of the disclosure.

FIG. 3C is a rear perspective view of the electronic device in the first state (e.g., the pre-extension state or the state before the movement of the camera) according to an embodiment. FIG. 3D is a rear perspective view of the electronic device in the second state (e.g., the post-extension state or the state after the movement of the camera) according to an embodiment.

Referring to FIGS. 3C and 3D, the electronic device 300 according to an embodiment may include the lens assembly 332 of the camera. The lens assembly 332 may be moved in connection with the movement (e.g., sliding movement) of the flexible display 310 for changing the size of the display area.

For example, as illustrated, the flexible display 310 may be coupled to the front surface of the second housing 362, and the lens assembly 332 of the camera may be coupled to a rear surface of the second housing 362. The flexible display 310 and the lens assembly 332 may be moved together according to the sliding movement of the second housing 362. The second housing 362 may slide out along the first direction 370 (e.g., the one side in the horizontal direction), or may be slide in along the second direction (e.g., the other side in the horizontal direction), which is the opposite direction of the first direction 370. The movement of the second housing 362 may be understood as the movement of the flexible display 310 and/or movement of the lens assembly 332.

The flexible display 310 may be moved by the certain moving distance (e.g., L1) along the first direction 370 by the sliding movement of the second housing 362 with respect to the first housing 361. The lens assembly 332 of the camera may be moved by the certain moving distance (e.g., L1) along the first direction 370 in connection with the movement of the flexible display 310.

The electronic device 300 may detect the movement (e.g., a sliding movement) of the flexible display 310 via at least one sensor (e.g., the sensor module 240).

The electronic device 300 may obtain a sensing value according to the movement of the flexible display 310. For example, the electronic device 300 may detect movement of a rotating structure (not shown, e.g., a hinge) in the first housing 361 via the at least one sensor (e.g., the sensor module 240), and may determine whether the second housing 362 has been moved from the first housing 361. For example, the electronic device 300 may detect the movement of the flexible display 310 by using a distance sensor. The distance sensor may measure the distance of the second housing 362 to the first housing 361. The distance sensor may include at least one of a time-of-flight (TOF) sensor, an ultrasonic sensor, and a radio-wave sensor. The electronic device 300 may detect at least one of whether the second housing 362 has been moved from the first housing 361, a moving distance, and a moving ratio via the distance sensor. In another example, the electronic device 300 may detect a mechanical state of the flexible display 310 by using the at least one sensor (e.g., the sensor module 240). The at least one sensor may be configured to generate electrical signals distinguished in respective states (e.g., the first state 350 and the second state 352) in which the degree of movement of the flexible display 310 is different. The at least one sensor may include a Hall sensor and/or a magnet sensor. The electronic device 300 may detect at least one of whether the second housing 362 has been moved from the first housing 361, the moving distance, and the moving ratio via the at least one sensor.

A moving direction, a moving distance, and a moving ratio of the flexible display 310 may respectively correspond to a moving direction, a moving distance, and a moving ratio of the lens assembly 332.

The electronic device 300 may recognize the movement of the camera (or the lens assembly 332 of the camera), based on the movement of the flexible display 310. As the lens assembly 332 of the camera is moved in connection with the movement of the flexible display 310, the electronic device 300 may adjust a preview range. The electronic device 300 may adjust the preview range, based on the movement of the flexible display 310 (e.g., one or more of the moving direction, the moving distance, and the moving ratio).

Figure 4A:
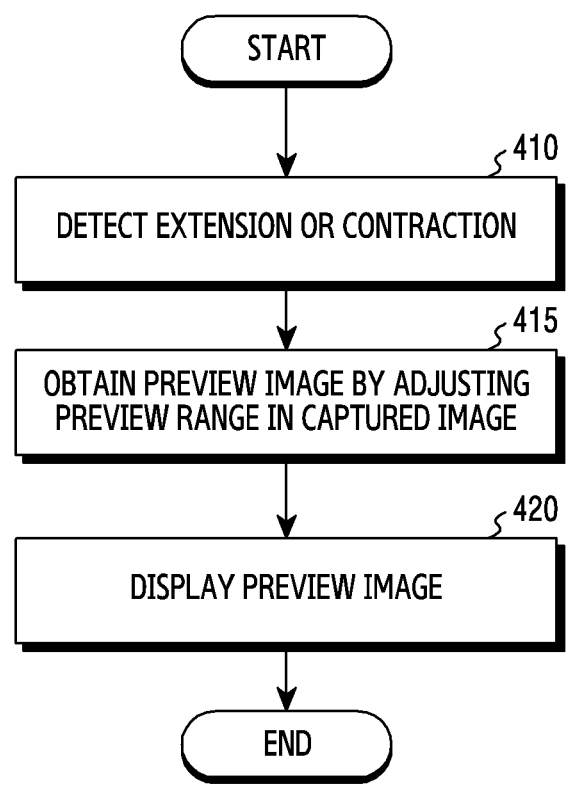
FIG. 4A is a flowchart illustrating a preview control method of an electronic device according to an embodiment of the disclosure.

FIG. 4A is a flowchart illustrating a preview control method of an electronic device according to an embodiment of the disclosure.

Referring to FIG. 4A, the preview control method according to the embodiment may include operation 410, operation 415, and operation 420. For convenience, each operation is assumed to be performed by the processor 220 of the electronic device 200.

The electronic device 200 may have a variable form factor that enables the size of a display area to be changed (e.g., increased or reduced). A camera lens (e.g., the lens assembly 232) may be mounted on a housing (e.g., the second housing 362) supporting the flexible display 210 of the electronic device 200 or may be configured to move in connection with the flexible display 210 when the flexible display 210 is moved (e.g., slid or rolled). The camera lens may be moved in connection with the movement (e.g., sliding) of the flexible display 210.

A preview range may be adjusted in real time, based on the movement (e.g., sliding or rolling) of the flexible display 210. The sameness and/or continuity of preview screens may be maintained through the adjusted preview range. The electronic device 200 may adjust a designated preview range in consideration of movement of the camera lens according to the movement of the flexible display 210.

The processor 220 may adjust (or change) a first preview range (or default preview range) applied to a previous preview screen to a second preview range (or updated preview range) in consideration of the movement of the camera, thereby preventing a discontinuous change between the previous preview screen and a current preview screen due to the movement of the camera lens.

Information for designating a preview range (or default preview range) in a captured image of a camera may be stored in advance. The preview range may be at least a portion (e.g., an effective area excluding an outer area) of the captured image (or photographed image). An area corresponding to the preview range in the captured image may be cropped and used as a preview image. For example, the information for designating the preview range may include information about one or more of a reference point, a centerline, a coordinate, a position, a boundary, an area, and a size.

The preview range for the captured image of the camera may be adjusted by the preview control method illustrated in FIG. 4A. The preview range may refer to a range used for a preview of the captured image of the camera.

In operation 410, the processor 220 may detect a movement (e.g., sliding or rolling) of the flexible display 210 for changing (e.g., increasing or reducing) the size of the display area through at least one sensor (e.g., the sensor module 240). For example, the processor 220 may detect a display area extension event according to extension of the flexible display 210 or a display area contraction event according to contraction of the flexible display 210.

In operation 415, the processor 220 may adjust the preview range in the captured image obtained by the camera as the lens assembly 232 is moved in connection with the movement of the flexible display 210.

By adjusting the preview range, the first preview range (or default preview range) may be adjusted (or changed) to the second preview range (or updated preview range). For example, the second preview range may be obtained by moving the first preview range in the captured image. For example, the second preview range may be obtained by moving the first preview range by an offset corresponding to (e.g., the same as or proportional to) a moving distance of the flexible display 210 according to a moving direction of the flexible display 210. The size (and/or ratio) of the second preview range may correspond to (e.g., be the same as) the size (and/or ratio) of the first preview range.

The processor 220 may adjust the preview range in the captured image, based on the movement of the flexible display 210.

The preview range may be adjusted based on at least one of the moving direction of the flexible display 210, the moving distance of the flexible display 210 and a moving ratio of the flexible display 210. In the captured image, the preview range may be adjusted to move in an opposite direction of the moving direction of the flexible display 210.

The preview range may be adjusted based on an overlapping area (overlapping area between captured images before and after the movement of the camera) between a first captured image obtained in a first state before the lens assembly 232 moves and a second captured image obtained in a second state after the lens assembly 232 moves. The preview range may be adjusted to be included in the overlapping area between the captured images before and after the movement of the camera. For example, the processor 220 may adjust the preview range in the second captured image to be positioned in the center of the overlapping area between the first captured image and the second captured image. In another example, the electronic device 200 may adjust the preview range so that content is maintained (or preserved). To maintain the content, the processor 220 may adjust the preview range in the second captured image so that a largest number of objects or a largest object display area is included. For example, the preview may be adjusted by changing the reference point (e.g., an x-axis reference point) or a reference line (e.g., the centerline).

The processor 220 may adjust the preview range in real time in further consideration of a condition of the electronic device 200 (e.g., a maximum moving distance according to maximal extension of the flexible display 210, the distance between the electronic device 200 and a subject, or a screen display mode of the electronic device 200 (e.g., a landscape display mode, a portrait display mode, a zoom-in mode, and a zoom-out mode).

The processor 220 may obtain a preview image corresponding to the adjusted preview range.

In operation 420, the processor 220 may display the obtained preview image on the flexible display 210.

Figure 4B:
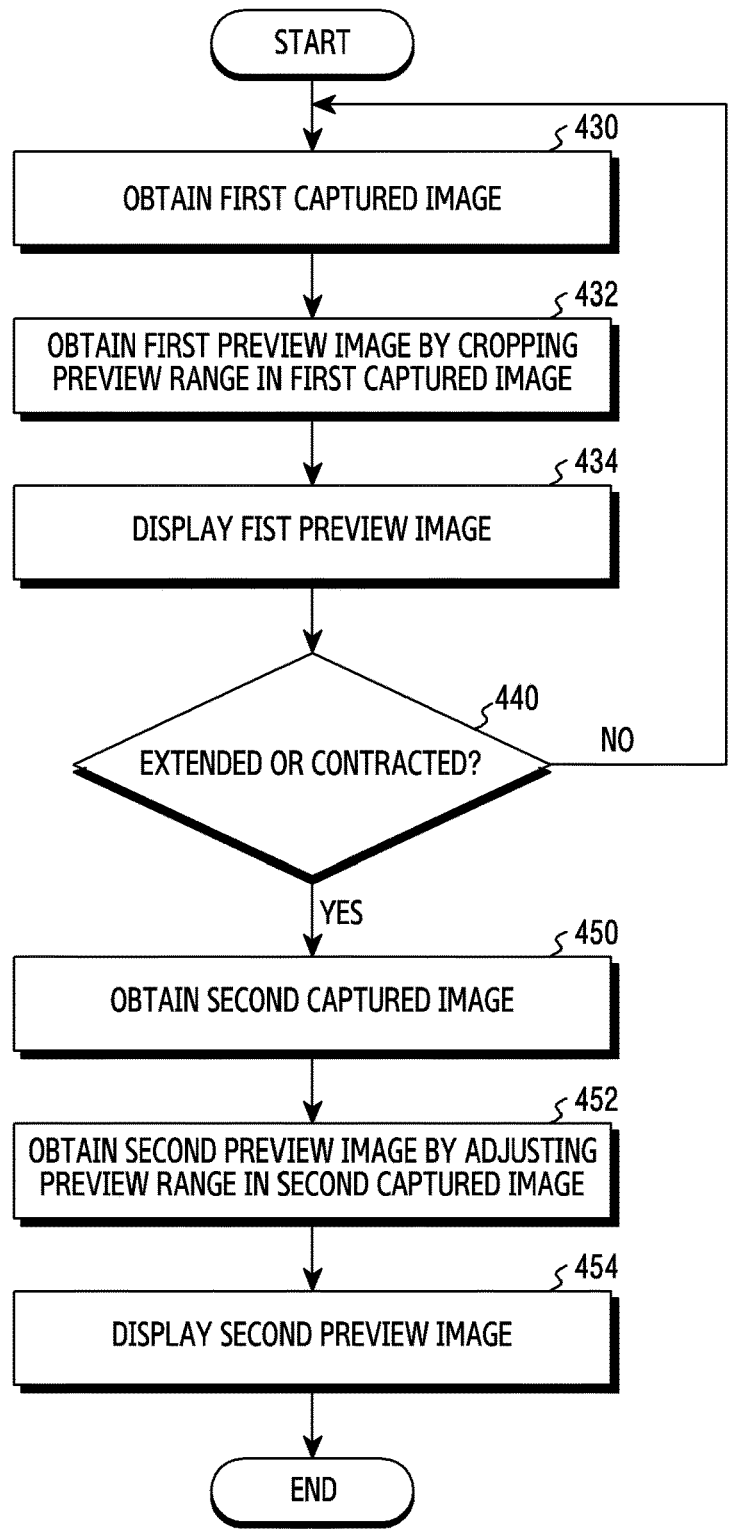
FIG. 4B is a flowchart illustrating a preview control method of an electronic device according to an embodiment of the disclosure.

FIG. 4B is a flowchart illustrating a preview control method of an electronic device according to an embodiment of the disclosure. FIG. 4B may include at least some of the operations of FIG. 4A. For example, operation 440 of FIG. 4B may correspond to operation 410 of FIG. 4A. Operations 450 and 452 of FIG. 4B may correspond to operation 415. Operation 454 may correspond to operation 420.

A default preview range in a captured image of a camera, which is a range used for a preview, may be adjusted (or changed) to an updated preview range by the preview control method illustrated in FIG. 4B.

Operations 430, 432, and 434 may be performed in a first state (e.g., a pre-extension state) before a lens assembly 232 of the camera is moved.

In operation 430, the processor 220 may obtain a first captured image via the camera. In operation 432, the processor 220 may obtain a first preview image by cropping a first preview range (default preview range) in the first captured image. In operation 434, the processor 220 may display a first preview screen including the first preview image on a flexible display 210.

In operation 440, the processor 220 may detect a movement (e.g., sliding or rolling) of the flexible display 210 for changing (e.g., increasing or reducing) the size of a display area through at least one sensor (e.g., the sensor module 240). For example, the processor 220 may detect a display area extension event according to extension of the display 210 or a display area contraction event according to contraction of the display 210.

As the lens assembly 232 of the camera is moved in combination with the movement of the flexible display 210, the electronic device 200 may be switched from the first state to a second state.

Operations 450, 452, and 454 may be performed in the second state (e.g., a post-extension state) after the lens assembly 232 of the camera is moved.

When the movement of the flexible display 210 for changing the size of the display area is not detected (No in operation 440), the first preview screen being displayed may be maintained as the first preview screen is without adjusting the preview range.

When the movement of the flexible display 210 for changing the size of the display area is detected (Yes in operation 440), the processor 220 may obtain a second captured image in operation 450.

In operation 452, the processor 220 may adjust the first preview range in the second captured image obtained by the camera to a second preview range as the lens assembly 232 of the camera is moved in combination with the movement of the flexible display 210. By adjusting the preview range, the pre-designated first preview range (or default preview range) may be changed to the second preview range (or updated preview range). The processor 220 may obtain a second preview image by cropping the second preview range in the second captured image.

In operation 454, the processor 220 may display a second preview screen including the obtained second preview image on the flexible display 210.

Figure 4C:
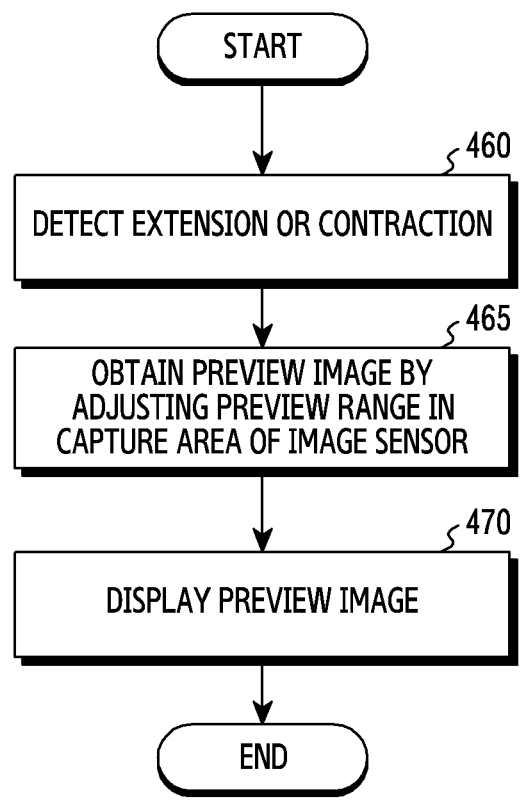
FIG. 4C is a flowchart illustrating a preview control method of an electronic device according to an embodiment of the disclosure.

FIG. 4C is a flowchart illustrating a preview control method of an electronic device according to an embodiment of the disclosure.

Referring to FIG. 4C, the preview control method according to the embodiment may include operation 460, operation 465, and operation 470. For convenience, each operation is assumed to be performed by the processor 220 of the electronic device 200.

A preview range for a capture area may be adjusted by the preview control method illustrated in FIG. 4C. The preview range may refer to a range in the capture area (or sensing area) of a camera (or the image sensor 234 in the camera) that is used for a preview.

In operation 460, the processor 220 may detect a movement (e.g., sliding or rolling) of a flexible display 210 for changing (e.g., increasing or reducing) the size of a display area through at least one sensor (e.g., the sensor module 240). For example, the processor 220 may detect a display area extension event according to extension of the display 210 or a display area contraction event according to contraction of the display 210.

In operation 465, the processor 220 may adjust the preview range in the capture area of the image sensor 234 as a lens assembly 232 of the camera is moved in connection with the movement of the flexible display 210. The processor 220 may adjust the preview range in the capture area, based on the movement of the flexible display 210. The processor 220 may obtain a preview image corresponding to the adjusted preview range.

By adjusting the preview range, a first preview range (or default preview range) may be adjusted (or changed) to a second preview range (or updated preview range). For example, the second preview range may be obtained by moving the first preview range in the capture area. For example, the second preview range may be obtained by moving the first preview range by an offset corresponding to (e.g., the same as or proportional to) a moving distance of the flexible display 210 according to a moving direction of the flexible display 210. The size (and/or ratio) of the second preview range may correspond to (e.g., be the same as) the size (and/or ratio) of the first preview range.

In operation 470, the processor 220 may display the obtained preview image on the flexible display 210.

Figure 4D:
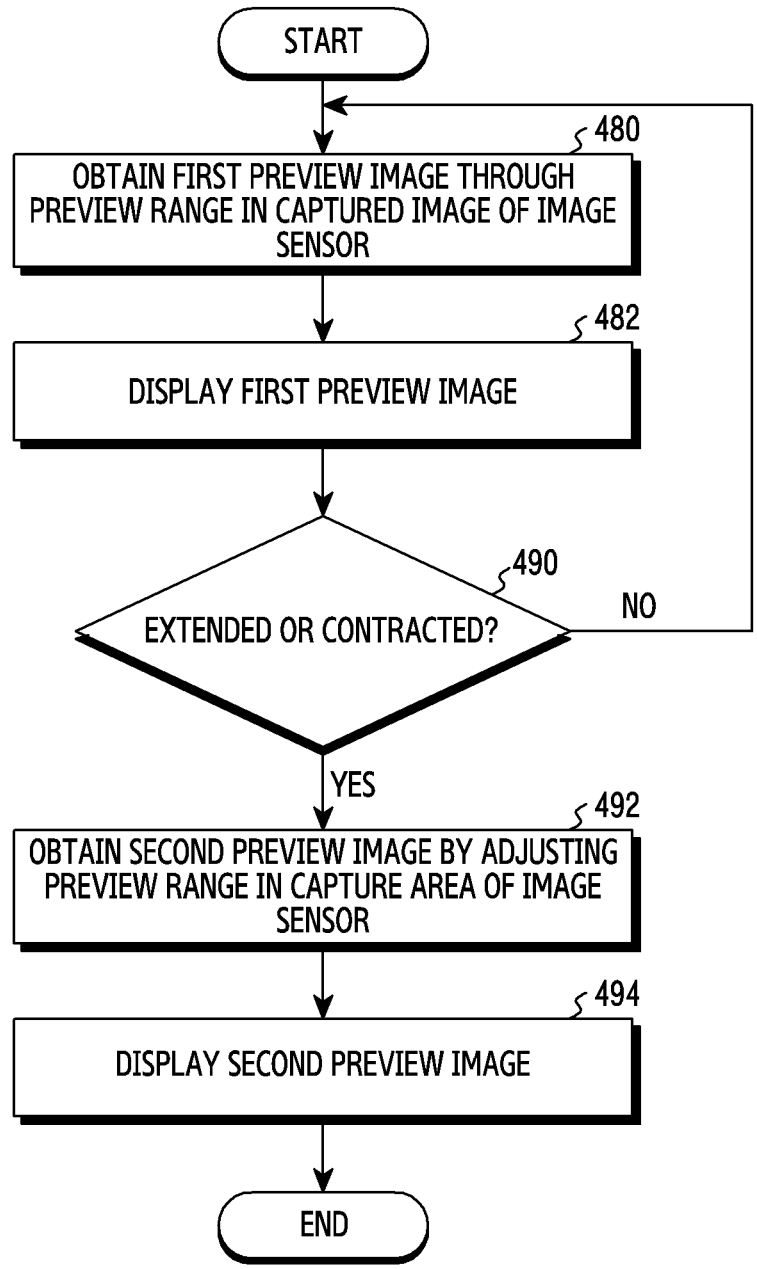
FIG. 4D is a flowchart illustrating a preview control method of an electronic device according to an embodiment of the disclosure.

FIG. 4D is a flowchart illustrating a preview control method of an electronic device according to an embodiment of the disclosure. FIG. 4D may include at least some of the operations of FIG. 4C. For example, operation 490 of FIG. 4D may correspond to operation 460 of FIG. 4C. Operation 492 of FIG. 4D may correspond to operation 465. Operation 494 may correspond to operation 470.

A first preview range (default preview range), which is a range in a capture area of an image sensor 234 used for a preview, may be adjusted (or changed) to a second preview range (or updated preview range) by the preview control method illustrated in FIG. 4D.

Operations 480 and 482 may be performed in a first state (e.g., a pre-extension state) before a lens assembly 232 of the camera is moved.

In operation 480, the processor 220 may obtain a first preview image corresponding to the first preview range through the first preview range in the capture area of the image sensor 234.

In operation 482, the processor 220 may display a first preview screen including the first preview image on the flexible display 210.

In operation 490, the processor 220 may detect a movement (e.g., sliding or rolling) of a flexible display 210 for changing (e.g., increasing or reducing) the size of a display area through at least one sensor (e.g., the sensor module 240). For example, the processor 220 may detect a display area extension event according to extension of the display 210 or a display area contraction event according to contraction of the display 210.

As the lens assembly 232 of the camera is moved in combination with the movement of the flexible display 210, the electronic device 200 may be switched from the first state to a second state.

Operations 492 and 494 may be performed in the second state (e.g., a post-extension state) after the lens assembly 232 of the camera is moved.

When the movement of the flexible display 210 for changing the size of the display area is not detected (No in operation 490), the first preview screen being displayed may be maintained as the first preview screen is without adjusting the preview range.

When the movement of the flexible display 210 for changing the size of the display area is detected (Yes in operation 490), the processor 220 may perform operation 492.

In operation 492, the processor 220 may adjust the preview range in the capture area of the image sensor 234, based on the movement of the flexible display 210. By adjusting the preview range, the pre-designated first preview range (or default preview range) may be changed to the second preview range (or updated preview range). The processor 220 may obtain a second preview image corresponding to the second preview range.

In operation 494, the processor 220 may display a second preview screen including the obtained second preview image on the flexible display 210.

Figure 5A:
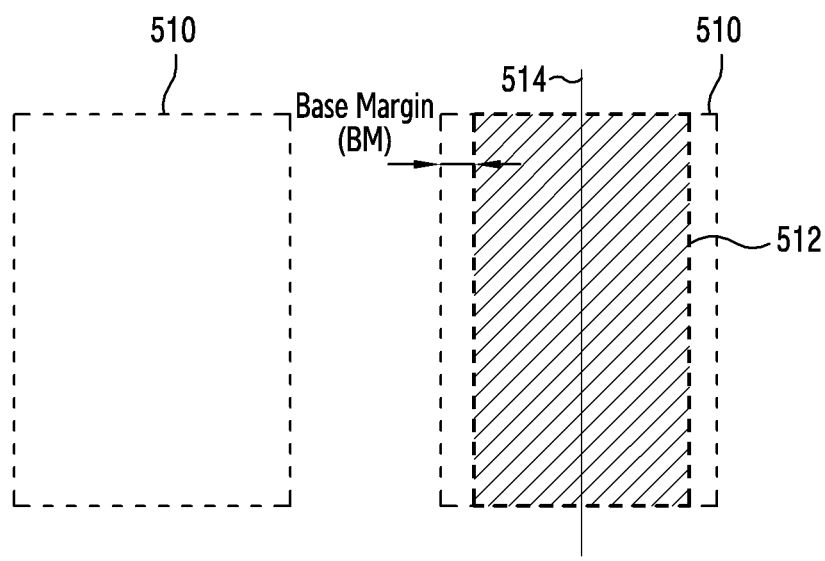
FIG. 5A illustrates an example of a method for adjusting a preview range in an electronic device according to an embodiment of the disclosure.
Figure 5B:
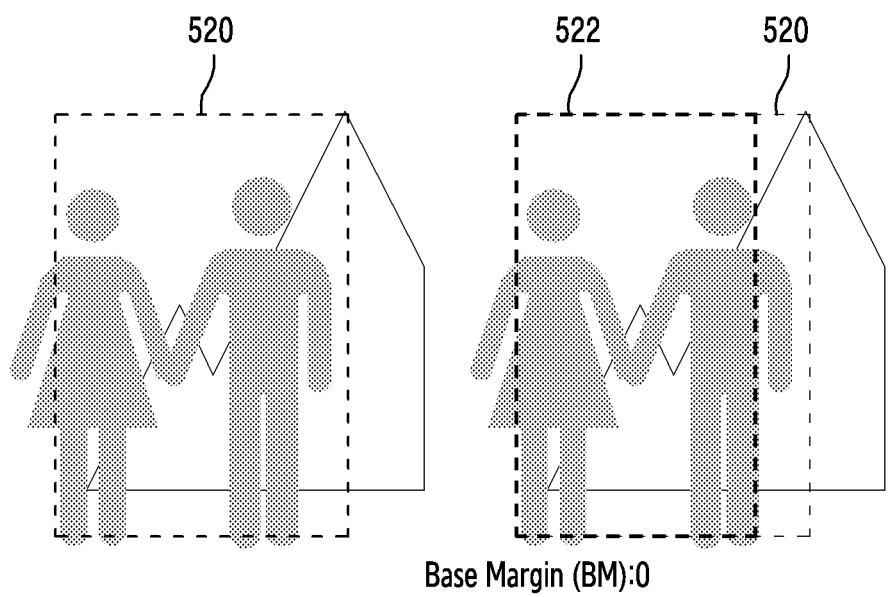
FIG. 5B illustrates an example of a method for adjusting a preview range in an electronic device according to an embodiment of the disclosure.

FIGS. 5A and 5B illustrate examples of a method for adjusting a preview range in an electronic device 200 which are for describing a preview range adjustment method based on an overlapping area before and after movement of a camera according to various embodiments of the disclosure. FIG. 5A illustrates a preview range adjustment method using a reference line (e.g., a centerline). FIG. 5B illustrates a preview range adjustment method for preservation of content (e.g., an object).

A preview range may be designated in advance in the electronic device 200. The designated preview range may be a default preview range. For example, an effective area of an entire capture area sensable by an image sensor 234 of a camera excluding an outer area may be designated as the preview range. In another example, an effective area of a captured image obtained by the image sensor 234 of the camera excluding an outer area may be designated as the preview range.

When movement of the camera (or a lens assembly 232 of the camera) occurs in connection with a movement (e.g., a sliding movement) of a flexible display 210 in the electronic device 200, the electronic device 200 may adjust the designated preview range in consideration of the movement of the camera.

The electronic device 200 may adjust the preview range, based on an overlapping area before and after the movement of the camera.

To adjust the preview range, a base margin (BM) may be defined in the overlapping area. An outer area of the overlapping area may be an unavailable area in which a distortion occurs or is added. The adjusted preview range may be an updated preview range. Only an effective area of the overlapping area excluding the unavailable area may be configured as the updated preview range by using the base margin (BM).

Referring to FIG. 5A, an updated preview range 512 may be positioned in the center of an overlapping area 510 before and after the movement of the camera.

FIG. 5A illustrates adjustment of a preview range using a centerline 514 of the overlapping area 510. In an example of FIG. 5A, reference numeral 510 is the overlapping area. Reference numeral 512 is the adjusted preview range (or updated preview range). Reference numeral 514 is the centerline. The centerline may be a centerline of the overlapping area 510 and the updated preview range 512. The electronic device 200 may adjust the pre-designated preview range (or default preview range) so that the updated preview range 512 may be positioned in the center of the overlapping area 510.

Referring to FIG. 5B, an updated preview range 522 for preserving content may be configured. In an example of FIG. 5B, reference numeral 520 is an overlapping area before and after the movement of the camera. Reference numeral 522 is an example of the adjusted preview range (or updated preview range).

As illustrated in FIG. 5B, the electronic device 200 may configure the updated preview range 522 for preserving the content in the overlapping area 520. For example, the electronic device 200 may configure the position of the updated preview range 522 in the overlapping area 520 to correspond to the number and/or a display state of an object(s) included in a default preview range in a first capture area (e.g., a capture area before extension or movement of the camera). For example, the electronic device 200 may configure a base margin (BM) to 0 to preserve the content so that a reference point (e.g., a start point) of the updated preview range 522 may match a reference point of the overlapping area 520.

For example, the electronic device 200 may adjust the preview range by configuring the base margin (BM) in the overlapping area (e.g., 510 and 520). Any base margin (BM) may be configured based on the following aspects.

First, as illustrated in FIG. 5A, a base margin (BM) may be configured so that an updated preview range (e.g., 512) is positioned in the center of an overlapping area (e.g., 510).

Second, as illustrated in FIG. 5B, a base margin (BM) may be configured so that an updated preview range (e.g., 522) for preserving content is configured in an overlapping area (e.g., 520). For example, a base margin (BM) may be configured so that an area including a largest number of object(s) in an overlapping area (e.g., 520) is included in an updated preview range. For example, a base margin (BM) may be configured to secure a maximum number of objects and/or a maximum object display area.

Third, an updated preview range in an overlapping area may be more elaboratively configured by combining the methods of FIGS. 5A and 5B so that the updated preview range is positioned in the center of an overlapping area, in which preservation of an object is comprehensively taken into consideration.

Figure 6A:
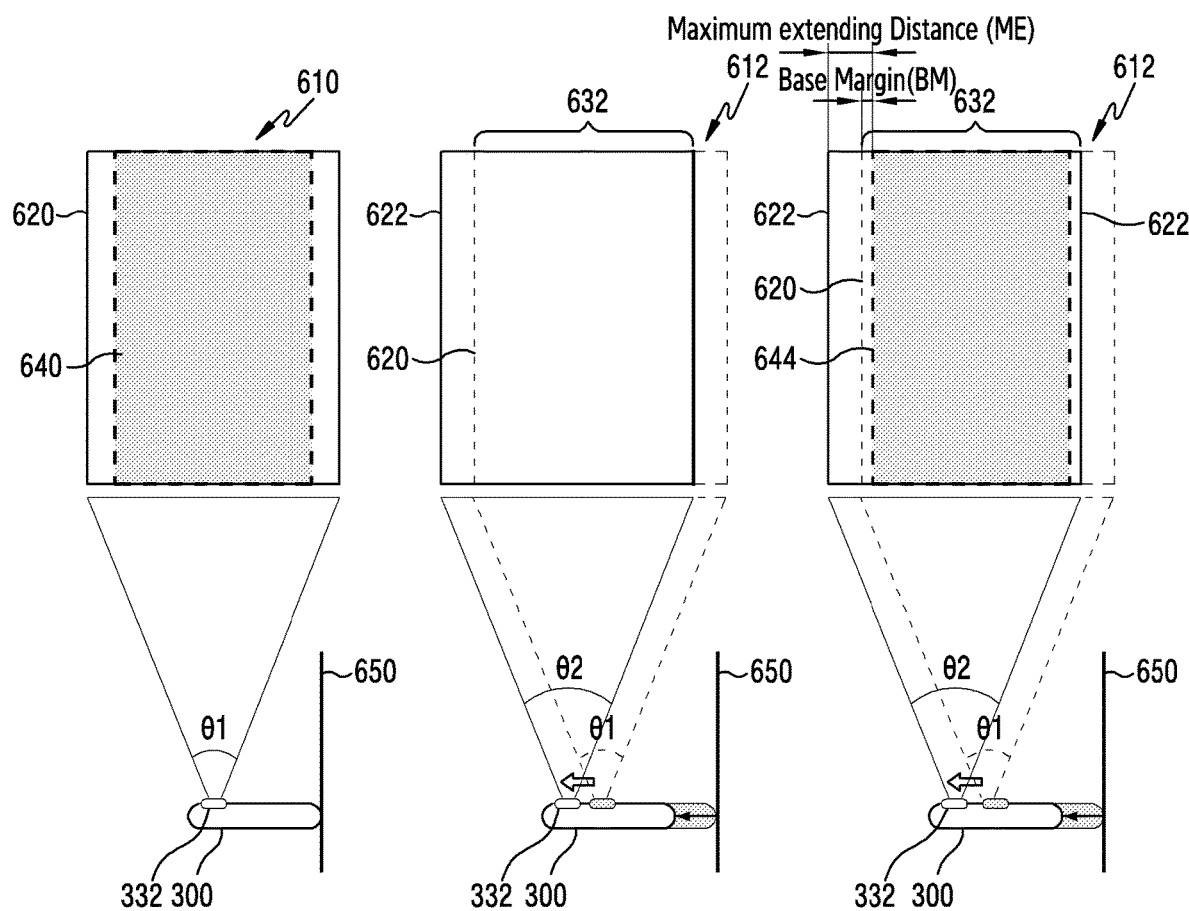
FIG. 6A illustrates an example of a method for adjusting a preview range according to movement of a camera in an electronic device according to an embodiment of the disclosure.
Figure 6B:
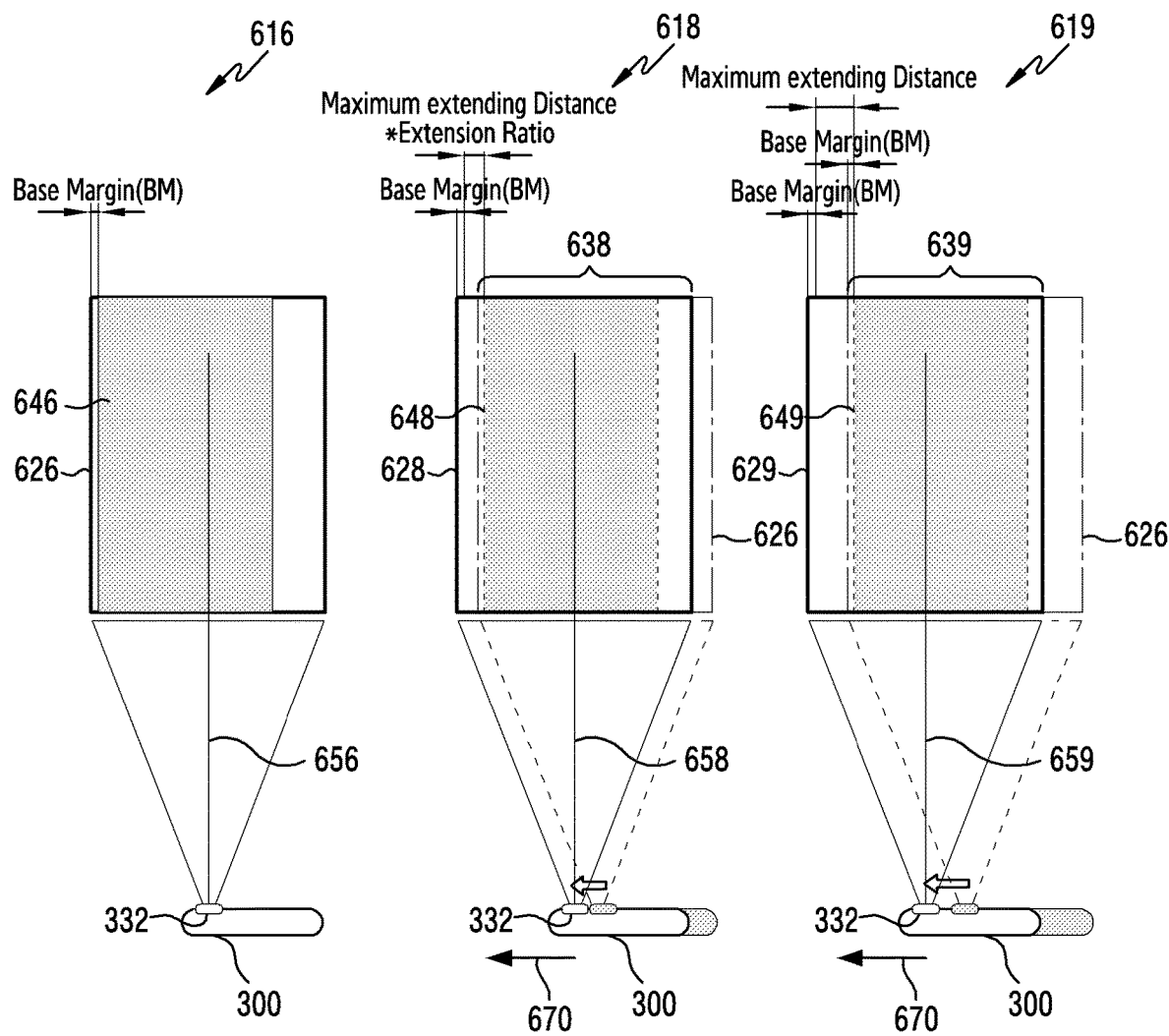
FIG. 6B illustrates an example of a method for adjusting a preview range according to movement of a camera in an electronic device according to an embodiment of the disclosure.
Figure 7:
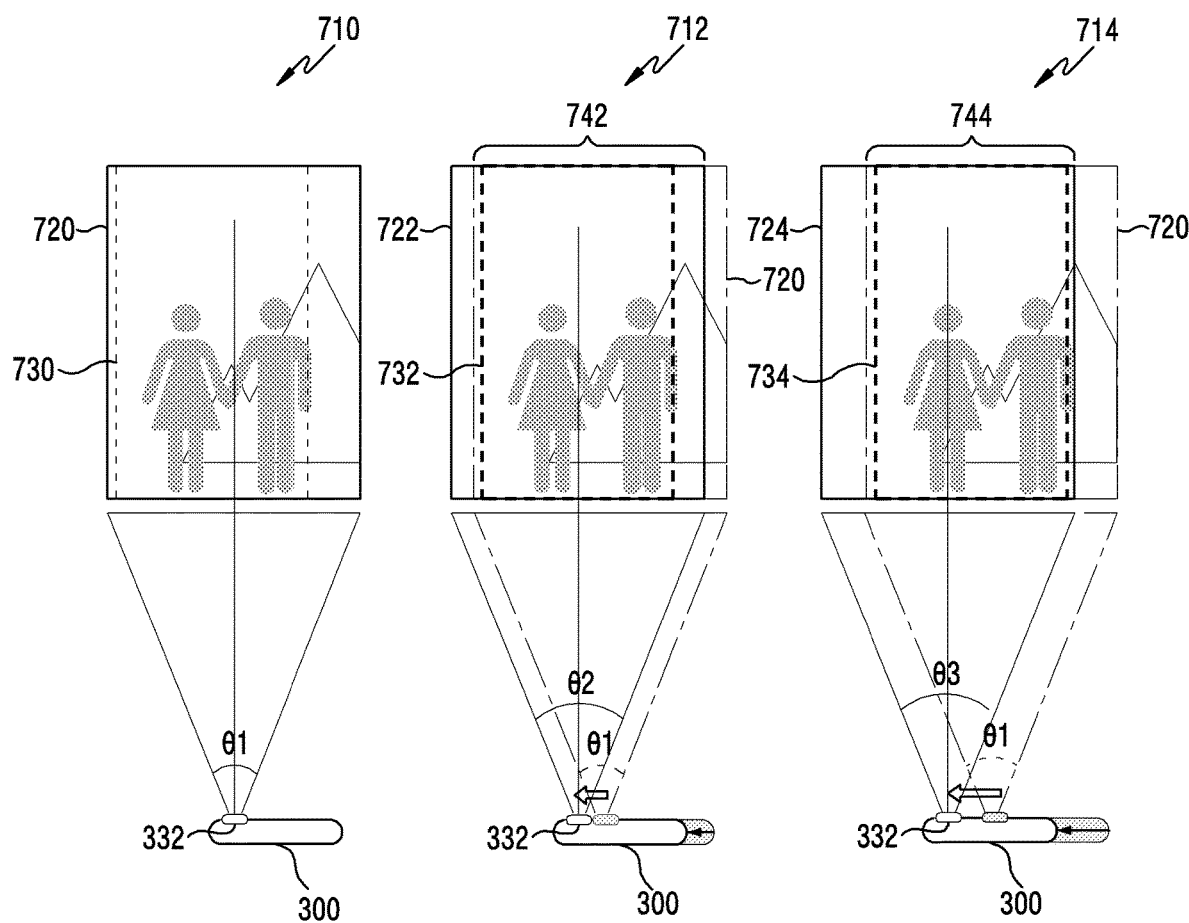
FIG. 7 illustrates an example of a method for adjusting a preview range according to movement of a camera in an electronic device according to an embodiment of the disclosure.

FIGS. 6A, 6B, and 7 illustrate examples of a method for adjusting a preview range according to movement of a camera in an electronic device according to various embodiments of the disclosure.

Although FIGS. 6A, 6B, and 7 illustrate methods for adjusting a preview range, based on an overlapping are between capture areas before and after the movement of the camera, a method for adjusting a preview range, based on an overlapping area between captured images before and after the movement of the camera is also possible. In descriptions of FIGS. 6A, 6B, and 7, the movement of the camera may refer to movement of a lens assembly 332.

Referring to FIG. 6A, reference numeral 610 is a first state (e.g., a pre-extension state of the electronic device 300) before the lens assembly 332 of the camera is moved. Reference numeral 612 is a second state (e.g., a post-extension state of the electronic device 300) after the lens assembly 332 of the camera is moved. Reference numeral 620 is a first capture area of the camera in the first state. Reference numeral 622 is a second capture area in the second state. The first capture area 620 may correspond to a first view angle $\theta 1$. The second capture area 622 may correspond to a second view angle $\theta 2$.

Reference numeral 640 is an example of a first preview range. Reference numeral 644 is an example of a second preview range.

A preview range may be adjusted according to the movement of the camera. The first preview range 642 may be changed to the second preview range 644 by adjusting the preview range.

As illustrated, physical movement of the camera may occur according to extension or contraction of the electronic device 300. The movement of the camera may change the position of the camera, and thus a capture area may be changed from the first capture area 620 corresponding to the first view angle θ1 to the second capture area 622 corresponding to the second view angle θ2.

The electronic device 300 may be extended to one direction (e.g., one side in the horizontal direction) by a sliding movement. The extension of the electronic device 300 may refer to extension of a flexible display 310 or extension of a display area. The camera of the electronic device 300 may be moved in connection with a movement (e.g., sliding) of the flexible display 310. As the camera moves, the view angle of the camera may be changed. θ1 represents the first view angle of the camera before the movement. θ2 represents the second view angle of the camera 332 after the movement.

In the first state 610 (e.g., the pre-extension state of the electronic device 300) before the movement of the lens assembly 332 of the camera, the first capture area of the camera may correspond to the first view angle θ1. The first capture area corresponding to the first view angle θ1 may be sensed by an image sensor (e.g., the image sensor 234) of the camera. A first captured image corresponding to the first view angle θ1 may be obtained through the first capture area.

In the second state 612 (e.g., the post-extension state of the electronic device 300) after the movement of the lens assembly 332 of the camera, the second capture area 622 of the camera may correspond to the second view angle θ2. The second capture area 622 corresponding to the second view angle θ2 may be sensed by the image sensor (e.g., the image sensor 234) of the camera. A second captured image corresponding to the second view angle θ2 may be obtained through the second capture area 622. Reference numeral 632 represents an example of an overlapping area between the first capture area 620 and the second capture area 622. At least part of the overlapping area 632 may be used as a preview.

Due to the movement of the camera, the capture area of the camera may be changed from the first capture area 620 to the second capture area. In this case, the electronic device 300 may adjust the preview range to be included in the overlapping area 632 between the two capture areas. The preview range may be adjusted, thereby configuring a second preview range 644. A central area in the overlapping area 632 before and after the movement of the camera may be configured as the second preview range 644.

Reference numeral 650 is an example of a reference line (e.g., a y-axis reference line passing through an x-axis reference point). As illustrated, when the display area of the electronic device 300 is extended to the one side in the horizontal direction, the other end of the display area may be the reference line. The reference line may be fixed regardless of the extension of the display area.

For example, the second preview range 644 may be defined using one or more of a base margin (BM), a maximum extending distance (ME) of the flexible display 310, or an extension ratio (current extension ratio) of the flexible display 310. A gap between a reference point (e.g., a start point) of the overlapping area 632 and a reference point (e.g., a start point) of the second preview range 644 may be defined by the base margin (BM). The second preview range 644 may be adjusted to be positioned within a range that does not exceed the maximum extending distance.

The electronic device 300 may adjust the preview range, based on the movement of the flexible display 310 (e.g., at least any one of whether the flexible display 310 is moved, a moving direction, a moving distance, and a moving ratio), thereby configuring the second preview range 644 in the overlapping area 632.

For example, the second preview range 644 may be configured to be positioned in the center of the overlapping area 632. The overlapping area may include an outer area (unavailable area) of the second capture area 622. The base margin (BM) may be configured to exclude the outer area from the second preview range 644. Only an effective area (or central area) of the second capture area 622 excluding the outer area according to the base margin (BM) may be configured as the second preview range 644.

Referring to FIG. 6B, a method for adjusting a preview range using a base margin (BM), a maximum extending distance (ME), and an extension ratio R is illustrated.

To adjust a preview range, any base margin (BM) may be defined within overlapping areas 638 and 639 before and after movement of a camera. An outer area of a capture area may be an unavailable area in which a distortion occurs or is added. The preview range may be adjusted using the base margin (BM) to include only an effective area excluding the unavailable area.

When the movement of the camera occurs according to movement of a flexible display 310, the electronic device 300 may configure a base margin (BM) in an overlapping area before and after the movement of the camera, based on at least one of a moving direction, a moving distance, and a moving ratio of the flexible display 310, thereby adjusting the preview range.

In an example of FIG. 6B, reference numeral 616 is a first state (e.g., a pre-extension state of the electronic device 300) before the lens assembly 332 of the camera is moved. Reference numeral 626 is a first capture area in the first state 616. Reference numeral 646 is a first preview range in the first state 616. Reference numeral 656 is a centerline of the first capture area 626. As illustrated, reference numeral 656 may be a y-axis centerline passing through an x-axis center point of the first capture area 626.

Reference numeral 618 is a second state (e.g., an in-extension state of the electronic device 300) in which the lens assembly 332 of the camera is being moved. Reference numeral 628 is a second capture area in the second state 618. Reference numeral 638 is an overlapping area between the first capture area 626 and the second capture area 628. Reference numeral 648 is a second preview range in the second state 618. Reference numeral 658 is a centerline of the second capture area 628.

Reference numeral 619 is a third state (e.g., a post-extension state of the electronic device 300) after the lens assembly 332 of the camera is moved. Reference numeral 629 is a third capture area in the third state 619. Reference numeral 639 is an overlapping area between the first capture area 626 and the third capture area 629. Reference numeral 649 is a third preview range in the third state 619. Reference numeral 659 is a centerline of the third capture area 629.

As the lens assembly 332 of the camera moves, a capture area of the camera may be changed from the first capture area 626 to the second capture area 628, and from the second capture area 628 to the third capture area 629.

The electronic device 300 may adjust (or change) the preview range in consideration of the movement of the camera. According to the movement of the camera, the preview range may be changed from the first preview range 646 to the second preview range 648, and from the second preview range 648 to the third preview range 649.

When a central area of the first capture area 626 is configured in advance as a default preview range, the electronic device 300 may adjust the default preview range to be off the center of the first capture area 626 and to lean to one direction. As illustrated, the default preview range may be changed to the first preview range 646 positioned to lean to the one direction (e.g., left) from the center of the first capture area 626. The one direction may be the same direction (e.g., left) as an extending direction 670 of the electronic device 300.

When a mechanical state of the electronic device 300 is changed from the first state 616 to the second state 618, and from the second state 618 to the third state 619, the preview range may be adjusted to move in an opposite direction of the extending direction 670 of the electronic device 300 within the overlapping areas 638 and 639 before and after the movement of the camera. By adjusting the preview range, the first preview range 646 may be changed to the second preview range 648, and the second preview range 648 may be changed to the third preview range 649. The second preview range 648 may be adjusted to be included in the overlapping area between the first capture area 626 and the second capture area 628. The third preview range 649 may be adjusted to be included in the overlapping area between the first capture area 626 and the third capture area 629.

When the camera moves as the electronic device 300 is extended, the overlapping area (e.g., the overlapping area 639 between the first capture area 626 and the third capture area 629) before and after the movement of the camera may be positioned to lean to one side (e.g., a right side) of the capture area (e.g., the third capture area 629). When the overlapping area leans to the one side in the capture area, the unavailable area (e.g., an outer area of the third capture area 629) may be included in the preview range selected in the overlapping area, thus causing a distortion.

To reduce a distortion due to the leaning overlapping area, the electronic device 300 may move the first preview range 646 in the opposite direction of the extending direction 670 (e.g., one side in the horizontal direction) of the electronic device 300, thereby adjusting (or changing) the first preview range 646 to the second preview range 648 or the third preview range 649. The second preview range 648 or the third preview range 649 may be an updated preview range.

To configure the second preview range 648, the electronic device 300 may configure a base margin (BM) in the overlapping area 638 between the first capture area 626 and the second capture area 628. Further, to configure the third preview range 649, the electronic device 300 may configure a base margin (BM) in the overlapping area 639 between the first capture area 626 and the third capture area 629.

The base margin (BM) may be a value for designating an outer area excluded from the preview range in the overlapping area 638 or 639. Using the base margin (BM), the updated preview range 648 or 649 may be configured. A reference point (e.g., an x-axis reference point) of the updated preview range 648 or 649 may be configured using the base margin (BM).

FIG. 6B illustrate the preview ranges 646, 648, and 649 changed as the electronic device 300 having the extending direction 670 that is the horizontal direction is gradually extended to be switched to the first state 616 (e.g., the pre-extension state or the state before the movement of the camera), the second state 618 (e.g., the in-extension sate or a state in which the camera is being moved), and the third state 619 (e.g., the post-extension state or the state after the movement of the camera).

For example, the reference point (e.g., the x-axis reference point) of the preview range may be changed according to the movement of the camera. The reference point (e.g., the x-axis reference point) of the preview range may be a start point of the preview range within the overlapping area (e.g., 638 or 639).

When defining an x-axis reference point as X, a base margin as Base Margin, a maximum extending distance as Max Extension, and an extension ratio as Ratio (%), the x-axis reference point of the preview range in each state is as follows.

First, an x-axis reference point of the first preview range 646 in the first capture area 626 in the first state 616 may be represented by "X=Base Margin".

Second, an x-axis reference point of the second preview range 648 in the second capture area 628 in the second state 618 may be represented by "X=Base Margin+(Max Extension*Ratio (%))".

Third, an x-axis reference point of the third preview range 649 in the third capture area 629 in the third state 619 may be represented by "X=Base Margin+Max Extension".

The extension ratio may be a ratio of how much the flexible display 310 (or display area) of the electronic device 300 has been extended. The maximum extending distance may refer to a moving distance (e.g., a maximum sliding distance) according to maximum extension of the flexible display 310. The extension ratio and/or the maximum extending distance may be based on an extension-completed state (or maximum extension state) of the flexible display 310. The extension ratio and/or the maximum extending distance may be detected by at least one sensor (e.g., the sensor module 240) included in the electronic device 300. The maximum extending distance may be stored in advance.

In the first state 616, a base margin (BM) for configuring the first preview range 646 may be designated. The reference point (e.g., a start point) of the first preview range 646 may be configured by the base margin (BM). The first preview range 646 may be configured to lean to one side (e.g., left) of the first capture area 626 by the base margin (BM).

In the second state 618, the preview range may be adjusted based on the overlapping area 638 between the first capture area 626 and the second capture area 628. A central area of the overlapping area 638 between the two capture areas 626 and 628 excluding an outer area may be configured as the second preview range 648. The outer area may be configured based on the base margin (BM), the maximum extending distance (ME), and the extension ratio. The outer area may be an area corresponding to "base margin (BM)+{maximum extending distance (ME)*extension ratio}". The maximum extending distance (ME) may be a maximum extension distance of the flexible display 310 (or display area). The extension ratio may be the extension ratio (current extension ratio) of the flexible display 310 (or display area).

In the third state 619, the preview range may be adjusted based on the overlapping area 639 between the first capture area 626 and the third capture area 629. The third preview range 649 may be a central area of the overlapping area 639 between the two capture areas 626 and 629 excluding an outer area. The outer area may be an area corresponding to "base margin (BM)+maximum extending distance (ME)".

As described above, the default preview range (e.g., the first preview range 646) may be positioned in a direction matching a moving direction of the camera and may be adjusted according to the movement of the camera, thereby configuring the updated preview range (e.g., the second preview range 648 or the third preview range 649). Accordingly, even though the overlapping area between the capture areas (e.g., 626 and 628 or 626 and 629) before and after the movement of the camera is gradually reduced as the electronic device 300 is gradually extended, it is possible to prevent a distortion caused by inclusion of the outer area of the capture area (e.g., 628 or 629) in the updated preview range (e.g., 648 or 649) selected in the overlapping area and to maintain the quality of a preview.

Further, the updated preview range (e.g., 648 or 649) may be configured in consideration of the movement of the camera by using the base margin (BM), the maximum extending distance (ME), and the extension ratio. The position of the preview range (e.g., 648 or 649) may be adjusted in the opposite direction of the moving direction of the camera (e.g., the extending direction of the electronic device 300), based on the movement of the camera, thereby compensating for discontinuous changes on a preview screen according to the movement of the camera.

Referring to FIG. 7, reference numeral 710 is a first state (e.g., a pre-extension state of the electronic device 300) before the lens assembly 332 of the camera is moved. Reference numeral 720 is a first capture area in the first state 710. Reference numeral 730 is a first preview range in the first state 710. An area of the first capture area 720 excluding a base margin (BM) may be configured as the first preview range 730. As illustrated, the first preview range 730 may be configured to lean to one direction (e.g., an extending direction of the electronic device 300), based on the center of the first capture area 720.

Reference numeral 712 is a second state (e.g., an in-extension state of the electronic device 300) in which the lens assembly 332 of the camera is being moved. Reference numeral 722 is a second capture area in the second state 712. Reference numeral 732 is a second preview range in the second state 712. For example, an area of an overlapping area 742 between the first capture area 720 and the second capture area 722 excluding an outer area may be configured as the second preview range 738. The outer area may be designated by "base margin (BM)+(maximum extending direction (ME)*extension ratio)".

Reference numeral 714 is a third state (e.g., an extension-completed state of the electronic device 300) after the lens assembly 332 of the camera is moved. Reference numeral 724 is a third capture area. Reference numeral 734 is a third preview range in the third state 714. For example, an area of an overlapping area 744 between the first capture area 720 and the third capture area 724 excluding an outer area may be configured as the third preview range 734. The outer area may be an area corresponding to "base margin (BM)+ maximum extending direction (ME)".

As the electronic device 300 is extended, a preview range (e.g., 730, 732, and 734) may be adjusted, thereby sequentially displaying preview images according to the adjusted preview range on a preview screen of the electronic device 300.

The preview range may be adjusted in consideration of the movement of the camera, thereby maintaining the sameness and/or continuity of preview screens. Even though the camera moves according to the movement (e.g., sliding movement) of the electronic device 300, a certain preview screen may be maintained. For example, even though the electronic device 300 is extended while using the camera (e.g., while taking a video), the preview range may be adjusted to continue photographing (or capturing) of the same position, thereby improving usability of the camera or user experience.

Figure 8:
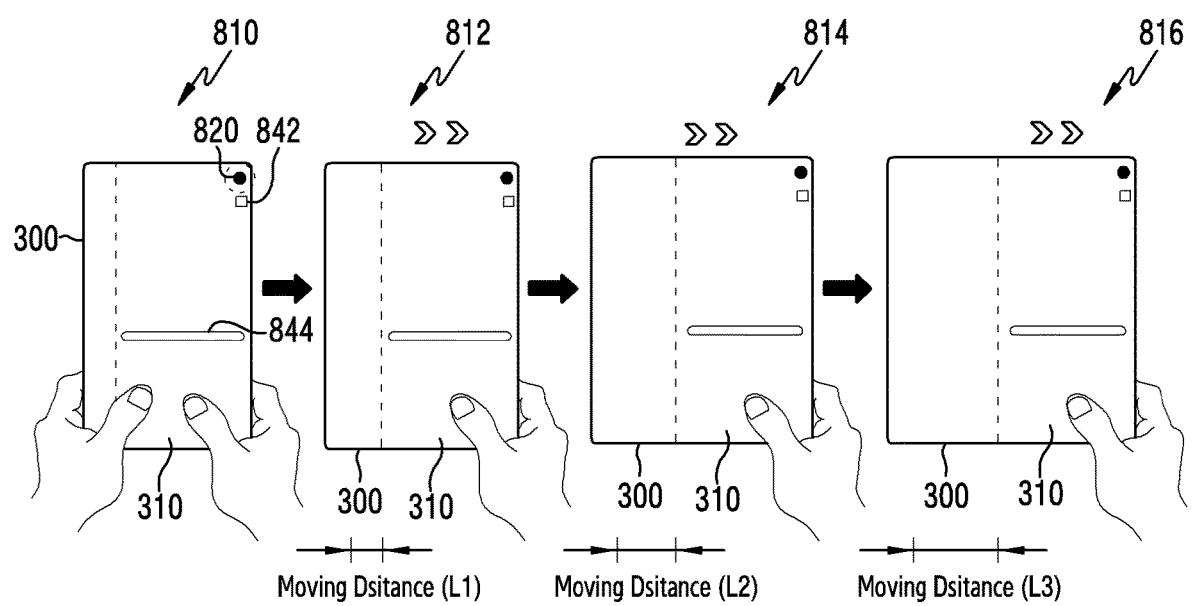
FIG. 8 illustrates an example of a method for detecting a moving distance of a flexible display in an electronic device according to an embodiment of the disclosure.

FIG. 8 illustrates an example of a method for detecting a moving distance of a flexible display in an electronic device according to an embodiment of the disclosure.

Referring to FIG. 8, reference numeral 810 is a pre-extension state of the electronic device 300 (or a pre-movement state of a camera). Reference numeral 812 and reference numeral 814 are an in-extension state of the electronic device 300 (or an in-movement state of the camera). Reference numeral 816 is an extension-completed state of the electronic device 300 (or a movement-completed state of the camera).

Reference numeral 820 is a camera 820 (e.g., the lens assembly 232 of FIG. 2A). Reference numeral 842 is an acceleration sensor. Reference numeral 844 is a distance sensor. The acceleration sensor 842 and/or the distance sensor 844 may correspond to at least one sensor included in the sensor module 240 of FIG. 2A.

The electronic device 300 may detect a moving distance (e.g., a sliding distance or an extending or contracting distance) according to a change in mechanical state of the electronic device 300 by using the acceleration sensor 842 and/or distance sensor 844. For example, as a display area of the flexible display 310 is extended in the electronic device 300, the moving distance may gradually increase to L1, L2, and L3.

The camera 820 may move in connection with a movement (e.g., a slide-out or extension) of the flexible display 310. A moving direction, a moving distance, and a moving ratio of the camera 820 may correspond to (e.g., be the same as) a moving direction, a moving distance, and a moving ratio of the flexible display 310, respectively.

The electronic device 300 may determine a moving ratio (e.g., an extension ratio), based on the moving distance detected with the acceleration sensor 842 and/or the distance sensor 844. The electronic device 300 may adjust a preview range in a capture area of the camera 820, based on the moving ratio. According to various embodiments, although the moving distance of the electronic device 300 has been described as being detected with the acceleration sensor 842 and/or the distance sensor 844, the disclosure is not limited thereto. For example, the electronic device 300 may include a Hall sensor that detects a change in magnetism according to a movement of a housing (e.g., the housing 360 of FIGS. 3A to 3D) in the housing. The electronic device 300 may detect the moving distance of the flexible display 310 or the display area through the Hall sensor. Alternatively, the moving distance may be detected based on a movement of a sliding driving body (e.g., a motor). In addition, those skilled in the art will easily understand that any moving distance detection method using a physical change according to the movement of the housing 360 of the electronic device 300 may be applied to various embodiments of the disclosure.

Figure 9:
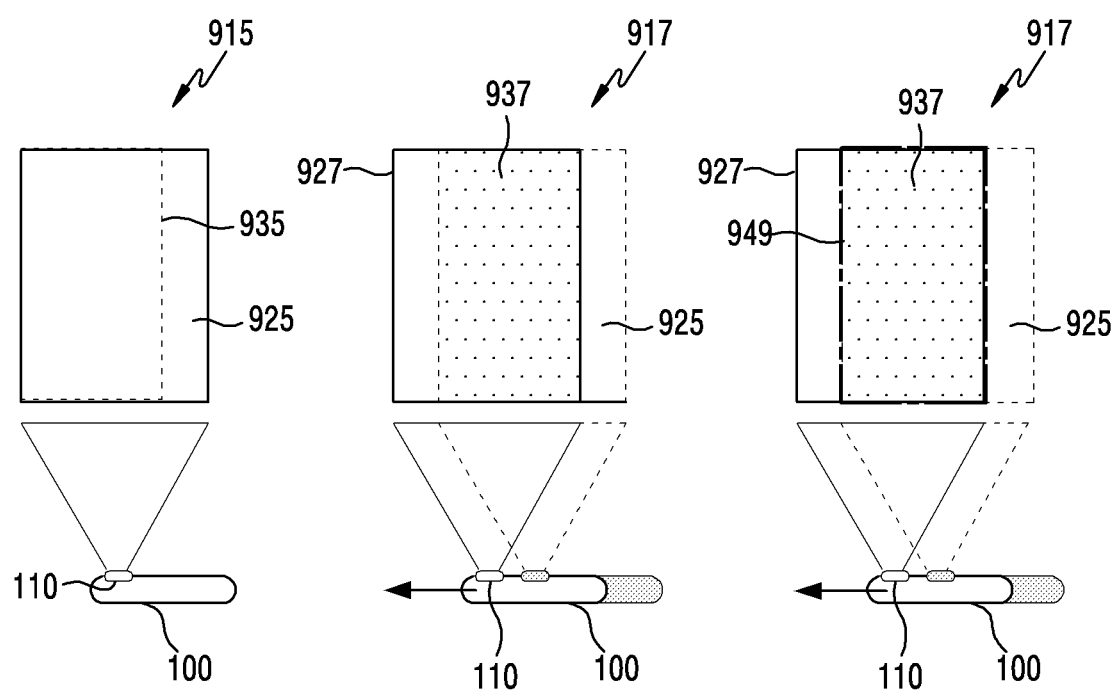
FIG. 9 illustrates an example of a fixed preview range in short-distance photographing in an electronic device according to an embodiment of the disclosure.

FIG. 9 illustrates an example of a fixed preview range in short-distance photographing in an electronic device according to an embodiment of the disclosure.

Reference numeral 915 is a pre-extension state of the electronic device 100 (state before movement of a camera 110). Reference numeral 917 is a post-extension state of the electronic device 100 (state after the movement of the camera 110). Reference numeral 925 is a first capture area in the pre-extension state 915. Reference numeral 935 is a first preview range in the pre-extension state 915. Reference numeral 927 is a second capture area in the post-extension state 917. Reference numeral 937 is an overlapping area between the first capture area 925 and the second capture area 927. Reference numeral 949 is a second preview range in the post-extension state 917.

In short-distance photographing, due to a short distance between the electronic device 100 and a subject, the overlapping area 937 between the first capture area 925 and the second capture area 927 may be smaller than the preview range 949. When the overlapping area 937 is smaller than a required preview range (e.g., the first preview range), even though the preview range is adjusted, the sameness and/or continuity of preview screens may not be maintained. For example, with a size and/or ratio (e.g., 16:9) designated for a preview, an image with the designated size and/or ratio or greater may not be obtained from the overlapping area 937.

Figure 10:
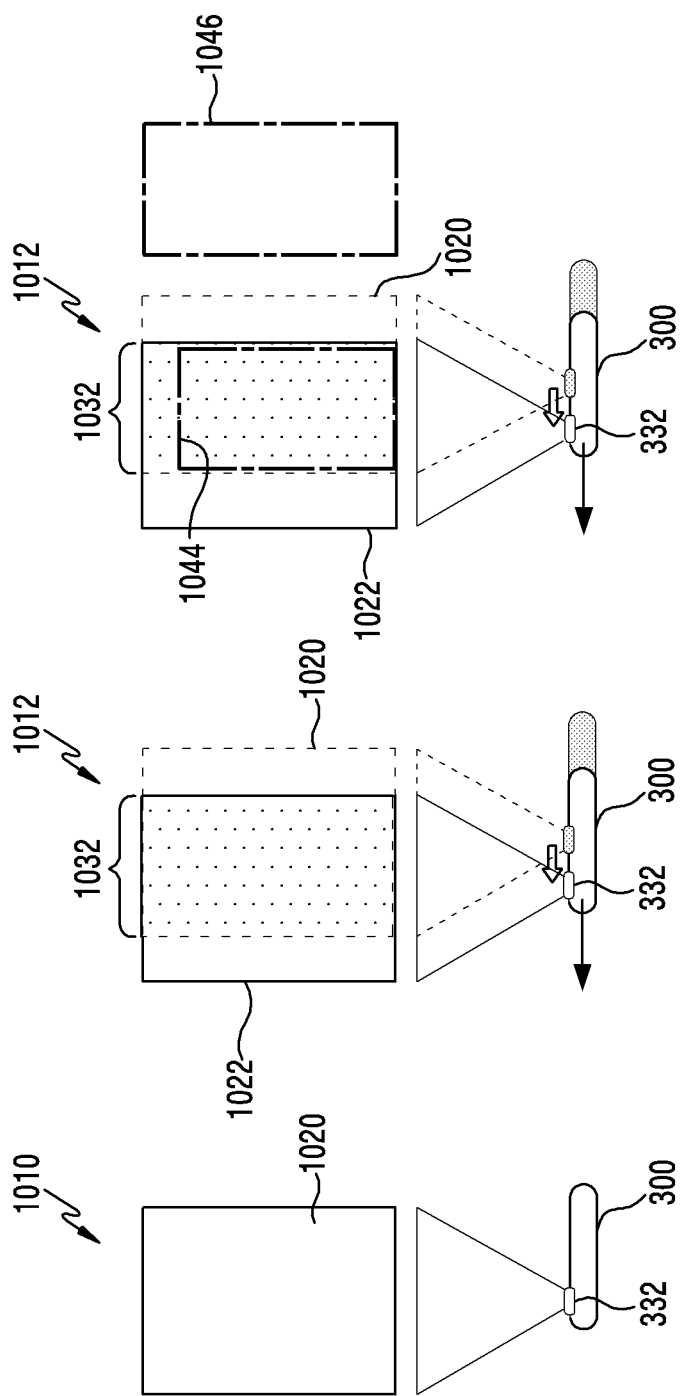
FIG. 10 illustrates an example of a method for adjusting a preview range according to movement of a camera in an electronic device according to an embodiment of the disclosure.

FIG. 10 illustrates an example of a method for adjusting a preview range according to movement of a camera in an electronic device according to an embodiment of the disclosure.

When a sufficient overlapping area for adjusting a preview range is not secured due to short-range photographing (e.g., when an overlapping area is smaller than a preview range) as in FIG. 9, the electronic device 300 may measure the distance between the electronic device 300 and a subject, and may adjust a base margin and/or an allowable moving distance, based on the measured distance. For example, the electronic device 300 may adjust the base margin and/or the allowable moving distance to be directly proportional to the measured distance.

When the sufficient overlapping area is not secure, the electronic device 300 may limit some movements or functions. Methods for limiting some movements or functions are illustrated as follows.

First, the electronic device 300 may partially limit the range of an extending (sliding) movement. The electronic device 300 may limit a moving distance (e.g., an extending distance) of a flexible display 310. The electronic device 300 may limit the moving distance, thereby obtaining an overlapping area with a certain area or greater and extracting a preview range with a substantially desired size from the overlapping area.

For example, in a structure in which the flexible display 310 of the electronic device 300 is automatically slid by a sliding driving body (e.g., a motor) so that a display area is extended or contracted, a movement or a function of the sliding driving body may be limited to enable the flexible display to extend (slide) only within a section in which the size of an overlapping area is a preview range or greater (e.g., in a section in which a view angle of a camera is not changed) while using the camera (e.g., during photographing). While using the camera, excessive extension of the flexible display 310 and excessive movement of the camera in connection therewith may be limited, thereby enabling the view angle of the camera not to be significantly changed but to be maintained within a certain range. Second, the electronic device 300 may limit some movements or functions to minimize changes in content in a preview screen. For example, the electronic device 300 may configure a base margin to 0 (or a minimum value), may match a left reference point of a first capture area and a left reference point of a preview range, and may allow a change in the moving distance within a section (or allowable moving distance) that enables a right reference point of a second capture area and a right reference point of the preview range to be matched. In an overlapping area maximally covering pre-movement and post-movement of the camera, the base margin may be configured to 0 or the minimum value, thereby adjusting the preview range to be as close as possible to one side (e.g., left or right side) of the overlapping area.

Accordingly, even in a short distance between the electronic device 300 and the subject the preview range may be adjusted to minimize changes in the view angle of the camera.

Third, as illustrated in FIG. 10, the electronic device 300 may scale a preview range (1046→1044) to secure a movable section of the preview range within an overlapping area 1032.

In the example of FIG. 10, reference numeral 1010 is a first state (e.g., a pre-extension state of the electronic device 300) before a lens assembly 332 of the camera is moved. Reference numeral 1020 is a first capture area in the first state 1010. Reference numeral 1012 is a second state (e.g., a post-extension of the electronic device 300) after the lens assembly 332 of the camera is moved. Reference numeral 1022 is a second capture area in the second state 1012. Reference numeral 1032 is an overlapping area between the first capture area 1020 and the second capture area 1022. Reference numeral 1046 is a preview range before scaling. Reference numeral 1044 is a downscaled preview range.

As illustrated, the electronic device 300 may temporarily downscale the preview range so that the size of the preview range 1044 is adjusted to be smaller than that of the overlapping area 1032, and may obtain a movable section for adjusting the preview range 1044.

Figure 11:
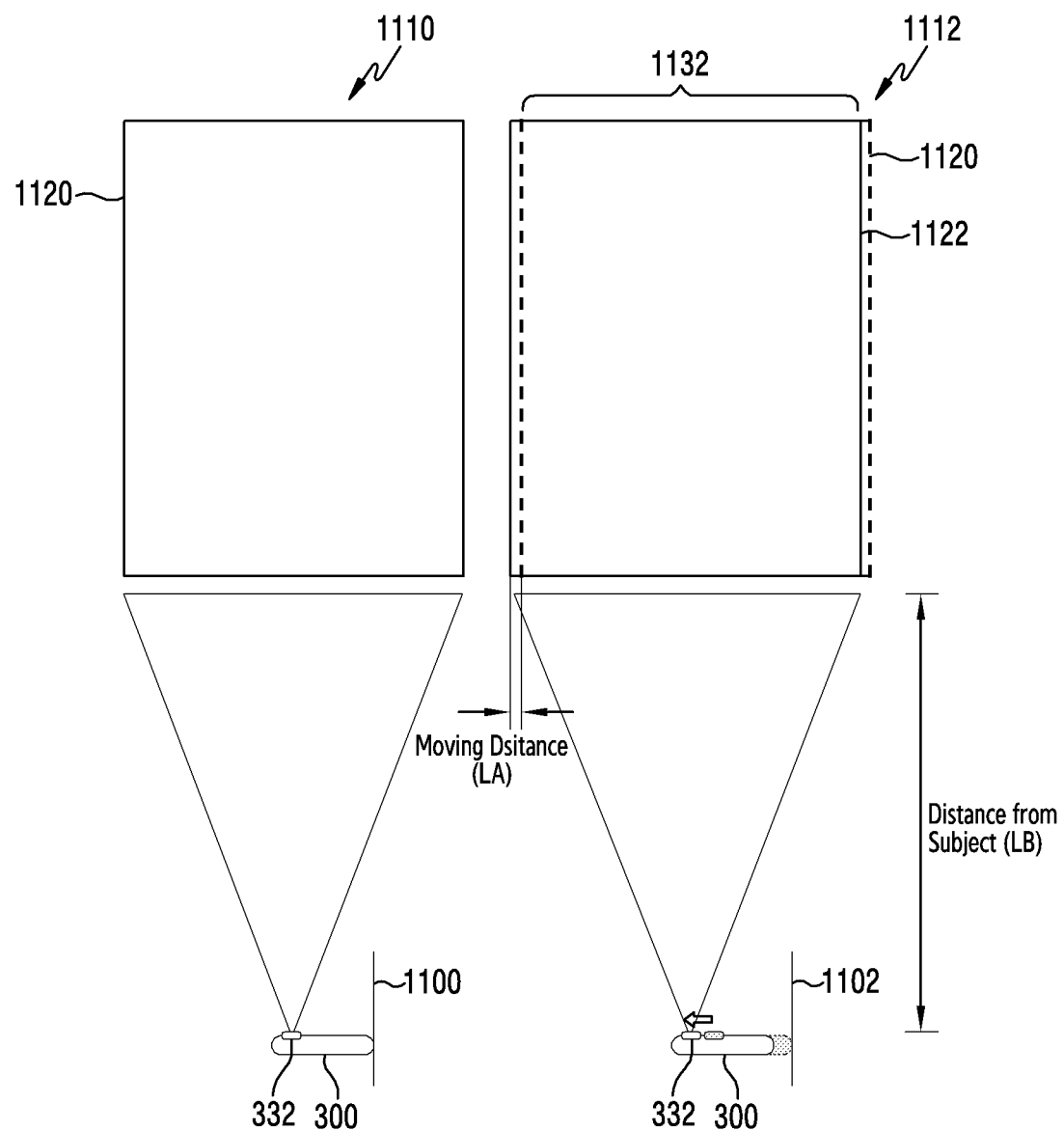
FIG. 11 illustrates an example of a method for adjusting a preview range in long-distance photographing in an electronic device according to an embodiment of the disclosure.

FIG. 11 illustrates an example of a method for adjusting a preview range in long-distance photographing in an electronic device according to an embodiment of the disclosure.

Referring to FIG. 11, reference numeral 1110 is a first state (e.g., a pre-extension state of the electronic device 300) before a lens assembly 332 of the camera is moved. Reference numeral 1112 is a second state (e.g., a post-extension of the electronic device 300) after the lens assembly 332 of the camera is moved. Reference numeral 1120 is a first capture area. Reference numeral 1122 is a second capture area. Reference numeral 1132 is an overlapping area between the first capture area 1120 and the second capture area 1122. Reference numerals 1100 and 1102 are moving reference lines of the electronic device 300.

In long-distance photographing, due to a long distance LB between the electronic device 300 and a subject, a moving distance LA (e.g., an extending distance) of a flexible display 310 included in the electronic device 300 may be relatively short.

As illustrated, as the distance between the electronic device 300 and the subject increases, a change in a capture area according to movement of the camera may be insignificant compared to the entire area. When the distance LB between the electronic device 300 and the subject is a certain value or longer, it may be efficient to configure a preview range adjustment function to be off. When the preview range adjustment function is configured to be off, a designated preview range (or default preview range) may be applied, and adjustment of the preview range according to the movement of the camera may be omitted. Alternatively, when the distance LB between the electronic device 300 and the subject is the certain value or longer, even though the adjustment function is configured to be on, adjustment of the preview range may not be performed.

Figure 12:
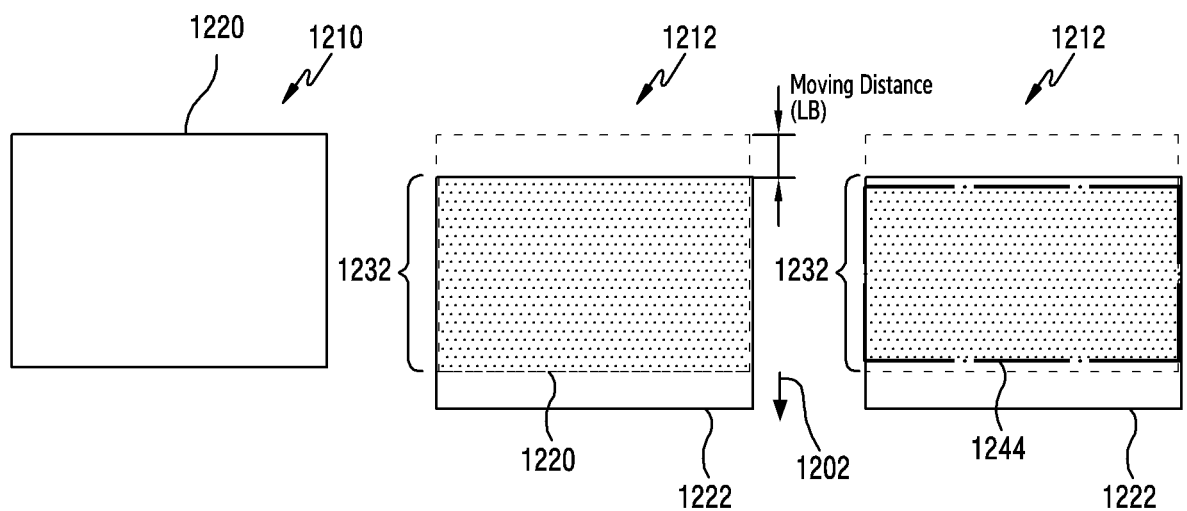
FIG. 12 illustrates an example of a method for adjusting a preview range in a landscape display mode of an electronic device according to an embodiment of the disclosure.

FIG. 12 illustrates an example of a method for adjusting a preview range in a landscape display mode of an electronic device according to an embodiment of the disclosure. FIG. 12 illustrates a landscape display mode operation of the electronic device 300. The landscape display mode may be a mode in which a screen of the electronic device 300 is displayed in the horizontal (x-axis) direction. Compared to the landscape display mode, a portrait display mode may be a mode in which the screen of the electronic device 300 is displayed in the vertical (y-axis) direction. For example, when a user turns the electronic device 300 from the vertical direction to the horizontal direction while using the electronic device 300 (e.g., during photographing), the screen of the electronic device 300 that has been displayed in the vertical direction may be switched to be displayed in the horizontal direction.

Referring to FIG. 12, reference numeral 1210 is a first state (e.g., a pre-movement state of a camera or a pre-extension state of the electronic device 300). Reference numeral 1220 is a first capture area in the first state 1210. Reference numeral 1212 is a second state (e.g., a post-movement state of the camera or a post-extension of the electronic device 300). Reference numeral 1222 is a second capture area in the second state 1212. Reference numeral 1232 is an overlapping area between the first capture area 1220 and the second capture area 1222. Reference numeral 1244 is an updated preview range.

The electronic device 300 may be switched from the portrait display mode to the landscape display mode while using the camera (e.g., during photographing). For example, when the electronic device 300 is switched from the portrait display mode to the landscape display mode, a photographing ratio may be changed from 9:16 to 16:9.

In the landscape display mode of the electronic device 300, the electronic device 300 may be extended in one direction 1202 (e.g., the vertical direction), and accordingly the flexible display 310 included in the electronic device 300 may be moved by a predetermined moving distance LB.

In the landscape display mode of the electronic device 300, the electronic device 300 may change a reference point of a preview range to a y-axis reference point, thereby adjusting the preview range in consideration of movement of the camera, based on the y-axis reference point.

In various embodiments, a preview range adjustment function may be used.

For example, a video taking function may be performed using the camera of the electronic device 300. Due to a characteristic of continuously recorded video content, a change of a capture area by the movement of the camera during taking a video may cause a responsive impact continuity and quality deterioration of content.

According to another embodiment, the preview range may be adjusted in consideration of the movement of the camera, thereby maintaining continuity and quality of video content.

The electronic device 300 may configure at least one of whether to use the preview range adjustment function, whether to adjust the preview range, the preview range, and/or an allowable moving distance in real time, based on the distance between the electronic device 300 and a subject, in a state of waiting for photographing (or a preview state). The electronic device 300 may maintain the same configuration from the start of photographing to the end of photographing.

Video taking may have a narrower view angle than image taking. Thus, a change in view angle due to the movement of the camera may be relatively significantly felt, which may reduce usability of the camera or user experience. To improve the usability or user experience, yet another embodiment of combining a method for adjusting a preview range and a method for limiting a change (e.g., increase or reduction) of the size of a display area may be possible.

The electronic device 300 may temporarily limit a change of the size of the display area to maintain a preview screen.

For example, the electronic device 300 may limit a movable distance (or allowable moving distance) of the flexible display 310 in the state of waiting for photographing or during video taking to be within a certain range. The electronic device 300 may display a message notification window displaying a message "The screen cannot be expanded or contracted while taking a video" on a screen, thereby notifying the user that extension or contraction of the display area is limited while taking a video.

Figure 13A:
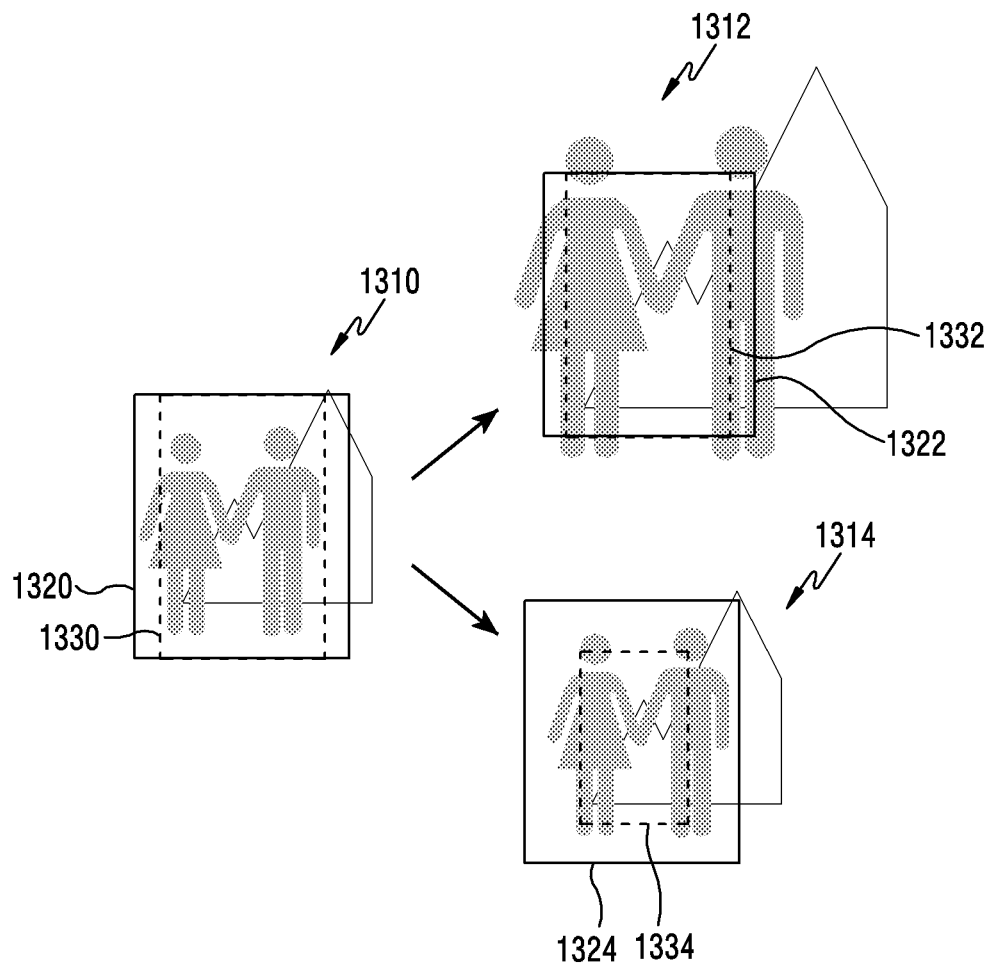
FIGS. 13A and 13B illustrate examples of a change in a preview range according to a zoom operation in an electronic device according to various embodiments of the disclosure.
Figure 13B:
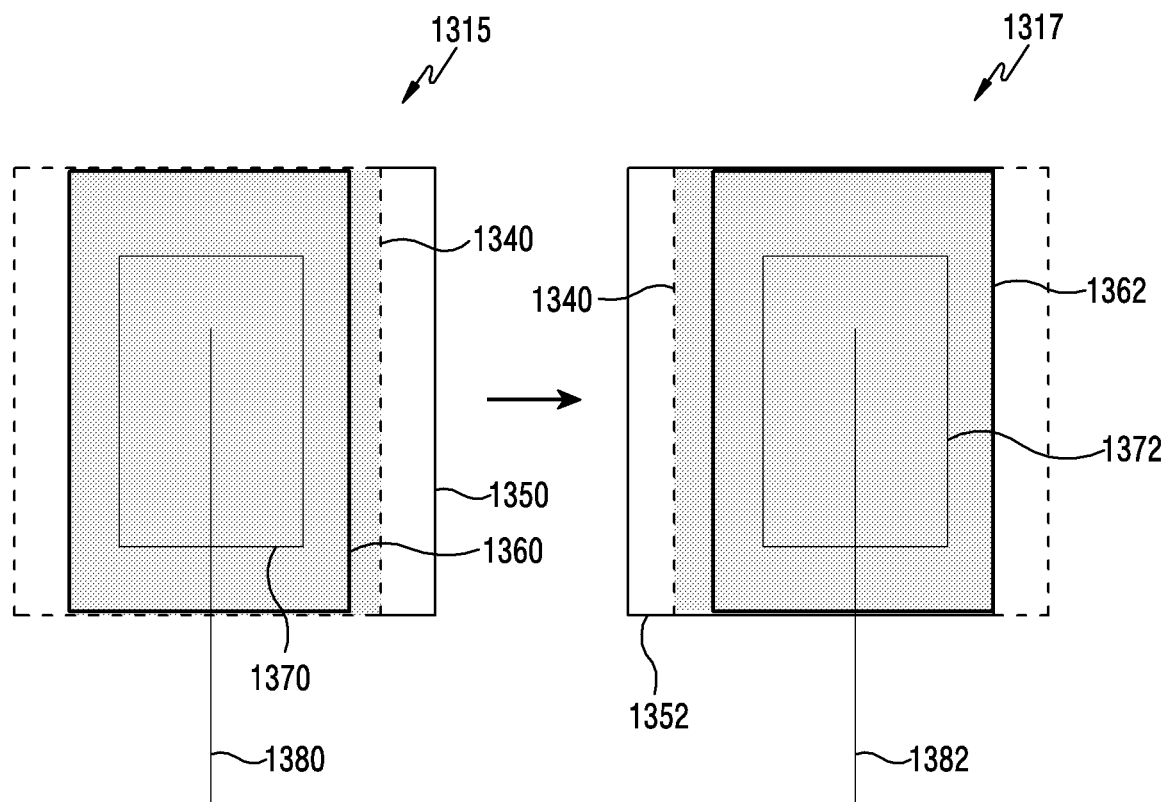

FIGS. 13A and 13B illustrate examples of a change in a preview range according to a zoom operation in an electronic device according to various embodiments of the disclosure.

Zoom operations of a camera may be divided into an optical zoom operation and a digital zoom operation. In the optical zoom operation, a camera lens moves back and forth to adjust a focal distance (or photographing distance). A captured image may be physically enlarged. In an optical zoom, image quality may not be damaged. In the digital zoom operation, a portion (e.g., a central area) of a high-resolution captured image of an image sensor (e.g., the image sensor 234) may be cropped and displayed to be enlarged as if zooming in, separately from the camera lens. In a digital zoom, image quality may be damaged due to cropping.

In the optical zoom operation, the captured image may be changed from a first captured image to a second captured image. In the digital zoom operation, the captured image may be processed to be enlarged in software. In the optical zoom operation, the camera may move, and thus the focal distance may be reduced. As the focal distance changes, the captured image obtained by the camera may be changed from the first captured image to the second captured image. In the digital zoom operation, the captured image of the camera may be the same. The focal distance may be the same.

Referring to FIG. 13A, reference numeral 1310 may be a state in which no zoom is applied. Reference numeral 1312 may be a state in which an optical zoom is applied. Reference numeral 1314 may be a state in which a digital zoom is applied. Reference numeral 1320 may be a captured image (or capture area). Reference numeral 1330 may be a preview range in the captured image. Reference numeral 1322 may be a captured image (or capture area) changed by a zoom-in operation (focal distance reduction) in the optical zoom operation. Reference numeral 1332 may be a preview range in the captured image 1322 in the optical zoom operation. Reference numeral 1324 may be a high-resolution captured image obtained for the digital zoom operation. Reference numeral 1334 may be a preview range in the captured image 1324 in the digital zoom operation.

For the optical zoom operation in which the captured image is changed and the digital zoom operation in which the captured image is the same, different methods for adjusting a preview range may be applied.

In the optical zoom in which the captured image is changed, an update of a base margin (BM) and a maximum extending distance (ME) may be required together with an update of an overlapping area.

In the digital zoom in which the captured image does not change, the preview range is reduced in the same captured image, and thus it is possible to use the same preview range configuration value criterion before the zoom and apply only enlargement processing. Since the digital zoom is sensitive to image quality deterioration, camera movement, and shaking, operating a preview range adjustment function may be limited during the digital zoom operation for usability.

Referring to FIG. 13B, reference numeral 1315 is a first state (pre-movement state of the camera or pre-extension state). Reference numeral 1317 is a second state (post-movement state of the camera or post-extension state).

Reference numeral 1350 is a first capture area in the first state 1315. Reference numeral 1352 is a second capture area in the second state 1317. Reference numeral 1340 is an overlapping area between the first capture area 1350 and the second capture area 1352.

Reference numeral 1360 is a first preview range (not subjected to a zoom) in the first state 1315. Reference numeral 1370 is a first preview range (subjected to a zoom) in the first state 1315. Reference numeral 1362 is a second preview range (not subjected to a zoom) in the second state 1317. Reference numeral 1372 is a second preview range (subjected to a zoom) in the second state 1317. Reference numeral 1380 is a centerline of the first preview ranges 1360 and 1370. Reference numeral 1382 is a centerline of the second preview ranges 1362 and 1372.

In the second state 1317, the electronic device 300 may adjust a preview range to be included in the overlapping area 1340 between the first capture area 1350 and the second capture area 1352, thereby changing the first preview ranges 1360 and 1370 to the second preview ranges 1362 and 1372. The electronic device 300 may apply a zoom state of a previous preview screen to the second preview range 1362, thereby configuring the second preview range 1372 subjected to the zoom. A preview image according to the preview range 1372 subjected to the zoom in the second capture area 1352 may be obtained and displayed on a preview screen.

Figure 14A:
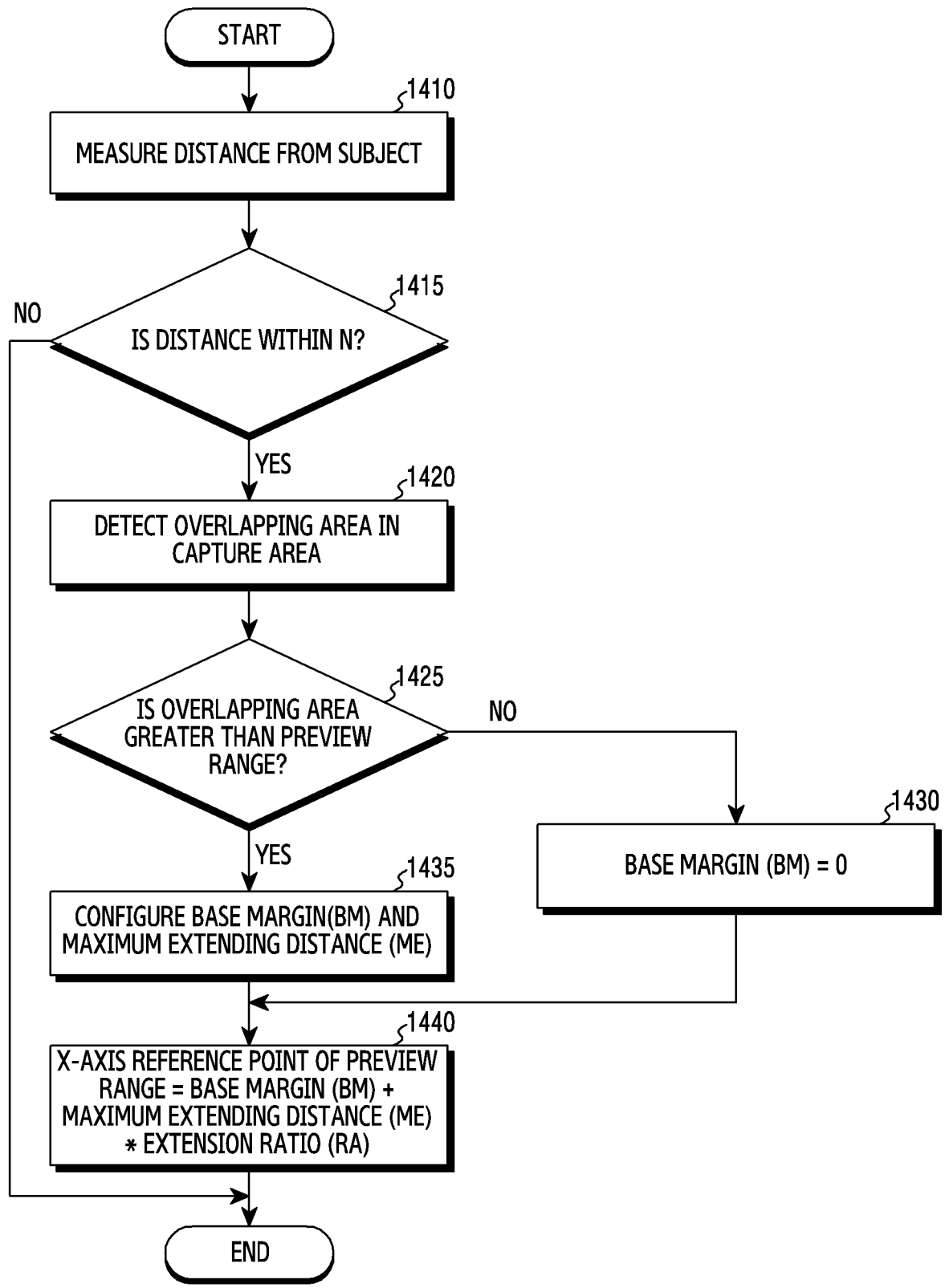
FIG. 14A is a flowchart illustrating a preview control method of an electronic device according to an embodiment of the disclosure.

FIG. 14A is a flowchart illustrating a preview control method of an electronic device according to an embodiment of the disclosure. For convenience, the method of FIG. 14A is assumed to be performed by the electronic device 200. The preview control method of the electronic device according to the embodiment may include operation 1410 to operation 1440.

In operation 1410, the electronic device 200 may measure a distance from a subject by using at least one sensor (e.g., a 3D camera sensor, an infrared sensor, or a depth sensor included in the sensor module 240 or the sensor module 1876).

In operation 1415, the electronic device 200 may determine whether the measured distance is within a designated threshold value (e.g., N).

Operation 1410 and operation 1415 are for measuring the distance from the subject, and may be omitted.

As a result of determination in operation 1415, when the measured distance is within the designated threshold value (e.g., N) (e.g., Yes in operation 1415), the electronic device 200 may detect an overlapping area before and after movement of a camera (overlapping area between captured images before and after the movement of the camera or overlapping area between capture areas before and after the movement of a camera) in operation 1420. As a result of determination in operation 1415, when the measured distance is greater than the designated threshold value (e.g., No in operation 1415), the electronic device 200 may determine that preview adjustment is unnecessary, and may terminate a preview adjustment operation.

In operation 1425, the electronic device 200 may determine whether the overlapping area is greater than a designated preview range.

As a result of determination in operation 1425, when the overlapping area is less than or equal to the designated preview range (e.g., in short-distance photographing) (e.g., No in operation 1425), the electronic device 200 may configure a base margin (BM) to 0 (or a minimum value) in operation 1430.

As a result of determination in operation 1425, when the overlapping area is greater than the designated preview range (e.g., Yes in operation 1425), the electronic device 200 may configure (or identify) the base margin (BM) and a maximum extending distance (ME) in operation 1435.

In operation 1440, the electronic device 200 may adjust an x-axis reference point of the preview range. For example, the electronic device 200 may move the x-axis reference point in the overlapping area to satisfy the "x-axis reference point=base margin (BM)+maximum extending distance (ME)*extension ratio (RA) of display", thereby configuring a preview range (updated preview range).

Figure 14B:
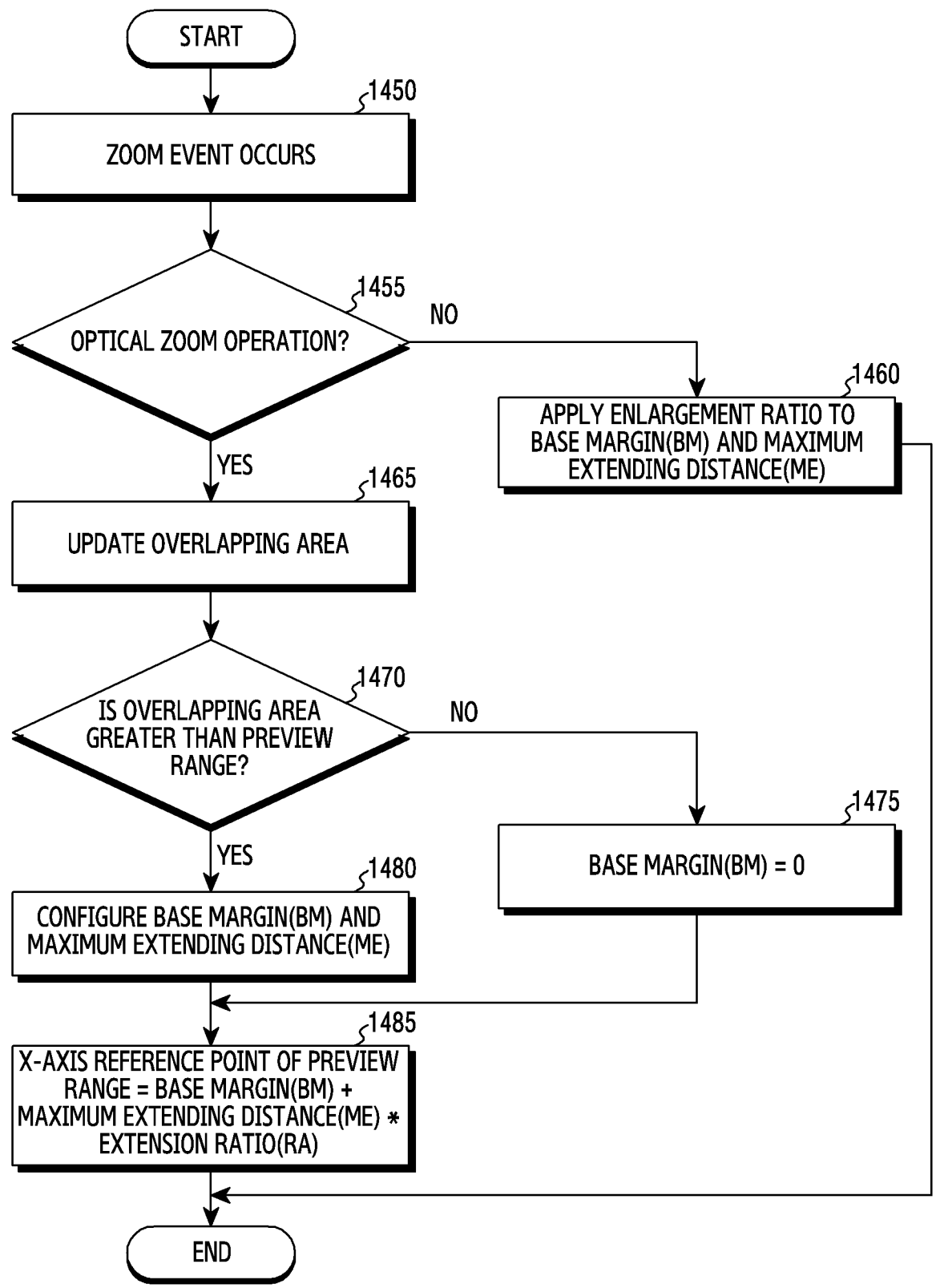
FIG. 14B is a flowchart illustrating a preview control method of an electronic device according to an embodiment of the disclosure.

FIG. 14B is a flowchart illustrating a preview control method of an electronic device, which illustrates a preview adjustment method associated with a zoom operation according to an embodiment of the disclosure.

The preview control method according to the embodiment may include operation 1450 to operation 1485.

In operation 1450, the electronic device 200 may detect a zoom event. The event may be a zoom-in event. In an optical zoom, a distance from a subject may be reduced by the zoom-in event.

In operation 1455, the electronic device 200 may determine whether the zoom event is an optical zoom operation.

As a result of determination in operation 1455, when the zoom event is not an optical zoom operation (No in operation 1455), the electronic device 200 may determine that the zoom event is a digital zoom operation, and may apply an enlargement ratio to a preset base margin (BM) and a preset maximum extending distance (ME) in operation 1460. The enlargement ratio may be an enlargement ratio according to a zoom-in level. Alternatively, in a case of a digital zoom area, a preview adjustment function may not be operated to prevent deterioration in usability, such as screen shaking.

As a result of determination in operation 1455, when the zoom event is an optical zoom operation (Yes in operation 1455), the electronic device 200 may update an overlapping area before and after movement of a camera (overlapping area between captured images before and after the movement of the camera or overlapping area between capture areas before and after the movement of a camera) in operation 1465.

In operation 1470, the electronic device 200 may determine whether the updated overlapping area is greater than a preview range.

As a result of determination in operation 1470, when the overlapping area is less than or equal to the size of the preview range (e.g., in short-distance photographing) (e.g., NO in operation 1470), the electronic device 200 may configure the base margin (BM) to 0 (or a minimum value) in operation 1475.

As a result of determination in operation 1470, when the overlapping area is greater than the preview range (e.g., YES in operation 1470), the electronic device 200 may configure (or identify) the base margin (BM) and the maximum extending distance (ME) in operation 1480.

In operation 1485, the electronic device 200 may adjust an x-axis reference point of the preview range. For example, the electronic device 200 may move the x-axis reference point in the overlapping area to satisfy the "x-axis reference point=base margin (BM)+maximum extending distance (ME)*extension ratio (RA) of display", thereby configuring a preview range (updated preview range).

FIGS. 15A to 15D illustrate another example of a mechanical structure of an electronic device according to various embodiments of the disclosure. The electronic device 200 according to an embodiment may be a vertically slidable-type electronic device 1500.

Figure 15A:
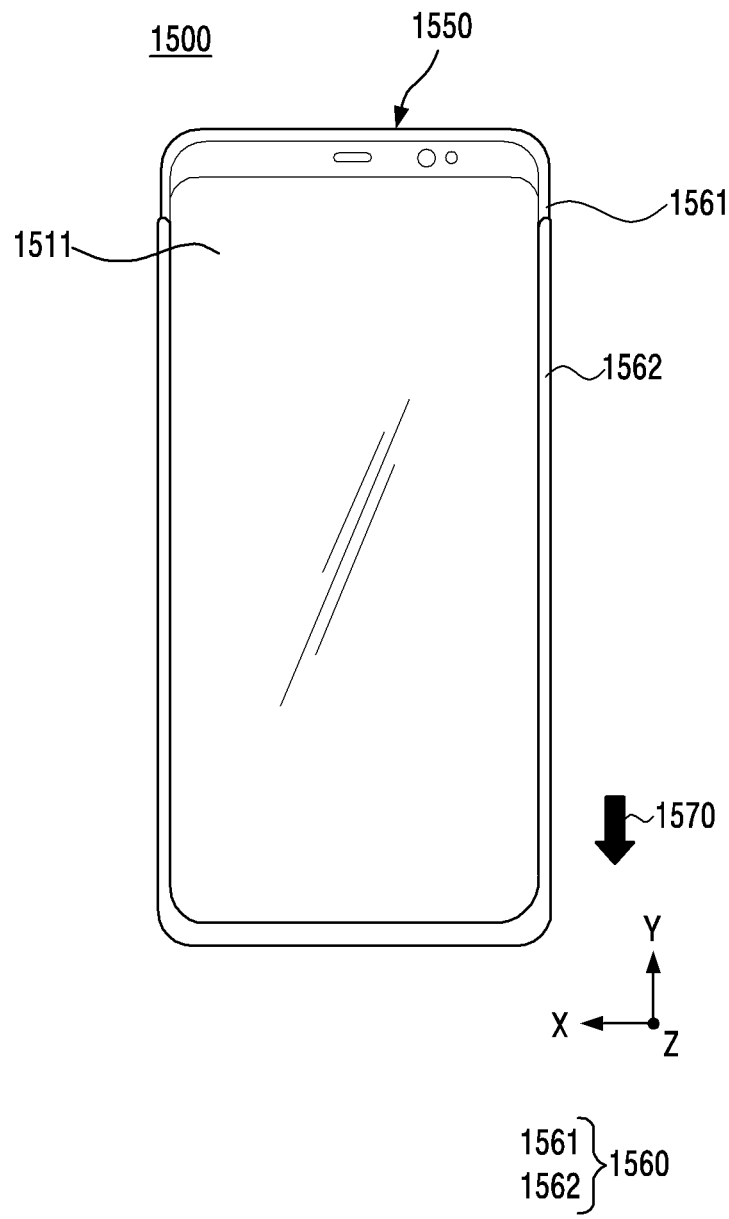
FIG. 15A is a front perspective view of an electronic device in a first state according to an embodiment of the disclosure.
Figure 15B:
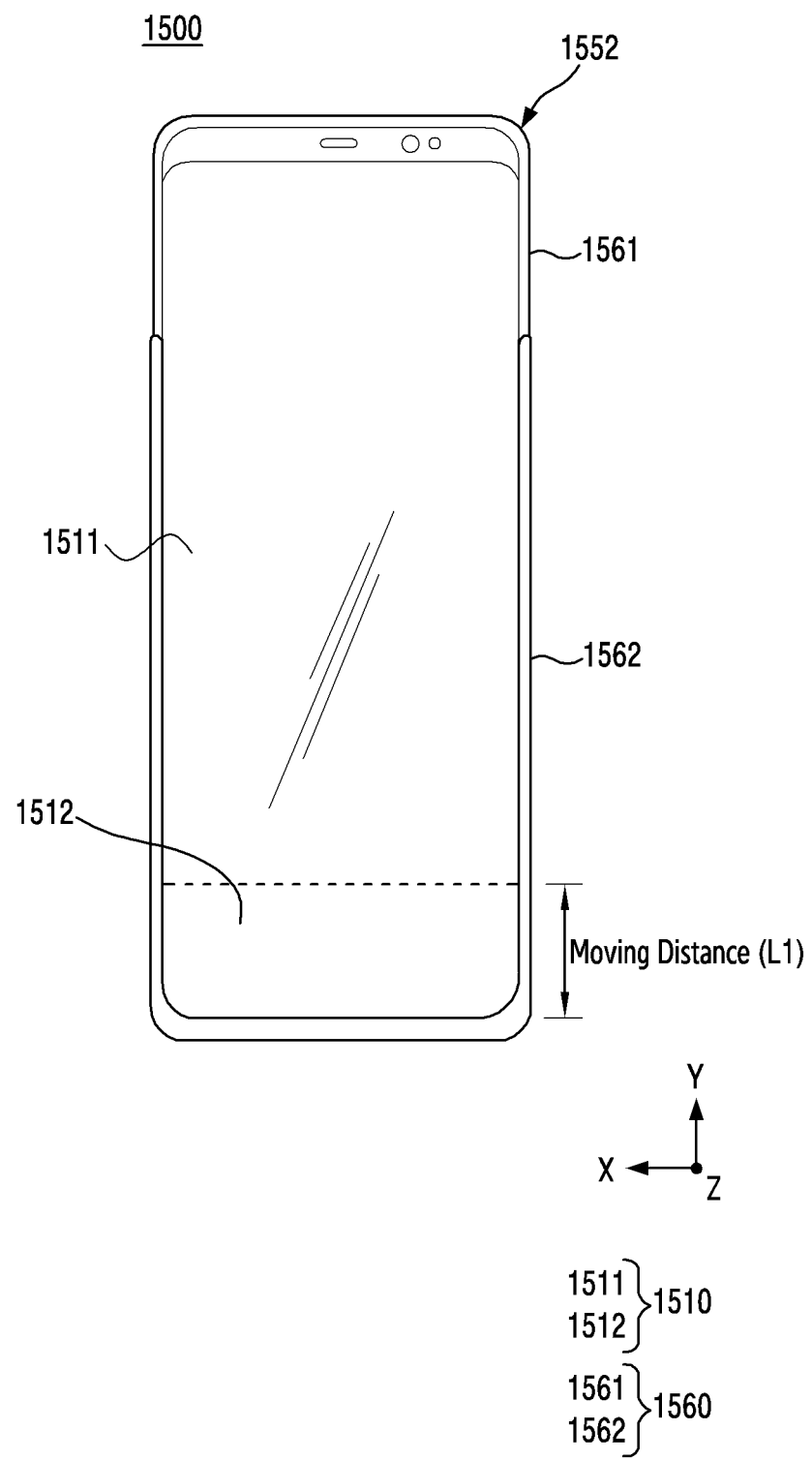
FIG. 15B is a front perspective view of an electronic device in a second state according to an embodiment of the disclosure.

FIG. 15A is a front perspective view of the electronic device in a first state (e.g., a slide-in state, a pre-extension state, or a pre-movement state of a camera). FIG. 15B is a front perspective view of the electronic device in a second state (e.g., a slide-out state, a post-extension state, or a post-movement state of the camera).

Referring to FIGS. 15A and 15B, the electronic device 1500 may be a vertically slidable-type electronic device 1500, and may include a flexible display 1510 and a housing 1560. The housing 1560 may include a first housing 1561 and a second housing 1562. The display 1510 may include a first area 1511 and a second area 1512.

The second housing 1562 may slide in to the first housing 1561 to be introduced onto the first housing 1561. The second housing 1562 may slide out from the first housing 1561 to be drawn from the first housing 1561. For example, a sliding driving source of the second housing 1562 may be driven in any one of manual, automatic, or semi-automatic manners. When the sliding driving source is semi-automatic, a sliding guide member or a sliding driving body may be used. When the sliding driving source is automatic, a roller-type guide member or a roller driving body may be used, but the disclosure does not need to be limited by a sliding or roller type.

The second housing 1562 may slide in to or slide out from the first housing 1561 by a guide member.

The second housing 1562 may slide in or slide out along a first direction 1570 (e.g., a vertical (y-axis) direction) of the first housing 1561. The second housing 1562 may support at least part of the flexible display 1510 disposed on a front surface of the electronic device 1500.

The flexible display 1510 may be configured such that the size of a display area exposed on the front surface of the electronic device 1500 is changed (e.g., increased/reduced), based on a sliding movement of the second housing 1562. The size of the display area may be increased according to a slide-out movement. The size of the display area may be reduced according to a slide-in movement.

Part of the flexible display 1510 may be introduced into the first housing 1561 or drawn out of the first housing 1561 by the guide member. The display 1510 may include the first area 1511 that is always exposed and the second area 1512 that is selectively exposed according to the sliding movement. The second area 1512 may be introduced into the electronic device 1500 according to the slide-in movement of the second housing 1562, or may be drawn out of the electronic device 1500 according to the slide-out movement of the second housing 1562. The second area 1512 may be an extended display area according to a slide-out of the second housing 1534.

In the first state 1550, the display area of the flexible display 1510 exposed on the front surface of the electronic device 1500 may include the first area 1511. In the second state 1552, the display area of the display 1510 exposed on the front surface of the electronic device 1500 may include the first area 1511 and the second area 1512.

Figure 15C:
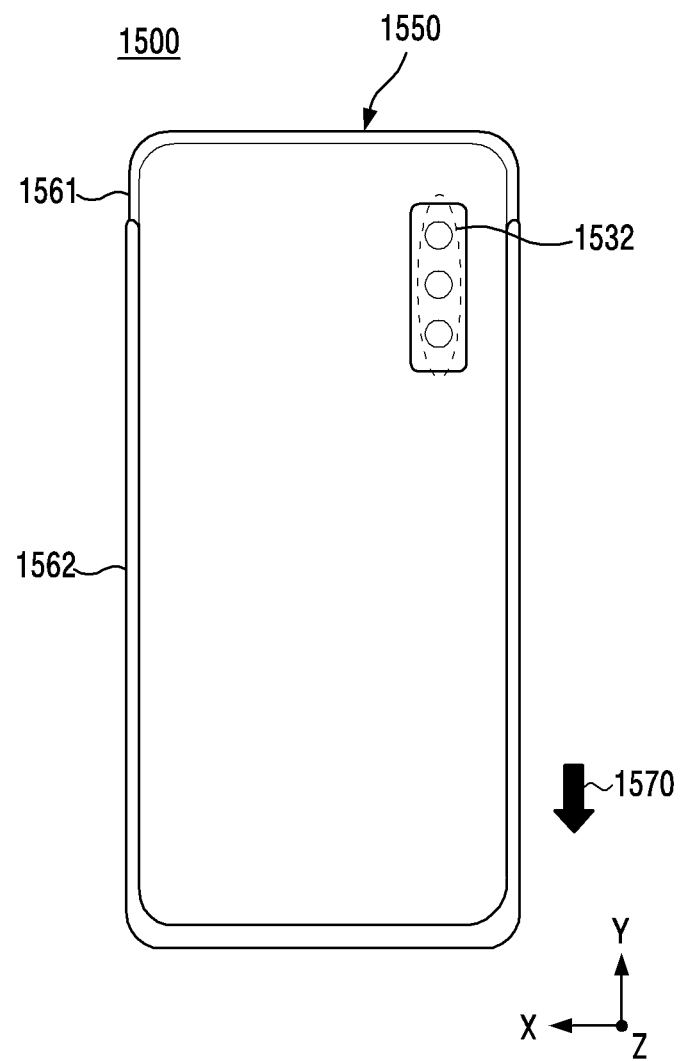
FIG. 15C is a rear perspective view of an electronic device in a first state according to an embodiment of the disclosure.
Figure 15D:
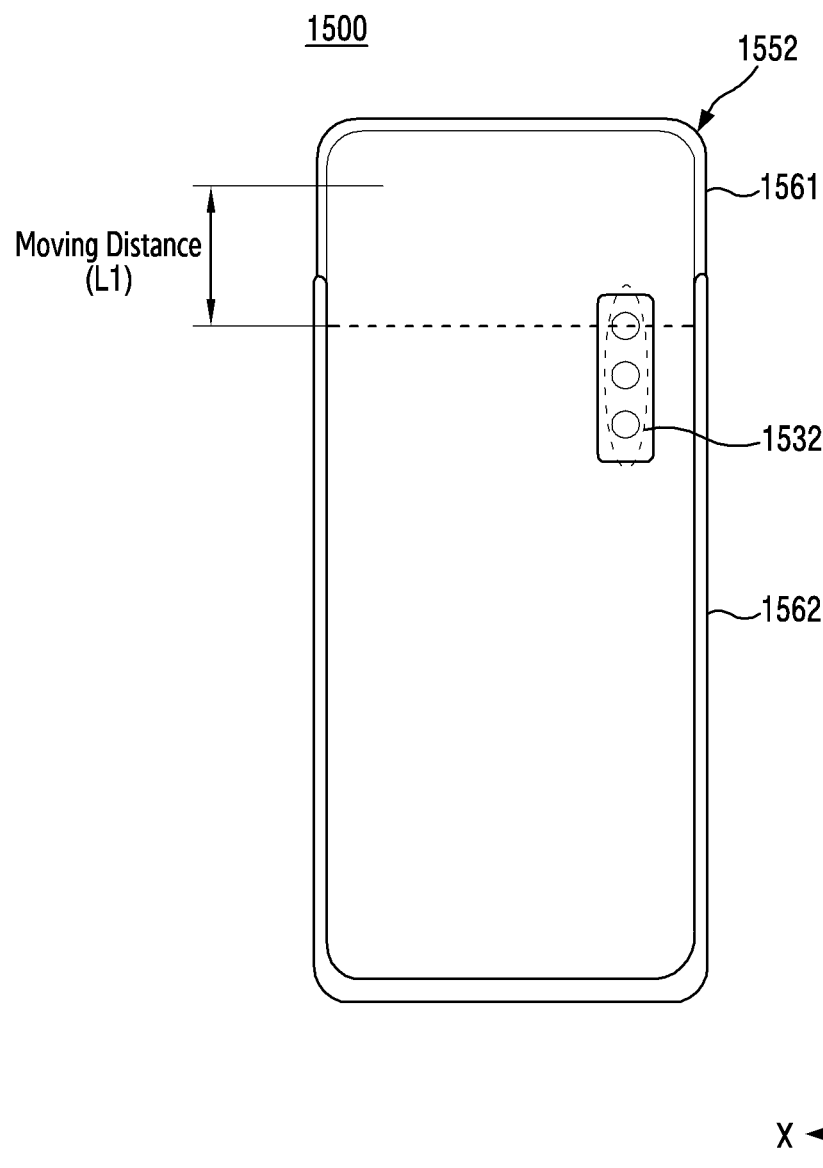
FIG. 15D is a rear perspective view of an electronic device in a second state according to an embodiment of the disclosure.

FIG. 15C is a rear perspective view of the electronic device in the first state (e.g., the slide-in state, the pre-extension state, or the pre-movement state of the camera). FIG. 15D is a rear perspective view of the electronic device in the second state (e.g., the slide-out state, the post-extension state, or the post-movement state of the camera). As illustrated, the electronic device 1500 may include a lens assembly 1532 of a rear camera lens type.

Referring to FIGS. 15C and 15D, the electronic device 1500 may include the lens assembly 1532 of the camera. The lens assembly 1532 may be moved in connection with a movement (e.g., a sliding movement) of the flexible display 1510 for changing the size of the display area.

For example, as illustrated, the flexible display 1510 may be coupled to a front surface of the second housing 1562, and the lens assembly 1532 of the camera may be coupled to a rear surface of the second housing 1562. The flexible display 1510 and the lens assembly 1532 may be moved together according to the sliding movement of the second housing 1562. The second housing 1562 may slide out along the first direction 1570 (e.g., the one side in the vertical direction), or may be slide in along a second direction (e.g., the other side in the horizontal direction), which is the opposite direction of the first direction 1570. The movement of the second housing 1562 may be understood as the movement of the flexible display 1510 and/or movement of the lens assembly 1532.

The flexible display 1510 may be moved by the certain moving distance (e.g., L1) along the first direction 1570 by the sliding movement of the second housing 362 with respect to the first housing 1561. The lens assembly 1532 of the camera may be moved by the certain moving distance (e.g., L1) along the first direction 1570 in connection with the movement of the flexible display 1510.

A moving direction, a moving distance, and a moving ratio of the flexible display 1510 may respectively correspond to a moving direction, a moving distance, and a moving ratio of the lens assembly 1532.

The electronic device 1500 may recognize the movement of the camera (or the lens assembly 1532 of the camera), based on the movement of the flexible display 1510. As the lens assembly 1532 of the camera is moved in connection with the movement of the flexible display 1510, the electronic device 300 may adjust a preview range. The electronic device 1500 may adjust the preview range, based on the movement of the flexible display 1510 (e.g., one or more of the moving direction, the moving distance, and the moving ratio).

Figure 16:
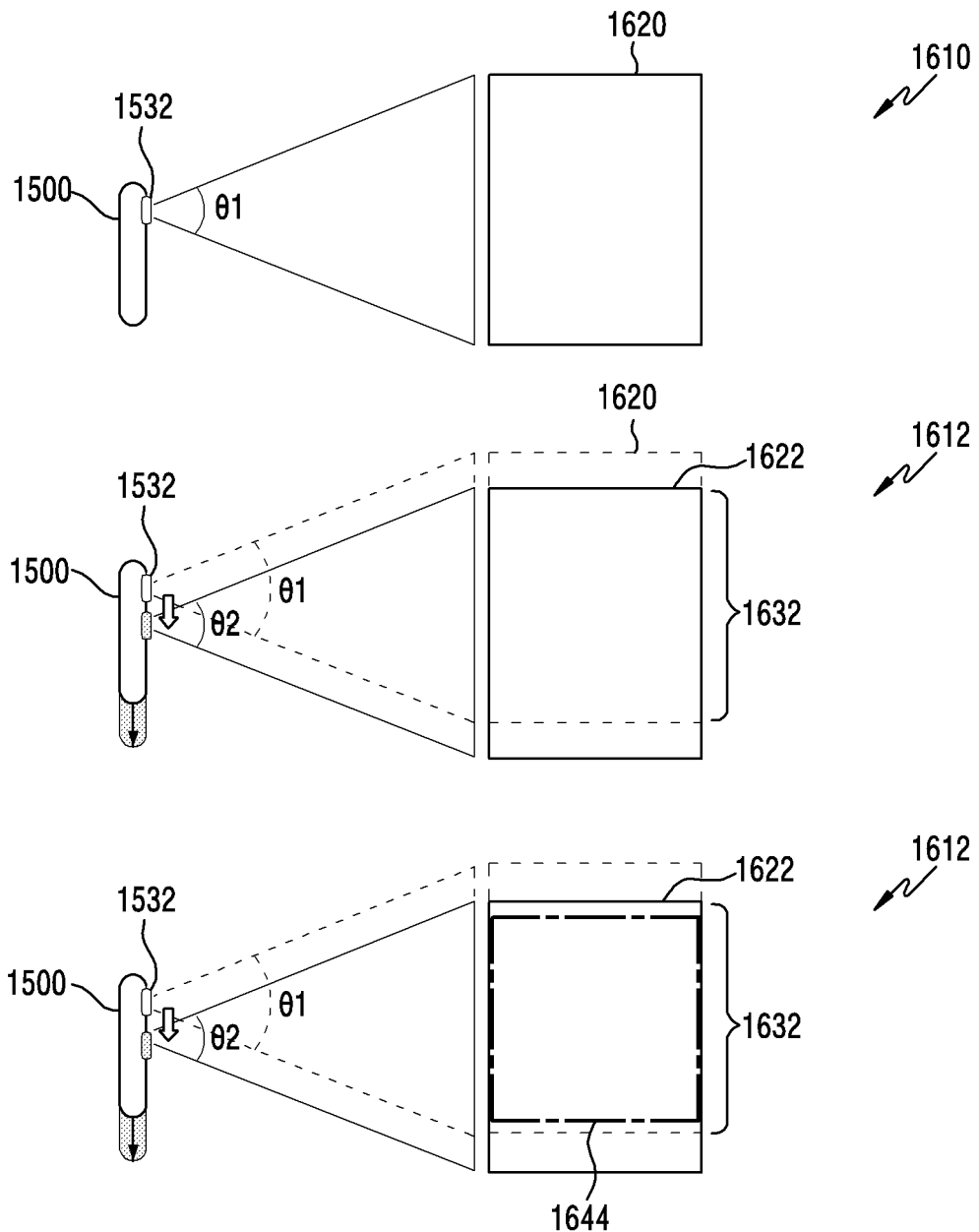
FIG. 16 illustrates an example of a method for adjusting a preview range according to movement of a camera in an electronic device according to an embodiment of the disclosure.

FIG. 16 illustrates an example of a method for adjusting a preview range according to movement of a camera in an electronic device according to an embodiment of the disclosure.

Referring to FIG. 16, reference numeral 1610 is a first state (e.g., a pre-extension state) before the movement of the camera. Reference numeral 1612 is a second state (e.g., a post-extension state) after the movement of the camera. Reference numeral 1620 is a first capture area in the first state 1610. Reference numeral 1622 is a second capture area in the second state 1612. Reference numeral 1632 is an overlapping area between the first capture area 1620 and the second capture area 1622. Reference numeral 1644 is an example of an adjusted preview range (updated preview range).

The electronic device 1500 may adjust the updated preview range 1644 to be included in the overlapping area between the first capture area 1620 and the second capture area 1622 in consideration of the movement of the camera (or a lens assembly 1532 of the camera).

As a flexible display 1510 of the electronic device 1500 is moved (e.g., slides out) in one direction (e.g., one side in the vertical direction), the size of a display area of the flexible display 1510 may be increased. The lens assembly 1532 of the electronic device 1500 may be moved in connection with movement of the flexible display 1510 (or a housing (e.g., the housing 1560 of FIGS. 15A to 15D)). As the lens assembly 1532 of the camera is moved, a view angle of the camera may be changed. θ1 is a first view angle of the camera in the first state 1610. θ2 is a second view angle of the camera in the second state 1612.

In the first state 1610, the first capture area 1620 of the camera may correspond to the first view angle θ1. The first capture area corresponding to the first view angle θ1 may be detected by an image sensor (e.g., the image sensor 234) of the camera. The first captured image may be obtained through the first capture area.

In the second state 1612, the second capture area 1622 of the camera may correspond to the second view angle θ2. The second capture area corresponding to the second view angle θ2 may be detected by the image sensor (e.g., the image sensor 234) of the camera. The second captured image may be obtained through the second capture area. Reference numeral 1632 is an example of the overlapping area between the first capture area 1620 and the second capture area 1622. At least part of the overlapping area 1632 may be configured as the updated preview range 1644 to be used for a preview.

When the movement of the camera occurs according to the movement of the flexible display 1510, the updated preview range 1644 may be configured based on at least one of a moving direction, a moving distance, and a moving ratio of the flexible display 1510.

The updated preview range 1644 may be defined by a base margin (BM) and a maximum extending distance of the flexible display 1510. A gap between a reference point (e.g., a start point) of the overlapping area 1632 and a reference point (e.g., a start point) of the updated preview range 1644 may be defined by the base margin (BM). The updated preview range 1644 may be adjusted to be positioned within a range that does not exceed the maximum extending distance (ME).

The electronic device 1500 may adjust a preview range to correspond to a mechanical state (e.g., at least one of whether the electronic device 1500 is moved, a moving distance, and a moving ratio) of the electronic device 1500 according to the movement (e.g., sliding or rolling) of the flexible display 1510, thereby configuring the updated preview range 1644. For example, the updated preview range 1644 may be adjusted to be positioned in the center of the overlapping area 1632. The base margin (BM) may be configured to exclude an outer area of the overlapping area 1632, which is an unavailable area, from the updated preview range 1644. Only an effective area (or central area) of the overlapping area 1632 excluding the outer area according to the base margin (BM) may be configured to the updated preview range 1644.

Figure 17:
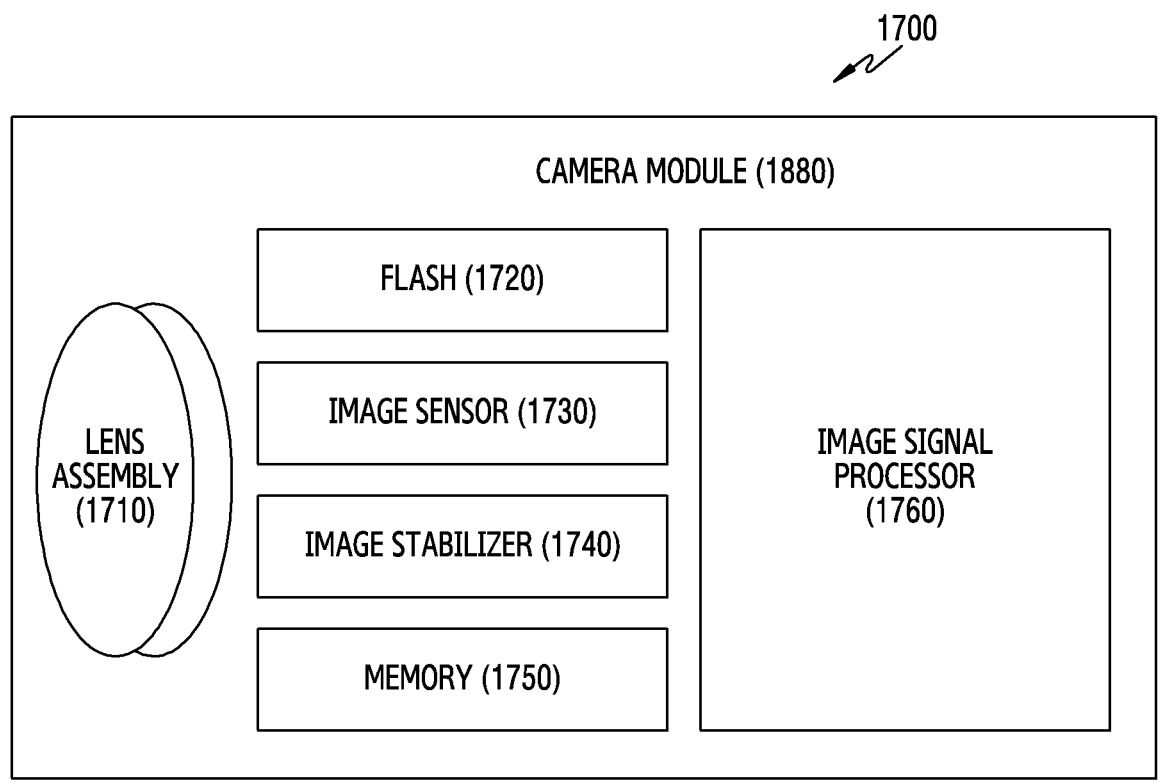
FIG. 17 is a block diagram illustrating a camera module according to an embodiment of the disclosure.

FIG. 17 is a block diagram illustrating the camera module according to an embodiment of the disclosure.

Referring to FIG. 17, the block diagram 1700 illustrates the camera module 1880 may include a lens assembly 1710, a flash 1720, an image sensor 1730, an image stabilizer 1740, memory 1750 (e.g., buffer memory), or an image signal processor 1760. The lens assembly 1710 may collect light emitted or reflected from an object whose image is to be taken. The lens assembly 1710 may include one or more lenses. According to another embodiment, the camera module 1880 may include a plurality of lens assemblies 1710. In such a case, the camera module 1880 may form, for example, a dual camera, a 360-degree camera, or a spherical camera. Some of the plurality of lens assemblies 1710 may have the same lens attribute (e.g., view angle, focal length, auto-focusing, f number, or optical zoom), or at least one lens assembly may have one or more lens attributes different from those of another lens assembly. The lens assembly 1710 may include, for example, a wide-angle lens or a telephoto lens.

The flash 1720 may emit light that is used to reinforce light reflected from an object. According to yet another embodiment, the flash 1720 may include one or more light emitting diodes (LEDs) (e.g., a red-green-blue (RGB) LED, a white LED, an infrared (IR) LED, or an ultraviolet (UV) LED) or a xenon lamp. The image sensor 1730 may obtain an image corresponding to an object by converting light emitted or reflected from the object and transmitted via the lens assembly 1710 into an electrical signal. According to a further embodiment, the image sensor 1730 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1730 may be implemented using, for example, a charged coupled device (CCD) sensor or a complementary metal oxide semiconductor (CMOS) sensor.

The image stabilizer 1740 may move the image sensor 1730 or at least one lens included in the lens assembly 1710 in a particular direction, or control an operational attribute (e.g., adjust the read-out timing) of the image sensor 1730 in response to the movement of the camera module 1880 or the electronic device 1801 including the camera module 1880. This allows compensating for at least part of a negative effect (e.g., image blurring) by the movement on an image being captured. According to still another embodiment, the image stabilizer 1740 may sense such a movement by the camera module 1880 or the electronic device 1801 using a gyro sensor (not shown) or an acceleration sensor (not shown) disposed inside or outside the camera module 1880. According to an embodiment, the image stabilizer 1740 may be implemented, for example, as an optical image stabilizer.

The memory 1750 may store, at least temporarily, at least part of an image obtained via the image sensor 1730 for a subsequent image processing task. For example, if image capturing is delayed due to shutter lag or multiple images are quickly captured, a raw image obtained (e.g., a Bayer-patterned image, a high-resolution image) may be stored in the memory 1750, and its corresponding copy image (e.g., a low-resolution image) may be previewed via the display device module 1860. Thereafter, if a specified condition is met (e.g., by a user's input or system command), at least part of the raw image stored in the memory 1750 may be obtained and processed, for example, by the image signal processor 1760. According to another embodiment, the memory 1750 may be configured as at least part of the memory 1830 or as a separate memory that is operated independently from the memory 1830.

The image signal processor 1760 may perform one or more image processing with respect to an image obtained via the image sensor 1730 or an image stored in the memory 1750. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1760 may perform control (e.g., exposure time control or read-out timing control) with respect to at least one (e.g., the image sensor 1730) of the components included in the camera module 1880. An image processed by the image signal processor 1760 may be stored back in the memory 1750 for further processing, or may be provided to an external component (e.g., the memory 1830, the display device module 1860, the electronic device 1802, the electronic device 1804, or the server 1808) outside the camera module 1880. According to yet another embodiment, the image signal processor 1760 may be configured as at least part of the processor 1820, or as a separate processor that is operated independently from the processor 1820. If the image signal processor 1760 is configured as a separate processor from the processor 1820, at least one image processed by the image signal processor 1760 may be displayed, by the processor 1820, via the display device module 1860 as it is or after being further processed.

According to a further embodiment, the electronic device 1801 may include a plurality of camera modules 1880 having different attributes or functions. In such a case, at least one of the plurality of camera modules 1880 may form, for example, a wide-angle camera and at least another of the plurality of camera modules 1880 may form a telephoto camera. Similarly, at least one of the plurality of camera modules 1880 may form, for example, a front camera and at least another of the plurality of camera modules 1880 may form a rear camera.

Figure 18:
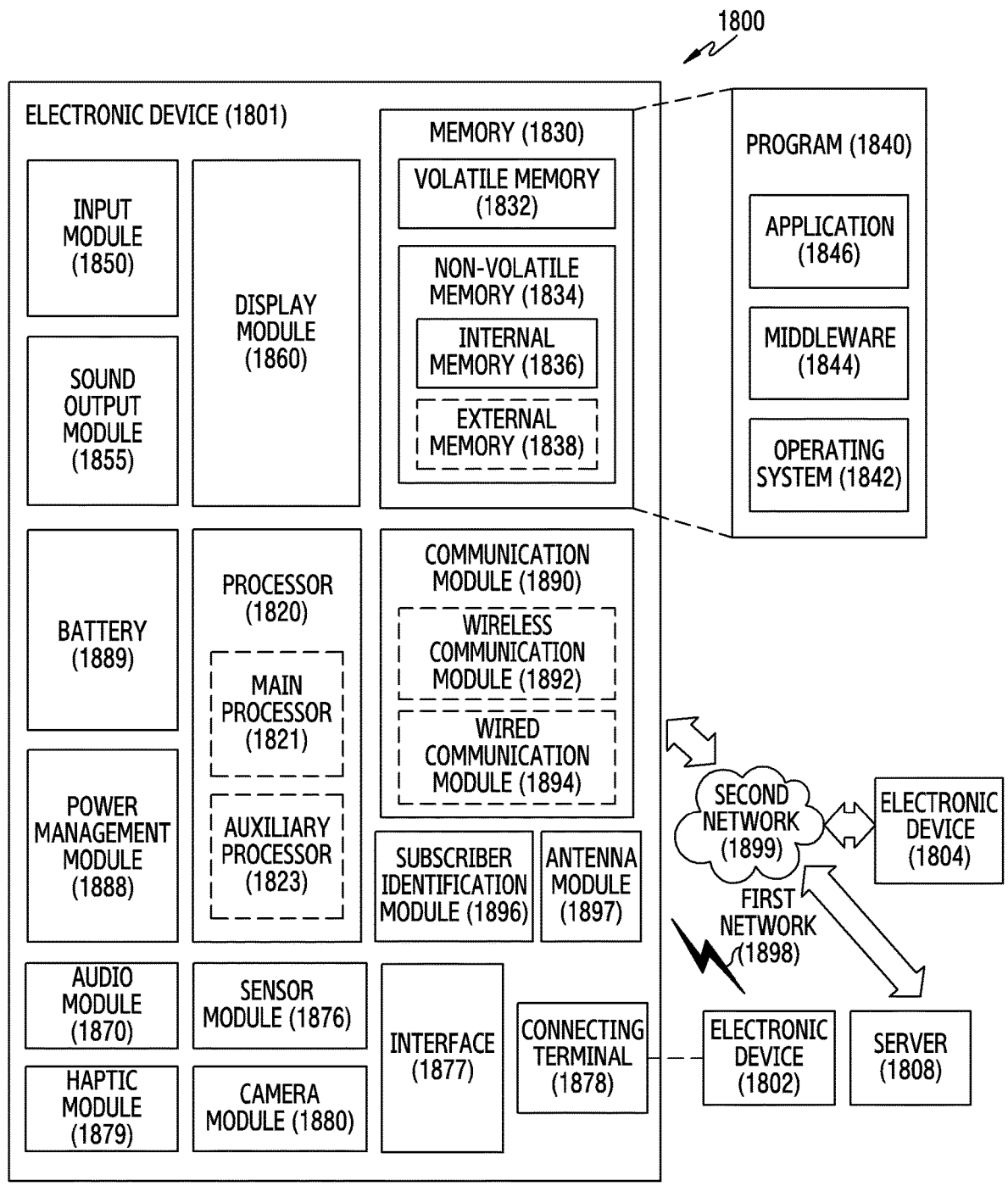
FIG. 18 is a block diagram of an electronic device in a network environment according to an embodiment of the disclosure.

FIG. 18 is a block diagram illustrating an electronic device in a network environment according to an embodiment of the disclosure.

Referring to FIG. 18, the electronic device 1801 in the network environment 1800 may communicate with an electronic device 1802 via a first network 1898 (e.g., a short-range wireless communication network), or at least one of an electronic device 1804 or a server 1808 via a second network 1899 (e.g., a long-range wireless communication network). According to an embodiment, the electronic device 1801 may communicate with the electronic device 1804 via the server 1808. According to another embodiment, the electronic device 1801 may include a processor 1820, memory 1830, an input module 1850, a sound output module 1855, a display module 1860, an audio module 1870, a sensor module 1876, an interface 1877, a connecting terminal 1878, a haptic module 1879, a camera module 1880, a power management module 1888, a battery 1889, a communication module 1890, a subscriber identification module (SIM) 1896, or an antenna module 1897. In some embodiments, at least one of the components (e.g., the connecting terminal 1878) may be omitted from the electronic device 1801, or one or more other components may be added in the electronic device 1801. In some embodiments, some of the components (e.g., the sensor module 1876, the camera module 1880, or the antenna module 1897) may be implemented as a single component (e.g., the display module 1860).

The processor 1820 may execute, for example, software (e.g., a program 1840) to control at least one other component (e.g., a hardware or software component) of the electronic device 1801 coupled with the processor 1820, and may perform various data processing or computation. According to one embodiment, as at least part of the data processing or computation, the processor 1820 may store a command or data received from another component (e.g., the sensor module 1876 or the communication module 1890) in volatile memory 1832, process the command or the data stored in the volatile memory 1832, and store resulting data in non-volatile memory 1834. According to another embodiment, the processor 1820 may include a main processor 1821 (e.g., a central processing unit (CPU) or an application processor (AP)), or an auxiliary processor 1823 (e.g., a graphics processing unit (GPU), a neural processing unit (NPU), an image signal processor (ISP), a sensor hub processor, or a communication processor (CP)) that is operable independently from, or in conjunction with, the main processor 1821. For example, when the electronic device 1801 includes the main processor 1821 and the auxiliary processor 1823, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display module 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to yet another embodiment, the auxiliary processor 1823 (e.g., an image signal processor or a communication processor) may be implemented as part of another component (e.g., the camera module 1880 or the communication module 1890) functionally related to the auxiliary processor 1823. According to a further embodiment, the auxiliary processor 1823 (e.g., the neural processing unit) may include a hardware structure specified for artificial intelligence model processing. An artificial intelligence model may be generated by machine learning. Such learning may be performed, e.g., by the electronic device 1801 where the artificial intelligence is performed or via a separate server (e.g., the server 1808). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input module 1850 may receive a command or data to be used by another component (e.g., the processor 1820) of the electronic device 1801, from the outside (e.g., a user) of the electronic device 1801. The input module 1850 may include, for example, a microphone, a mouse, a keyboard, a key (e.g., a button), or a digital pen (e.g., a stylus pen).

The sound output module 1855 may output sound signals to the outside of the electronic device 1801. The sound output module 1855 may include, for example, a speaker or a receiver. The speaker may be used for general purposes, such as playing multimedia or playing record. The receiver may be used for receiving incoming calls. According to still another embodiment, the receiver may be implemented as separate from, or as part of the speaker.

The display module 1860 may visually provide information to the outside (e.g., a user) of the electronic device 1801. The display module 1860 may include, for example, a display, a hologram device, or a projector and control circuitry to control a corresponding one of the display, hologram device, and projector. According to yet another embodiment, the display module 1860 may include a touch sensor adapted to detect a touch, or a pressure sensor adapted to measure the intensity of force incurred by the touch.

The audio module 1870 may convert a sound into an electrical signal and vice versa. According to an embodiment, the audio module 1870 may obtain the sound via the input module 1850, or output the sound via the sound output module 1855 or a headphone of an external electronic device (e.g., an electronic device 1802) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to another embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to a further embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to yet another embodiment, the connecting terminal 1878 may include, for example, a HDMI connector, a USB connector, a SD card connector, or an audio connector (e.g., a headphone connector).

The haptic module 1879 may convert an electrical signal into a mechanical stimulus (e.g., a vibration or a movement) or electrical stimulus which may be recognized by a user via his tactile sensation or kinesthetic sensation. According to still another embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to one embodiment, the power management module 1888 may be implemented as at least part of, for example, a power management integrated circuit (PMIC).

The battery 1889 may supply power to at least one component of the electronic device 1801. According to another embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to yet another embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth™, wireless-fidelity (Wi-Fi) direct, or infrared data association (IrDA)) or the second network 1899 (e.g., a long-range communication network, such as a legacy cellular network, a 5$^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The wireless communication module 1892 may support a 5G network, after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1892 may support a high-frequency band (e.g., the mm Wave band) to achieve, e.g., a high data transmission rate. The wireless communication module 1892 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1892 may support various requirements specified in the electronic device 1801, an external electronic device (e.g., the electronic device 1804), or a network system (e.g., the second network 1899). According to a further embodiment, the wireless communication module 1892 may support a peak data rate (e.g., 20 Gbps or more) for implementing eMBB, loss coverage (e.g., 1864 dB or less) for implementing mMTC, or U-plane latency (e.g., 0.5 ms or less for each of downlink (DL) and uplink (UL), or a round trip of 18 ms or less) for implementing URLLC.

The antenna module 1897 may transmit or receive a signal or power to or from the outside (e.g., the external electronic device) of the electronic device 1801. According to still another embodiment, the antenna module 1897 may include an antenna including a radiating element composed of a conductive material or a conductive pattern formed in or on a substrate (e.g., a printed circuit board (PCB)). According to an embodiment, the antenna module 1897 may include a plurality of antennas (e.g., array antennas). In such a case, at least one antenna appropriate for a communication scheme used in the communication network, such as the first network 1898 or the second network 1899, may be selected, for example, by the communication module 1890 (e.g., the wireless communication module 1892) from the plurality of antennas. The signal or the power may then be transmitted or received between the communication module 1890 and the external electronic device via the selected at least one antenna. According to another embodiment, another component (e.g., a radio frequency integrated circuit (RFIC)) other than the radiating element may be additionally formed as part of the antenna module 1897.

According to various embodiments, the antenna module 1897 may form a mmWave antenna module. According to yet another embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to a further embodiment, commands or data may be transmitted or received between the electronic device 1801 and the external electronic device 1804 via the server 1808 coupled with the second network 1899. Each of the electronic devices 1802 or 1804 may be a device of a same type as, or a different type, from the electronic device 1801. According to still another embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1801. The electronic device 1801 may provide the outcome, with or without further processing of the outcome, as at least part of a reply to the request. To that end, a cloud computing, distributed computing, mobile edge computing (MEC), or client-server computing technology may be used, for example. The electronic device 1801 may provide ultra low-latency services using, e.g., distributed computing or mobile edge computing. In another embodiment, the external electronic device 1804 may include an internet-of-things (IoT) device. The server 1808 may be an intelligent server using machine learning and/or a neural network. According to an embodiment, the external electronic device 1804 or the server 1808 may be included in the second network 1899. The electronic device 1801 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to another embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1840) including one or more instructions that are stored in a storage medium (e.g., internal memory 1836 or external memory 1838) that is readable by a machine (e.g., the electronic device 1801). For example, a processor (e.g., the processor 1820) of the machine (e.g., the electronic device 1801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

A preview control method according to various embodiments may be performed by an electronic device (e.g., the electronic device 200 or the processor 220). For convenience of description, each operation of the method is assumed to be performed by the processor 220 or the electronic device 200 of FIG. 2A. The electronic device 200 or the processor 220 may be configured to perform at least some of operations of the preview control method according to an embodiment. At least one of the operations according to various embodiments may be omitted, an order of some of the operations may be changed, or a different operation may be added.

An electronic device (e.g., the electronic device 200 of FIG. 2A, the electronic device 300 of FIGS. 3A to 3D, or the electronic device 1500 of FIGS. 15A to 15D) according to various embodiments may include a flexible display (e.g., the flexible display 210 of FIG. 2A, the flexible display 310 of FIGS. 3A to 3D, or the flexible display 1510 of FIGS. 15A to 15D) in which a size of a display area exposed on a front surface of the electronic device is changed, a camera (e.g., the camera module 230 of FIG. 2A) including a lens assembly (e.g., the lens assembly 232 of FIG. 2A, the lens assembly 332 of FIG. 3C, or the lens assembly 1532 of FIG. 15C) that moves in connection with a movement of the flexible display for changing the size of the display area, and at least one processor (e.g., the processor 220 of FIG. 2A) configured to be connected to the flexible display and the camera. The at least one processor may be configured to detect the movement of the flexible display through at least one sensor, adjust a preview range in a captured image obtained by the camera, based on the movement of the flexible display, to obtain a preview image corresponding to the adjusted preview range, and display the preview image on the flexible display.

According to various embodiments, the preview range may be adjusted based on at least one of a moving direction of the flexible display, a moving distance of the flexible display, and a moving ratio of the flexible display.

According to various embodiments, the preview range may be adjusted to move in an opposite direction of a moving direction of the flexible display within the captured image.

According to various embodiments, the preview range may be adjusted to be included in an overlapping area between a first captured image obtained in a first state before the lens assembly is moved and a second captured image obtained in a second state after the lens assembly is moved.

According to various embodiments, the preview range may be adjusted to be positioned in a center of the overlapping area, or may be adjusted to maintain content included in the preview range.

According to various embodiments, the preview range may be adjusted in further consideration of one or more of a maximum moving distance according to maximum extension of the flexible display, a distance from a subject, and a screen display mode of the flexible display.

According to various embodiments, the at least one processor may obtain a first captured image by the camera, may obtain a first preview image by cropping a first preview range in the first captured image, and may display the first preview image on the flexible display in a first state before the lens assembly is moved. The at least one processor may be configured to obtain a second captured image by the camera, obtain a second preview image by adjusting the first preview range in the second captured image to a second preview range and cropping the second preview range in the second captured image, and display the second preview image on the flexible display in a second state after the lens assembly is moved.

A preview control method of an electronic device including a flexible display and a camera including a lens assembly that moves in connection with a movement of the flexible display according to various embodiments may include detecting the movement of the flexible display, adjusting a preview range in a captured image obtained by the camera, based on the movement of the flexible display, to obtain a preview image corresponding to the adjusted preview range, and displaying the preview image on the flexible display.

According to various embodiments, the preview range may be adjusted based on at least one of a moving direction of the flexible display, a moving distance of the flexible display, and a moving ratio of the flexible display.

According to various embodiments, the preview range may be adjusted to move in an opposite direction of a moving direction of the flexible display within the captured image.

According to various embodiments, the preview range may be adjusted in further consideration of one or more of a maximum moving distance according to maximum extension of the flexible display, a distance from a subject, and a screen display mode of the flexible display.

According to various embodiments, the method may include obtaining a first captured image by the camera, obtaining a first preview image by cropping a first preview range in the first captured image, and displaying the first preview image on the flexible display in a first state before the lens assembly is moved. The method may include obtaining a second captured image by the camera, obtaining a second preview image by adjusting the first preview range in the second captured image to a second preview range and cropping the adjusted preview range in the second captured image, and displaying the second preview image on the flexible display in a second state after the lens assembly is moved in connection with the movement of the flexible display.

An electronic device (e.g., the electronic device 200 of FIG. 2A, the electronic device 300 of FIGS. 3A to 3D, or the electronic device 1500 of FIGS. 15A to 15D) according to various embodiments may include a flexible display (e.g., the flexible display 210 of FIG. 2A, the flexible display 310 of FIGS. 3A to 3D, or the flexible display 1510 of FIGS. 15A to 15D) in which a size of a display area exposed on a front surface of the electronic device is changed, a camera (e.g., the camera module 230 of FIG. 2A) including a lens assembly (e.g., the lens assembly 232 of FIG. 2A, the lens assembly 332 of FIG. 3C, or the lens assembly 1532 of FIG. 15C) that moves in connection with a movement of the flexible display for changing the size of the display area and an image sensor (e.g., the image sensor 234 of FIG. 2A), and at least one processor (e.g., the processor 220 of FIG. 2A) configured to be connected to the flexible display and the camera. The at least one processor may be configured to detect the movement of the flexible display through at least one sensor, adjust a preview range in a capture area of the image sensor, based on the movement of the flexible display, to obtain a preview image corresponding to the adjusted preview range, and display the preview image on the flexible display.

According to various embodiments, the preview range may be adjusted based on at least one of a moving direction of the flexible display, a moving distance of the flexible display, and a moving ratio of the flexible display.

According to various embodiments, the preview range may be adjusted to move in an opposite direction of a moving direction of the flexible display within the capture area.

According to various embodiments, the preview range may be adjusted to be included in an overlapping area between a first capture area obtained in a first state before the lens assembly is moved and a second capture area obtained in a second state after the lens assembly is moved.

According to various embodiments, the at least one processor may obtain a first preview image corresponding to a first preview range in the capture area of the image sensor, and may display the first preview image on the flexible display in a first state before the lens assembly is moved. The at least one processor may obtain a second preview image corresponding to a second preview range by adjusting the first preview range in the capture area of the image sensor to the second preview range, and may display the second preview image on the flexible display in a second state after the lens assembly is moved in connection with the movement of the flexible display.

A preview control method of an electronic device including a flexible display and a camera including a lens assembly that moves in connection with a movement of the flexible display according to various embodiments may include detecting the movement of the flexible display, adjusting a preview range in a capture area of an image sensor in the camera, based on the movement of the flexible display, to obtain a preview image through the adjusted preview range, and displaying the preview image on the flexible display.

According to various embodiments, the preview range may be adjusted based on at least one of a moving direction of the flexible display, a moving distance of the flexible display, and a moving ratio of the flexible display.

According to various embodiments, the method may include obtaining a first preview image corresponding to a first preview range in the capture area of the image sensor, and displaying the first preview image on the flexible display in a first state before the lens assembly is moved. The method may include obtaining a second preview image corresponding to a second preview range by adjusting the first preview range in the capture area of the image sensor to the second preview range, and displaying the second preview image on the flexible display in a second state after the lens assembly is moved in connection with the movement of the flexible display.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a housing including a first housing part and a second housing part configured to movably engage with the first housing part between a retracted position and an extended position;
    a flexible display coupled to the first housing part and the second housing part such that a size of an area of the flexible display that is visible from a front side of the housing resizes as the second housing part moves between the retracted position and the extended position;
    a camera comprising a lens assembly;
    at least one sensor;
    memory storing instructions; and
    at least one processor communicatively coupled to the flexible display, the camera, the at least one sensor, and the memory,
    wherein the instructions, when executed by the at least one processor individually or collectively, cause the electronic device to:
        detect, through the at least one sensor, a movement of the lens assembly as the second housing part moves between the retracted position and the extended position,
        determine a change in size of the flexible display in response to movement of the second housing part between the retracted position and the extended position,
        generate a preview image to be displayed in a resized area of the flexible display by adjusting, a preview range of a captured image obtained by the camera, based on the movement of the lens assembly, and
        display the preview image corresponding to the adjusted preview range of the captured image in the resized area of the flexible display.

2. The electronic device of claim 1, wherein the adjusting of the preview range is based on at least one of a moving direction of the lens assembly, a moving distance of the lens assembly, and a moving ratio of the lens assembly.

3. The electronic device of claim 1, wherein the adjusting of the preview range comprises adjusting the preview range to move in an opposite direction of a moving direction of the lens assembly within the captured image.

4. The electronic device of claim 1, wherein the adjusting of the preview range comprises adjusting the preview range to be included in an overlapping area between a first captured image obtained in a first state before the lens assembly is moved and a second captured image obtained in a second state after the lens assembly is moved.

5. The electronic device of claim 4, wherein the adjusting of the preview range comprises:
adjusting the preview range to be positioned in a center of the overlapping area, or
adjusting the preview range to maintain content included in the preview range.

6. The electronic device of claim 1, wherein the adjusting of the preview range is based on one or more of a maximum moving distance of the lens assembly according to maximum extension of the flexible display, a distance from a subject, or a screen display mode of the flexible display.

7. The electronic device of claim 1, wherein the instructions, when executed by the at least one processor individually or collectively, further cause the electronic device to:
obtain a first captured image by the camera,
obtain a first preview image by cropping a first preview range in the first captured image,
display the first preview image on the flexible display in a first state before the lens assembly is moved,
obtain a second captured image by the camera,
obtain a second preview image by adjusting the first preview range in the second captured image to a second preview range and cropping the second preview range in the second captured image, and
display the second preview image on the flexible display in a second state after the lens assembly is moved.

8. A preview control method performed by an electronic device comprising a housing including a first housing part and a second housing part configured to movably engage with the first housing part between a retracted position and an extended position, a flexible display coupled to the first housing part and the second housing part such that a size of an area of the flexible display that is visible from a front side of the housing resizes as the second housing part moves between the retracted position and the extended position, a camera comprising a lens assembly, and at least one sensor, the method comprising:
detecting, through the at least one sensor, a movement of the lens assembly as the second housing part moves between the retracted position and the extended position;
determining a change in size of the flexible display in response to movement of the second housing part between the retracted position and the extended position;
generating a preview image to be displayed in a resized area of the flexible display by adjusting a preview range of a captured image obtained by the camera, based on the movement of the lens assembly; and
displaying the preview image corresponding to the adjusted preview range of the captured image in the resized area of the flexible display.

9. The method of claim 8, wherein the adjusting of the preview range is based on at least one of a moving direction of the lens assembly, a moving distance of the lens assembly, and a moving ratio of the lens assembly.

10. The method of claim 8, wherein the adjusting of the preview range comprises adjusting the preview range to move in an opposite direction of a moving direction of the lens assembly within the captured image.

11. The method of claim 8, wherein the adjusting of the preview range is based on one or more of a maximum moving distance of the lens assembly according to maximum extension of the flexible display, a distance from a subject, and a screen display mode of the flexible display.

12. The method of claim 8, further comprising:
in a first state before the lens assembly is moved, obtaining a first captured image by the camera;
obtaining a first preview image by cropping a first preview range in the first captured image;
displaying the first preview image on the flexible display;
in a second state after the lens assembly is moved, obtaining a second captured image by the camera;
obtaining a second preview image by adjusting the first preview range in the second captured image to a second preview range and cropping the adjusted preview range in the second captured image; and
displaying the second preview image on the flexible display.

13. An electronic device comprising:
a housing including a first housing part and a second housing part configured to movably engage with the first housing part between a retracted position and an extended position;
a flexible display coupled to the first housing part and the second housing part such that a size of an area of the flexible display that is visible from a front side of the housing resizes as the second housing part moves between the retracted position and the extended position;
a camera comprising a lens assembly;
at least one sensor;
memory storing instructions; and
at least one processor communicatively coupled to the flexible display, the camera, the at least one sensor, and the memory,
wherein the instructions, when executed by the at least one processor individually or collectively, cause the electronic device to:
detect, through the at least one sensor, a movement of the lens assembly as the second housing part moves between the retracted position and the extended position,
generate a preview image to be displayed in a resized area of the flexible display by adjusting, a preview range of a capture area of the camera, based on the movement of the lens assembly, and
display the preview image corresponding to the adjusted preview range of the capture area in the resized area of the flexible display.

14. The electronic device of claim 13, wherein the adjusting of the preview range is based on at least one of a moving direction of the lens assembly, a moving distance of the lens assembly, and a moving ratio of the lens assembly.

15. The electronic device of claim 13, wherein the adjusting of the preview range comprises adjusting the preview range to move in an opposite direction of a moving direction of the lens assembly within a captured image.

* * * * *